(12) United States Patent
Tamura et al.

(10) Patent No.: US 12,200,181 B2
(45) Date of Patent: Jan. 14, 2025

(54) INFORMATION PROCESSING APPARATUS, INFORMATION PROCESSING METHOD, AND PROGRAM

(71) Applicant: FUJIFILM CORPORATION, Tokyo (JP)

(72) Inventors: Kazunori Tamura, Saitama (JP); Fuminori Irie, Saitama (JP); Takashi Aoki, Saitama (JP); Masahiko Miyata, Saitama (JP)

(73) Assignee: FUJIFILM CORPORATION, Tokyo (JP)

(*) Notice: Subject to any disclaimer, the term of this patent is extended or adjusted under 35 U.S.C. 154(b) by 41 days.

(21) Appl. No.: 17/577,347

(22) Filed: Jan. 17, 2022

(65) Prior Publication Data

US 2022/0141442 A1 May 5, 2022

Related U.S. Application Data

(63) Continuation of application No. PCT/JP2020/028078, filed on Jul. 20, 2020.

(30) Foreign Application Priority Data

Jul. 26, 2019 (JP) .................................. 2019-138239

(51) Int. Cl.
*H04N 13/117* (2018.01)
*G06F 1/16* (2006.01)
(Continued)

(52) U.S. Cl.
CPC ......... *H04N 13/117* (2018.05); *G06F 1/1694* (2013.01); *H04N 21/21805* (2013.01); *H04N 21/2187* (2013.01); *G06F 2200/1637* (2013.01)

(58) Field of Classification Search
CPC ........... H04N 13/117; H04N 21/21805; H04N 21/2187; H04N 21/41407;
(Continued)

(56) References Cited

U.S. PATENT DOCUMENTS 5,703,961 A 12/1997 Rogina et al.
2018/0061071 A1* 3/2018 Okutani ................ G06T 15/005
(Continued)

FOREIGN PATENT DOCUMENTS

JP 2008-109481 A 5/2008
JP 2017-12397 A 1/2017
(Continued)

OTHER PUBLICATIONS

English language translation of the following: Office action dated Nov. 29, 2022 from the JPO in a Japanese patent application No. 2021-536959 corresponding to the instant patent application.
(Continued)

*Primary Examiner* — Alazar Tilahun
(74) *Attorney, Agent, or Firm* — SOLARIS Intellectual Property Group, PLLC

(57) ABSTRACT

An information processing apparatus includes an acquisition unit that acquires a free viewpoint video based on at least one image among a plurality of images obtained by imaging an imaging region by a plurality of imaging apparatuses, and a reference video, the free viewpoint video indicating the imaging region in a case in which the imaging region is observed from a specific viewpoint position and a specific visual line direction, and an execution unit that executes a specific process in a case in which a difference degree between the free viewpoint video acquired by the acquisition unit and the reference video acquired by the acquisition unit is equal to or more than a first threshold value.

23 Claims, 36 Drawing Sheets

(51) Int. Cl.
*H04N 21/218* (2011.01)
*H04N 21/2187* (2011.01)

(58) Field of Classification Search
CPC .. H04N 21/42224; H04N 21/816; H04N 7/18; H04N 23/90; H04N 13/279; H04N 13/111; G06F 1/1694; G06F 2200/1637; G06F 3/0346; G06F 3/04815; G06T 15/20; G06T 19/00
See application file for complete search history.

(56) References Cited

U.S. PATENT DOCUMENTS

| | | | |
|---|---|---|---|
| 2018/0089523 A1 | 3/2018 | Itakura | |
| 2018/0197324 A1* | 7/2018 | Hanamoto | G06T 7/70 |
| 2018/0359458 A1* | 12/2018 | Iwakiri | G06T 15/205 |
| 2019/0051035 A1* | 2/2019 | Nishiyama | H04N 13/243 |
| 2020/0053336 A1* | 2/2020 | Kawai | H04N 13/111 |
| 2020/0234495 A1* | 7/2020 | Nakao | A63F 13/5258 |
| 2020/0329227 A1* | 10/2020 | Yoshimura | H04N 13/122 |
| 2022/0053222 A1* | 2/2022 | Sonneveldt | H04N 19/597 |
| 2022/0141442 A1 | 5/2022 | Tamura et al. | |

FOREIGN PATENT DOCUMENTS

| | | |
|---|---|---|
| JP | 2018-055367 A | 4/2018 |
| JP | 2019-53738 A | 4/2019 |
| JP | 7291224 B2 | 6/2023 |
| WO | 2019/012817 A1 | 1/2019 |

OTHER PUBLICATIONS

International Search Report issued in International Application No. PCT/JP2020/028078 on Oct. 13, 2020.
Written Opinion of the ISA issued in International Application No. PCT/JP2020/028078 on Oct. 13, 2020.
English language translation of the following: Notice dated May 7, 2024 from the JPO in a Japanese patent application No. 2023-091887 corresponding to the instant patent application. This office action translation is submitted now in order to supplement the understanding of the cited references which are being disclosed in the instant Information Disclosure Statement.

* cited by examiner

INFORMATION PROCESSING APPARATUS, INFORMATION PROCESSING METHOD, AND PROGRAM

CROSS-REFERENCE TO RELATED APPLICATIONS

This application is a continuation application of International Application No. PCT/JP2020/028078, filed Jul. 20, 2020, the disclosure of which is incorporated herein by reference in its entirety. Further, this application claims priority under from Japanese Patent Application No. 2019-138239, filed Jul. 26, 2019, the disclosure of which is incorporated herein by reference in its entirety.

BACKGROUND

1. Technical Field

The technology of the present disclosure relates to an information processing apparatus, an information processing method, and a program.

2. Related Art

JP2019-53738A discloses an information processing apparatus including an acquisition unit that acquires information for specifying a viewpoint position or/and a visual line direction for generating a virtual viewpoint image, and a notification unit that gives notification of information on a quality of the virtual viewpoint image generated based on the viewpoint position or/and the visual line direction acquired by the acquisition unit.

SUMMARY

One embodiment according to the technology of the present disclosure provides an information processing apparatus, an information processing method, and a program which can contribute to the acquisition of a free viewpoint video in which a difference degree from a reference video is less than a first threshold value.

A first aspect according to the technology of the present disclosure relates to an information processing apparatus including an acquisition unit that acquires a free viewpoint video based on at least one image among a plurality of images obtained by imaging an imaging region by a plurality of imaging apparatuses, and a reference video, the free viewpoint video indicating the imaging region in a case in which the imaging region is observed from a specific viewpoint position and a specific visual line direction, and an execution unit that executes a specific process in a case in which a difference degree between the free viewpoint video acquired by the acquisition unit and the reference video acquired by the acquisition unit is equal to or more than a first threshold value.

A second aspect according to the technology of the present disclosure relates to the information processing apparatus according to the first aspect, in which the specific process is a process including a notification process of giving notification that the difference degree is equal to or more than the first threshold value.

A third aspect according to the technology of the present disclosure relates to the information processing apparatus according to the second aspect, in which the notification process is a process of giving at least one of visible notification, audible notification, or tactile notification that the difference degree is equal to or more than the first threshold value.

A fourth aspect according to the technology of the present disclosure relates to the information processing apparatus according to any one of the first to third aspects, in which the specific process is a process including a process of limiting a range in which the viewpoint position is able to be indicated to a viewpoint position range determined as a range in which the difference degree is set to be less than the first threshold value, and limiting a range in which the visual line direction is able to be indicated to a visual line direction range determined as a range in which the difference degree is set to be less than the first threshold value.

A fifth aspect according to the technology of the present disclosure relates to the information processing apparatus according to any one of the first to fourth aspects, in which the specific process is a process including a change process of performing, on the free viewpoint video, change for setting the difference degree to be less than the first threshold value.

A sixth aspect according to the technology of the present disclosure relates to the information processing apparatus according to the fifth aspect, in which the change process is a process of changing the free viewpoint video by changing at least one of the viewpoint position or the visual line direction.

A seventh aspect according to the technology of the present disclosure relates to the information processing apparatus according to any one of the first to sixth aspects, in which the execution unit executes the specific process depending on a change in the free viewpoint video.

An eighth aspect according to the technology of the present disclosure relates to the information processing apparatus according to the seventh aspect, further including a setting unit that selectively sets a following mode in which the execution unit executes the specific process while following the change in the free viewpoint video, and a non-following mode in which the execution unit does not execute specific process while following the change in the free viewpoint video.

A ninth aspect according to the technology of the present disclosure relates to the information processing apparatus according to the eighth aspect, in which the setting unit sets the following mode in a case in which a change amount of the difference degree is less than a second threshold value, and sets the non-following mode in a case in which the change amount is equal to or more than the second threshold value.

A tenth aspect according to the technology of the present disclosure relates to the information processing apparatus according to the eighth aspect, in which the setting unit sets the following mode in a case in which a frequency at which the difference degree changes is less than a third threshold value, and sets the non-following mode in a case in which the frequency is equal to or more than the third threshold value.

An eleventh aspect according to the technology of the present disclosure relates to the information processing apparatus according to any one of the first to tenth aspects, further including a control unit that displays the free viewpoint video on a first display device.

A twelfth aspect according to the technology of the present disclosure relates to the information processing apparatus according to the eleventh aspect, in which the first display device includes a detection unit that detects a posture of the first display device, and the execution unit executes the specific process in a case in which the posture detected by the detection unit is a predetermined posture, and does not execute the specific process in a case in which the posture detected by the detection unit is a posture different from the predetermined posture.

A thirteenth aspect according to the technology of the present disclosure relates to the information processing apparatus according to the eleventh or twelfth aspect, in which the control unit displays the reference video on a second display device different from the first display device.

A fourteenth aspect according to the technology of the present disclosure relates to the information processing apparatus according to any one of the first to thirteenth aspects, in which the execution unit executes change in the first threshold value according to instruction information for giving an instruction for changing the first threshold value received by a reception unit in a case in which the instruction information is received by the reception unit.

A fifteenth aspect according to the technology of the present disclosure relates to the information processing apparatus according to any one of the first to fourteenth aspects, in which the free viewpoint video is a virtual viewpoint video.

A sixteenth aspect according to the technology of the present disclosure relates to the information processing apparatus according to any one of the first to fifteenth aspects, in which the reference video is a live broadcast video.

A seventeenth aspect according to the technology of the present disclosure relates to the information processing apparatus according to any one of the first to sixteenth aspects, in which the reference video is an image obtained by imaging the imaging region by a reference imaging apparatus.

An eighteenth aspect according to the technology of the present disclosure relates to the information processing apparatus according to any one of the first to seventeenth aspects, in which the viewpoint position and the visual line direction are a viewpoint position and a visual line direction as indicated from an outside.

A nineteenth aspect according to the technology of the present disclosure relates to the information processing apparatus according to any one of the first to eighteenth aspects, in which the specific process is a process that contributes to setting the difference degree to be less than the first threshold value.

A twentieth aspect according to the technology of the present disclosure relates to an information processing method including acquiring a free viewpoint video based on at least one image among a plurality of images obtained by imaging an imaging region by a plurality of imaging apparatuses, and a reference video, the free viewpoint video indicating the imaging region in a case in which the imaging region is observed from a specific viewpoint position and a specific visual line direction, and executing a specific process in a case in which a difference degree between the acquired free viewpoint video and the acquired reference video is equal to or more than a first threshold value.

A twenty-first aspect according to the technology of the present disclosure relates to a program causing a computer to execute a process including acquiring a free viewpoint video based on at least one image among a plurality of images obtained by imaging an imaging region by a plurality of imaging apparatuses, and a reference video, the free viewpoint video indicating the imaging region in a case in which the imaging region is observed from a specific viewpoint position and a specific visual line direction, and executing a specific process in a case in which a difference degree between the acquired free viewpoint video and the acquired reference video is equal to or more than a first threshold value.

BRIEF DESCRIPTION OF THE DRAWINGS

Exemplary embodiments of the technology of the disclosure will be described in detail based on the following figures, wherein.

DETAILED DESCRIPTION

An example of an embodiment according to the technology of the present disclosure will be described with reference to the accompanying drawings.

First, the terms used in the following description will be described.

CPU refers to an abbreviation of "central processing unit". RAM refers to an abbreviation of "random access memory". DRAM refers to an abbreviation of "dynamic random access memory". SRAM refers to an abbreviation of "static random access memory". ROM refers to an abbreviation of "read only memory". SSD refers to an abbreviation of "solid state drive". HDD refers to an abbreviation of "hard disk drive". EEPROM refers to an abbreviation of "electrically erasable and programmable read only memory". I/F refers to an abbreviation of "interface". IC refers to an abbreviation of "integrated circuit". ASIC refers to an abbreviation of "application specific integrated circuit". PLD refers to an abbreviation of "programmable logic device". FPGA refers to an abbreviation of "field-programmable gate array". SoC refers to an abbreviation of "system-on-a-chip". CMOS refers to an abbreviation of "complementary metal oxide semiconductor". CCD refers to an abbreviation of "charge coupled device". EL refers to an abbreviation of "electro-luminescence". GPU refers to an abbreviation of "graphics processing unit". LAN refers to an abbreviation of "local area network". 3D refers to an abbreviation of "3 dimension". USB refers to an abbreviation of "universal serial bus". In addition, in the description of the present specification, the meaning of "vertical" includes the meaning of a perfect vertical as well as the meaning of a substantially vertical including errors allowed in design and manufacturing. In addition, in the description of the present specification, the meaning of "match" includes the meaning of a perfect match as well as the meaning of a substantially match including errors allowed in design and manufacturing.

Figure 1:
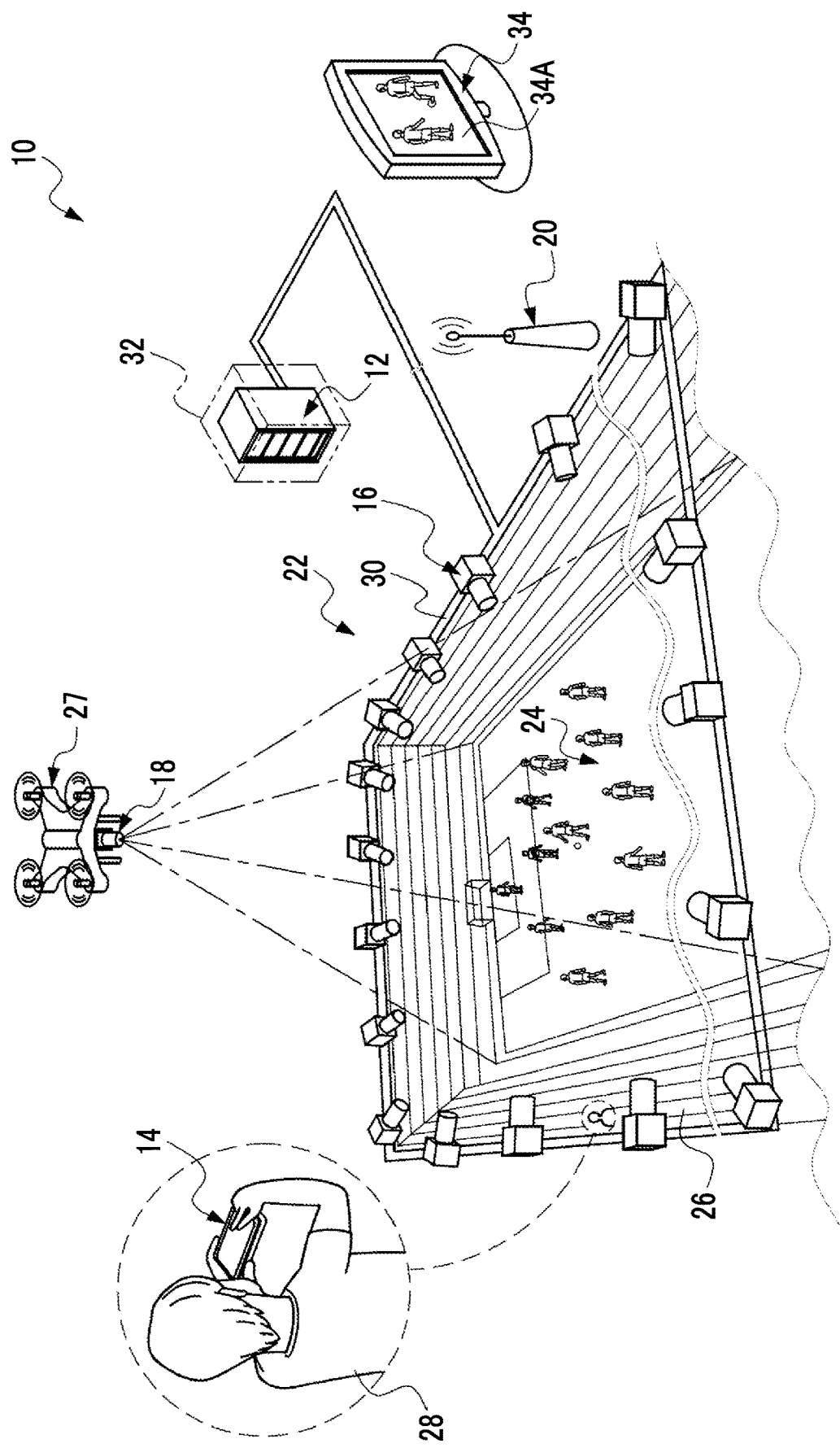
FIG. 1 is a schematic perspective diagram showing an example of an external configuration of an information processing system.

For example, as shown in FIG. 1, an information processing system 10 comprises an information processing apparatus 12, a smart device 14, a plurality of imaging apparatuses 16, an imaging apparatus 18, a wireless communication base station (hereinafter, simply referred to as "base station") 20, and a receiver 34. Note that, here, the "smart device 14" refers to a portable multifunctional terminal, such as a smartphone or a tablet terminal. Here, the smart device 14 is an example of a "first display device" according to the technology of the present disclosure, the imaging apparatus 18 is an example of a "first imaging apparatus" and a "second imaging apparatus" according to the technology of the present disclosure, and the receiver 34 is an example of a "second display device" according to the technology of the present disclosure. Note that, here, although the receiver 34 is described as an example, the technology of the present disclosure is not limited to this, and may be an electronic device with a display (for example, a smart device). In addition, the number of the base stations 20 is not limited to one, and a plurality of the base stations 20 may be present. Further, the communication standards used in the base station include a wireless communication standard including a Long Term Evolution (LTE) standard and a wireless communication standard including a WiFi (802.11) standard and/or a Bluetooth (registered trademark) standard.

The imaging apparatuses 16 and 18 are devices for imaging having a CMOS image sensor, and each have an optical zoom function and/or a digital zoom function. Note that another type of image sensor, such as a CCD image sensor, may be adopted instead of the CMOS image sensor. Hereinafter, for convenience of description, in a case in which a distinction is not necessary, the imaging apparatus 18 and the plurality of imaging apparatuses 16, are referred to as "plurality of imaging apparatuses" without reference numeral.

The plurality of imaging apparatuses 16 are installed in a soccer stadium 22. Each of the plurality of imaging apparatuses 16 is disposed so as to surround a soccer field 24, and images a region including the soccer field 24 as an imaging region. Here, an aspect example is described in which each of the plurality of imaging apparatuses 16 is disposed so as to surround the soccer field 24. However, the technology of the present disclosure is not limited to this, and the disposition of the plurality of imaging apparatuses 16 is decided depending on a virtual viewpoint video requested to be generated by the viewer 28 or the like. The plurality of imaging apparatuses 16 may be disposed so as to surround the whole soccer field 24, or the plurality of imaging apparatuses 16 may be disposed so as to surround a specific part thereof. The imaging apparatus 18 is installed in an unmanned type aerial vehicle (for example, a multi rotorcraft type unmanned aerial vehicle), and images the region including the soccer field 24 as the imaging region in a bird's-eye view from the sky. The imaging region of the region including the soccer field 24 in a bird's-eye view from the sky refers to an imaging face on the soccer field 24 by the imaging apparatus 18.

The information processing apparatus 12 is installed in a control room 32. The plurality of imaging apparatuses 16 and the information processing apparatus 12 are connected to each other via a LAN cable 30, and the information processing apparatus 12 controls the plurality of imaging apparatuses 16 and acquires an image obtained by being imaged by each of the plurality of imaging apparatuses 16. Note that although the connection using a wired communication method by the LAN cable 30 is described as an example here, the technology of the present disclosure is not limited to this, and the connection using a wireless communication method may be used.

In the soccer stadium 22, spectator seats 26 are provided so as to surround the soccer field 24, and the viewer 28 sits in the spectator seat 26. The viewer 28 owns the smart device 14, and the smart device 14 is used by the viewer 28. Note that, here, an aspect example is described in which the viewer 28 is present in the soccer stadium 22, but the technology of the present disclosure is not limited to this, and the viewer 28 may be present outside the soccer stadium 22.

The base station 20 transmits and receives various pieces of information to and from the information processing apparatus 12 and the unmanned aerial vehicle 27 via radio waves. That is, the information processing apparatus 12 is connected to the unmanned aerial vehicle 27 via the base station 20 in the wirelessly communicable manner. The information processing apparatus 12 controls the unmanned aerial vehicle 27 by wirelessly communicating with the unmanned aerial vehicle 27 via the base station 20, and acquires the image obtained by being imaged by the imaging apparatus 18 from the unmanned aerial vehicle 27.

The base station 20 transmits various pieces of information to the receiver 34 via the wireless communication. The information processing apparatus 12 transmits various videos to the receiver 34 via the base station 20, the receiver 34 receives various videos transmitted from the information processing apparatus 12, and the received various videos are displayed on a screen 34A. Note that the receiver 34 is used for viewing by an unspecified number of spectators, for example. A location in which the receiver 34 is installed may be inside the soccer stadium 22 or outside the soccer stadium 22 (for example, a public viewing venue). Note that, here, although an aspect example is described in which various pieces of information is transmitted to the receiver 34 via the wireless communication, the technology of the present disclosure is not limited to this, and for example, an aspect may be adopted in which various pieces of information is transmitted to the receiver 34 via a wired communication.

The information processing apparatus 12 is a device corresponding to a server, and the smart device 14 is a device corresponding to a client terminal with respect to the information processing apparatus 12. By the information processing apparatus 12 and the smart device 14 wirelessly communicating with each other via the base station 20, the smart device 14 requests the information processing apparatus 12 to provide various services, and the information processing apparatus 12 provides the services to the smart device 14 in response to the request from the smart device 14.

Figure 2:
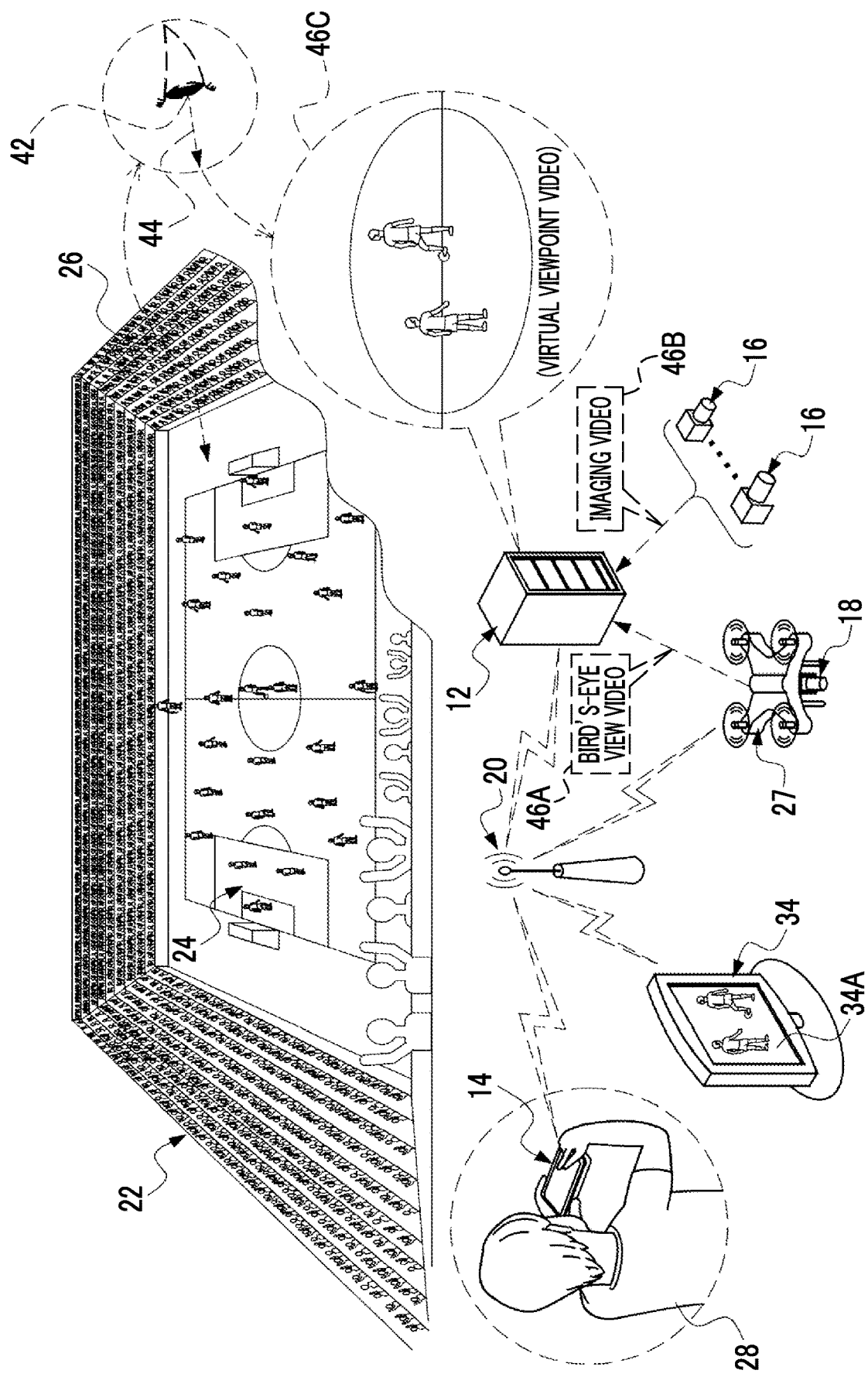
FIG. 2 is a conceptual diagram showing an example of a relationship between an information processing apparatus, a smart device, a receiver, an unmanned aerial vehicle, and an imaging apparatus included in the information processing system.

For example, as shown in FIG. 2, the information processing apparatus 12 acquires a bird's-eye view video 46A showing the region including the soccer field 24 in a case of being observed from the sky from the unmanned aerial vehicle 27. The bird's-eye view video 46A is a moving image obtained by imaging the region including the soccer field 24 as the imaging region (hereinafter, also simply referred to as "imaging region") in a bird's-eye view from the sky by the imaging apparatus 18 of the unmanned aerial vehicle 27. Note that, here, although a case in which the bird's-eye view video 46A is the moving image is described as an example, the bird's-eye view video 46A is not limited to this, and may be a still image showing the region including the soccer field 24 in a case of being observed from the sky.

The information processing apparatus 12 acquires an imaging video 46B showing the imaging region in a case of being observed from each position of the plurality of imaging apparatuses 16 from each of the plurality of imaging apparatuses 16. The imaging video 46B is a moving image obtained by imaging the imaging region by each of the plurality of imaging apparatuses 16. Note that, here, although a case in which the imaging video 46B is the moving image is described as an example, the imaging video 46B is not limited to this, and may be a still image showing the imaging region in a case of being observed from each position of the plurality of imaging apparatuses 16.

The information processing apparatus 12 generates a virtual viewpoint video 46C based on the bird's-eye view video 46A and the imaging video 46B. The virtual viewpoint video 46C is a video showing the imaging region in a case in which the imaging region is observed from a specific viewpoint position and a specific visual line direction. In the example shown in FIG. 2, the virtual viewpoint video 46C refers to, for example, the virtual viewpoint video showing the imaging region in a case in which the imaging region is observed from a viewpoint position 42 and a visual line direction 44 in a spectator seat 26. Examples of the virtual viewpoint video 46C include a moving image using 3D polygons. The viewpoint position 42 and the visual line direction 44 are not fixed. That is, the viewpoint position 42 and the visual line direction 44 are changed in response to an instruction from the viewer 28 or the like. Here, an aspect example is described in which the viewpoint position 42 and the visual line direction 44 are not fixed, but the technology of the present disclosure is not limited to this, and the viewpoint position 42 and the visual line direction 44 may be fixed.

The information processing apparatus 12 generates the moving image using the 3D polygons by composing the plurality of images (here, for example, the bird's-eye view video 46A and the imaging video 46B) obtained by imaging the imaging region by the plurality of imaging apparatuses. The information processing apparatus 12 generates the virtual viewpoint video corresponding to a case in which the imaging region is observed from any position and any direction based on the moving image using the generated 3D polygons. In the present embodiment, the information processing apparatus 12 generates the virtual viewpoint video 46 showing the subject in a case in which the subject is observed from the viewpoint position 42 and the visual line direction 44. Stated another way, the virtual viewpoint video 46 refers to the video corresponding to the video obtained by imaging by a virtual imaging apparatus (hereinafter, also referred to as "virtual imaging apparatus") installed at the viewpoint position 42 with the visual line direction 44 as the imaging direction. Here, the moving image is described as an example of the virtual viewpoint video 46C, but the technology of the present disclosure is not limited to this, and a still image may be used. Note that the viewpoint position 42 is an example of a "specific viewpoint position" according to the technology of the present disclosure, and the visual line direction 44 is an example of a "specific visual line direction" according to the technology of the present disclosure. In addition, the virtual viewpoint video 46C is an example of a "free viewpoint video" according to the technology of the present disclosure.

In addition, here, an aspect example is described in which the bird's-eye view video 46A obtained by being imaged by the imaging apparatus 18 is also used for generation, but the technology of the present disclosure is not limited to this. For example, the bird's-eye view video 46A is not provided for generation of the virtual viewpoint video 46C, and only a plurality of the imaging videos 46B obtained by being imaged by the plurality of imaging apparatuses 16 may be used for generating the virtual viewpoint video 46C. That is, the virtual viewpoint video 46C may be generated only from the videos obtained by being imaged by the plurality of imaging apparatuses 16 without using the video obtained by the imaging apparatus 18 (for example, a multi rotorcraft type unmanned aerial vehicle). Note that in a case in which the video obtained from the imaging apparatus 18 (for example, a multi rotorcraft type unmanned aerial vehicle) is used, a more accurate virtual viewpoint video can be generated.

The information processing apparatus 12 selectively transmits a reference video 46B1 (see FIGS. 9 and 10), which will be described below, and the virtual viewpoint video 46C to the smart device 14 and the receiver 34 as the distribution video. Note that, in the following, for convenience of description, in a case in which a distinction is not necessary, the reference video 46B1 and the virtual viewpoint video 46C are also referred to as the "distribution video".

Figure 3:
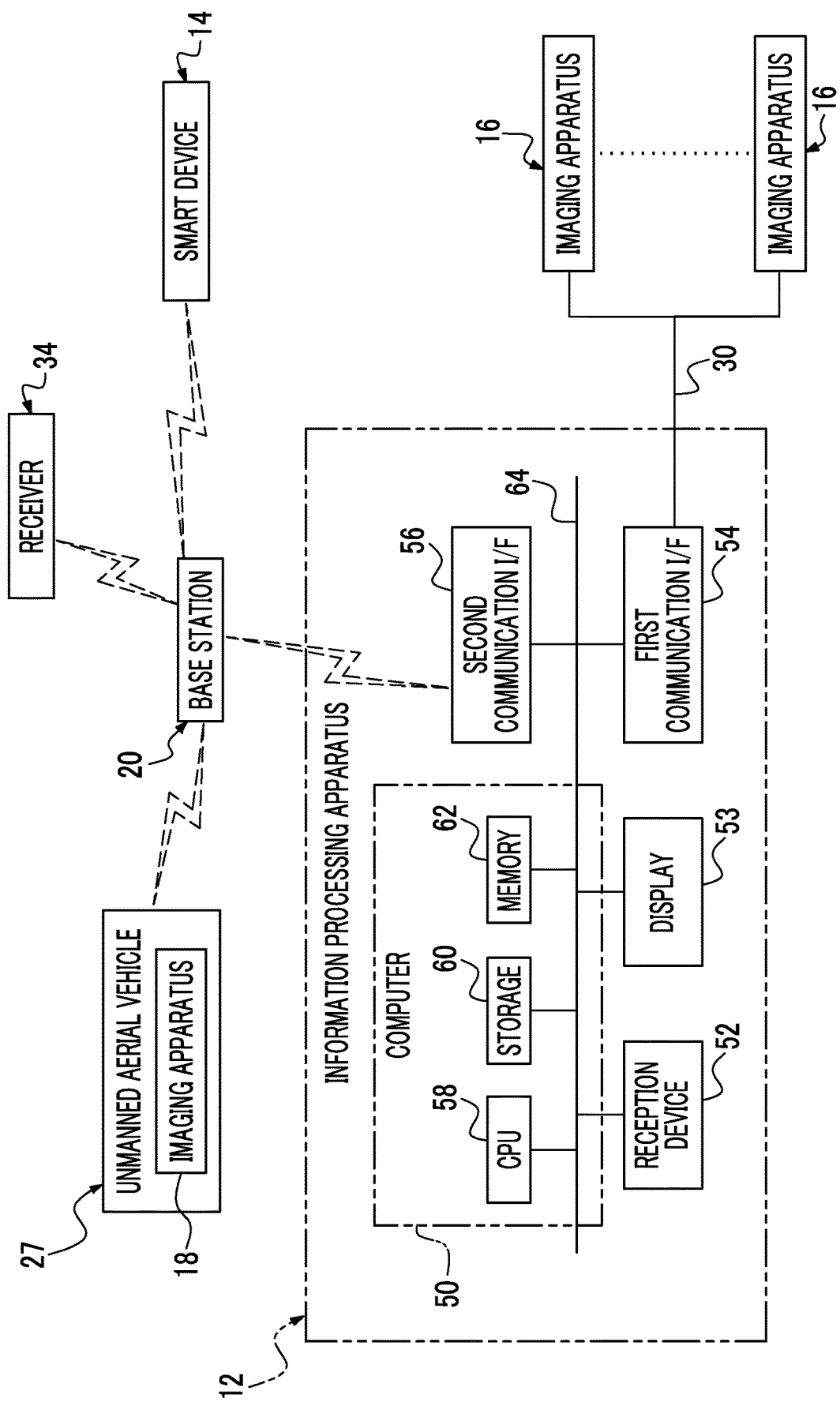
FIG. 3 is a block diagram showing an example of a hardware configuration of an electric system of the information processing apparatus according to the embodiment and an example of a relationship between the information processing apparatus and peripheral devices thereof.

For example, as shown in FIG. 3, the information processing apparatus 12 comprises a computer 50, a reception device 52, a display 53, a first communication I/F 54, and a second communication I/F 56. The computer 50 comprises a CPU 58, a storage 60, and a memory 62, and the CPU 58, the storage 60, and the memory 62 are connected to each other via a bus line 64. In the example shown in FIG. 3, for convenience of illustration, one bus line is shown as the bus line 64, but a plurality of bus lines may be used. In addition, the bus line 64 may include a serial bus or a parallel bus configured by a data bus, an address bus, a control bus, and the like.

The CPU 58 controls the whole information processing apparatus 12. Various parameters and various programs are stored in the storage 60. The storage 60 is a non-volatile storage device. Here, a flash memory is adopted as an example of the storage 60, but the technology of the present disclosure is not limited to this, and an EEPROM, an HDD, an SSD, or the like may be used. The memory 62 is a storage device. Various pieces of information are transitorily stored in the memory 62. The memory 62 is used as a work memory by the CPU 58. Here, a DRAM is adopted as an example of the memory 62, but the technology of the present disclosure is not limited to this, and another type of storage device may be used.

The reception device 52 receives the instruction from a user or the like of the information processing apparatus 12. Examples of the reception device 52 include a touch panel, a hard key, and a mouse. The reception device 52 is connected to the bus line 64 and the like, and the CPU 58 acquires the instruction received by the reception device 52.

The display 53 is connected to the bus line 64 and displays various pieces of information under the control of the CPU 58. Examples of the display 53 include a liquid crystal display. Note that another type of display, such as an organic EL display or an inorganic EL display, may be adopted as the display 53 without being limited to the liquid crystal display.

The first communication I/F 54 is connected to the LAN cable 30. The first communication I/F 54 is realized by a device having an FPGA, for example. The first communication I/F 54 is connected to the bus line 64 and controls the exchange of various pieces of information between the CPU 58 and the plurality of imaging apparatuses 16. For example, the first communication I/F 54 controls the plurality of imaging apparatuses 16 in response to the request of the CPU 58. In addition, the first communication I/F 54 acquires the imaging video 46B (see FIG. 2) obtained by being imaged by each of the plurality of imaging apparatuses 16, and outputs the acquired imaging video 46B to the CPU 58. Note that, here, although the wired communication I/F is described as an example of the first communication I/F 54, a wireless communication I/F, such as a high-speed wireless LAN, may be used.

The second communication I/F 56 is connected to the base station 20 in the wirelessly communicable manner. The second communication I/F 56 is realized by a device having an FPGA, for example. The second communication I/F 56 is connected to the bus line 64. The second communication I/F 56 controls the exchange of various pieces of information between the CPU 58 and the unmanned aerial vehicle 27 by the wireless communication method via the base station 20. In addition, the second communication I/F 56 controls the exchange in various pieces of information between the CPU 58 and the smart device 14 by the wireless communication method via the base station 20. In addition, the second communication I/F 56 controls the transmission of various videos to the receiver 34 by the CPU 58 by the wireless communication method via the base station 20. Note that at least one of the first communication I/F 54 or the second communication I/F 56 can be configured by a fixed circuit instead of an FPGA. In addition, at least one of the first communication I/F 54 or the second communication I/F 56 may be a circuit configured by an ASIC, an FPGA, and/or a PLD or the like.

Figure 4:
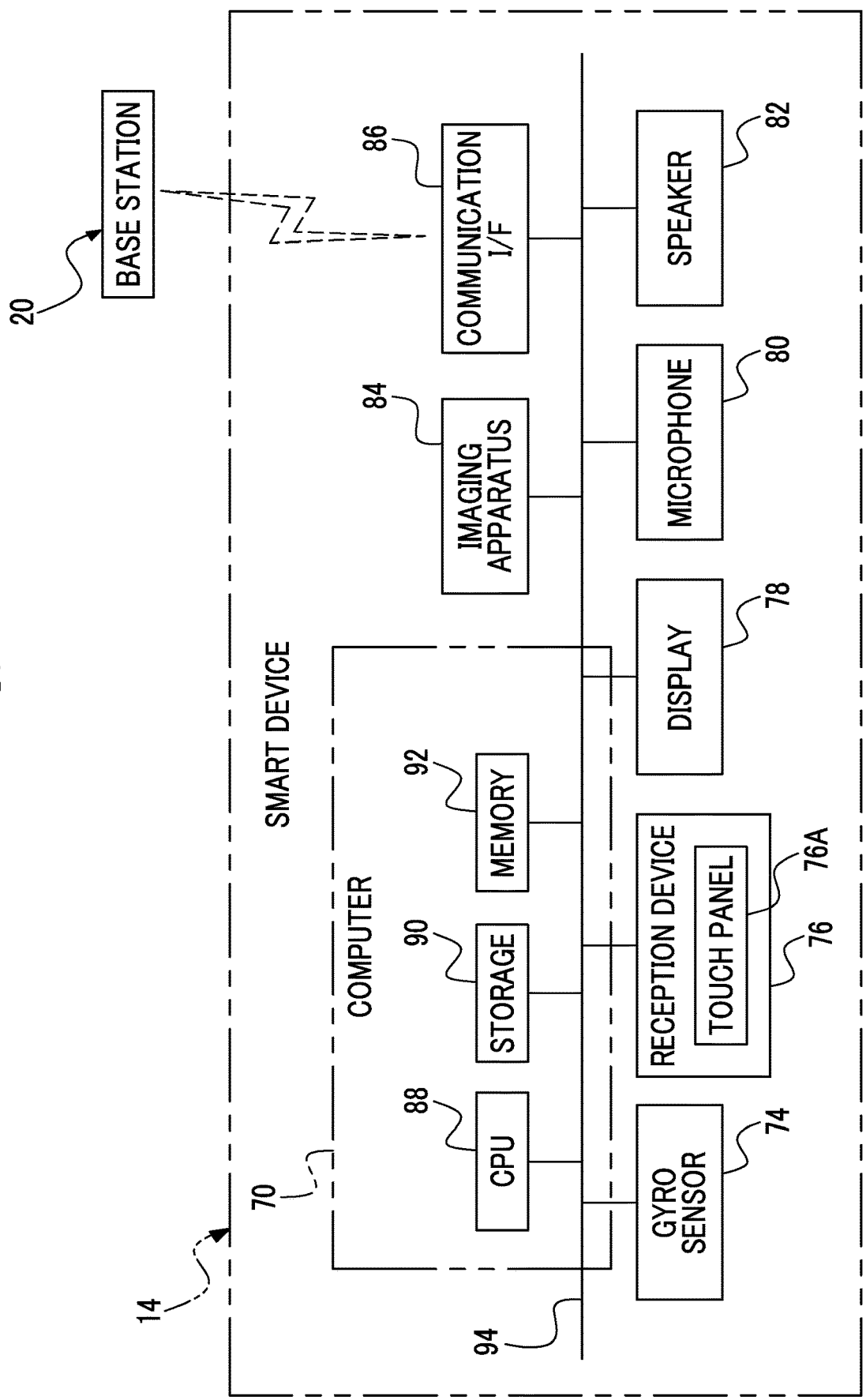
FIG. 4 is a block diagram showing an example of a hardware configuration of an electric system of the smart device.

For example, as shown in FIG. 4, the smart device 14 comprises a computer 70, a gyro sensor 74, a reception device 76, a display 78, a microphone 80, a speaker 82, an imaging apparatus 84, and a communication I/F 86. The computer 70 comprises a CPU 88, a storage 90, and a memory 92, and the CPU 88, the storage 90, and the memory 92 are connected to each other via a bus line 94. In the example shown in FIG. 4, for convenience of illustration, one bus line is shown as the bus line 94. However, the bus line 94 is configured by a serial bus or is configured to include a data bus, an address bus, a control bus, and the like. In addition, in the example shown in FIG. 4, the CPU 88, the reception device 76, the display 78, the microphone 80, the speaker 82, the imaging apparatus 84, and the communication I/F 86 are connected by a common bus, but the CPU 88 and each device may be connected by a dedicated bus or a dedicated communication line.

The CPU 88 controls the whole smart device 14. Various parameters and various programs are stored in the storage 90. The storage 90 is a non-volatile storage device. Here, a flash memory is adopted as an example of the storage 90, but the technology of the present disclosure is not limited to this, and an EEPROM, an HDD, an SSD, or the like may be used. Various pieces of information are transitorily stored in the memory 92, and the memory 92 is used as a work memory by the CPU 88. Here, an RAM is adopted as an example of the memory 92, but the technology of the present disclosure is not limited to this, and another type of storage device may be used.

The gyro sensor 74 measures an angle around a yaw axis of the smart device 14 (hereinafter, also referred to as "yaw angle"), an angle around a roll axis of the smart device 14 (hereinafter, also referred to as "roll angle"), and an angle around a pitch axis of the smart device 14 (hereinafter, also referred to as "pitch angle"). The gyro sensor 74 is connected to the bus line 94, and angle information indicating the yaw angle, the roll angle, and the pitch angle measured by the gyro sensor 74 is acquired by the CPU 88 via the bus line 94 and the like.

The reception device 76 is an example of a "reception unit (acceptor)" according to the technology of the present disclosure, and receives the instruction from the user or the like of the smart device 14 (here, for example, the viewer 28). Examples of the reception device 76 include a touch panel 76A, and a hard key. The reception device 76 is connected to the bus line 94, and the CPU 88 acquires the instruction received by the reception device 76.

The display 78 is connected to the bus line 94 and displays various pieces of information under the control of the CPU 88. Examples of the display 78 include a liquid crystal display. Note that another type of display, such as an organic EL display, may be adopted as the display 78 without being limited to the liquid crystal display.

The smart device 14 comprises a touch panel display, and the touch panel display is realized by the touch panel 76A and the display 78. That is, the touch panel display is formed by superimposing the touch panel 76A on a display region of the display 78 or by building a touch panel function in the display 78 ("in-cell" type).

The microphone 80 converts a collected sound into an electric signal. The microphone 80 is connected to the bus line 94. The CPU 88 acquires the electric signal obtained by converting the sound collected by the microphone 80 via the bus line 94.

The speaker 82 converts the electric signal into the sound. The speaker 82 is connected to the bus line 94. The speaker 82 receives the electric signal output from the CPU 88 via the bus line 94, converts the received electric signal into the sound, and outputs the sound obtained by converting the electric signal to the outside of the smart device 14.

The imaging apparatus 84 acquires an image showing a subject by imaging the subject. The imaging apparatus 84 is connected to the bus line 94. The image obtained by imaging the subject by the imaging apparatus 84 is acquired by the CPU 88 via the bus line 94. Here, the speaker 82 is integrated with the smart device 14, but the sound output by a separate headphone (including earphones) connected to the smart device 14 by wire or wirelessly may be adopted.

The communication I/F 86 is connected to the base station 20 in the wirelessly communicable manner. The communication I/F 86 is realized by, for example, a device configured by circuits (for example, an ASIC, an FPGA, and/or a PLD). The communication I/F 86 is connected to the bus line 94. The communication I/F 86 controls the exchange of various pieces of information between the CPU 88 and an external device by the wireless communication method via the base station 20. Here, examples of the "external device" include the information processing apparatus 12.

Figure 5:
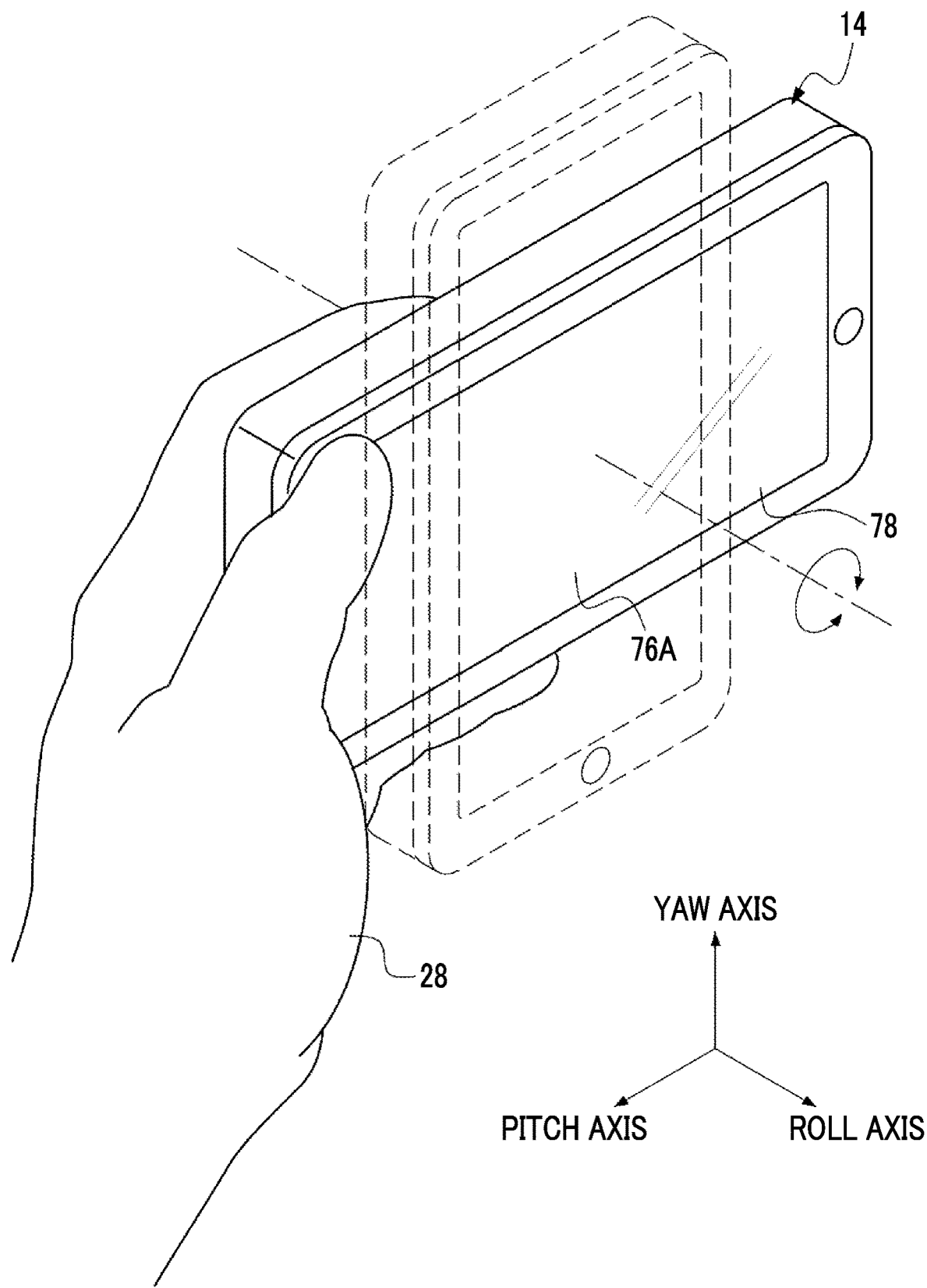
FIG. 5 is a conceptual diagram showing an example of an aspect in which the smart device according to the embodiment is rotated around a roll axis.
Figure 6:
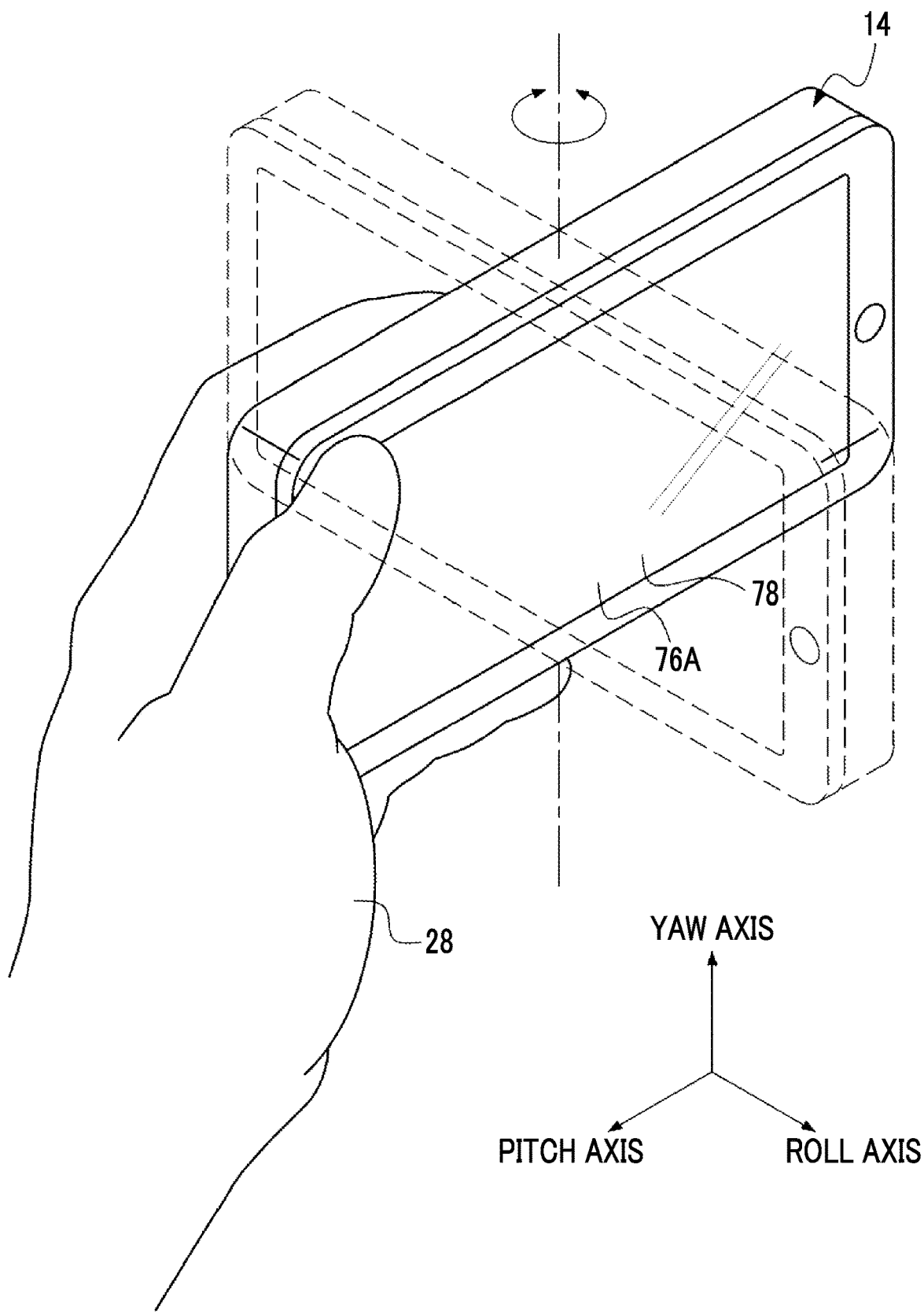
FIG. 6 is a conceptual diagram showing an example of an aspect in which the smart device according to the embodiment is rotated around a yaw axis.
Figure 7:
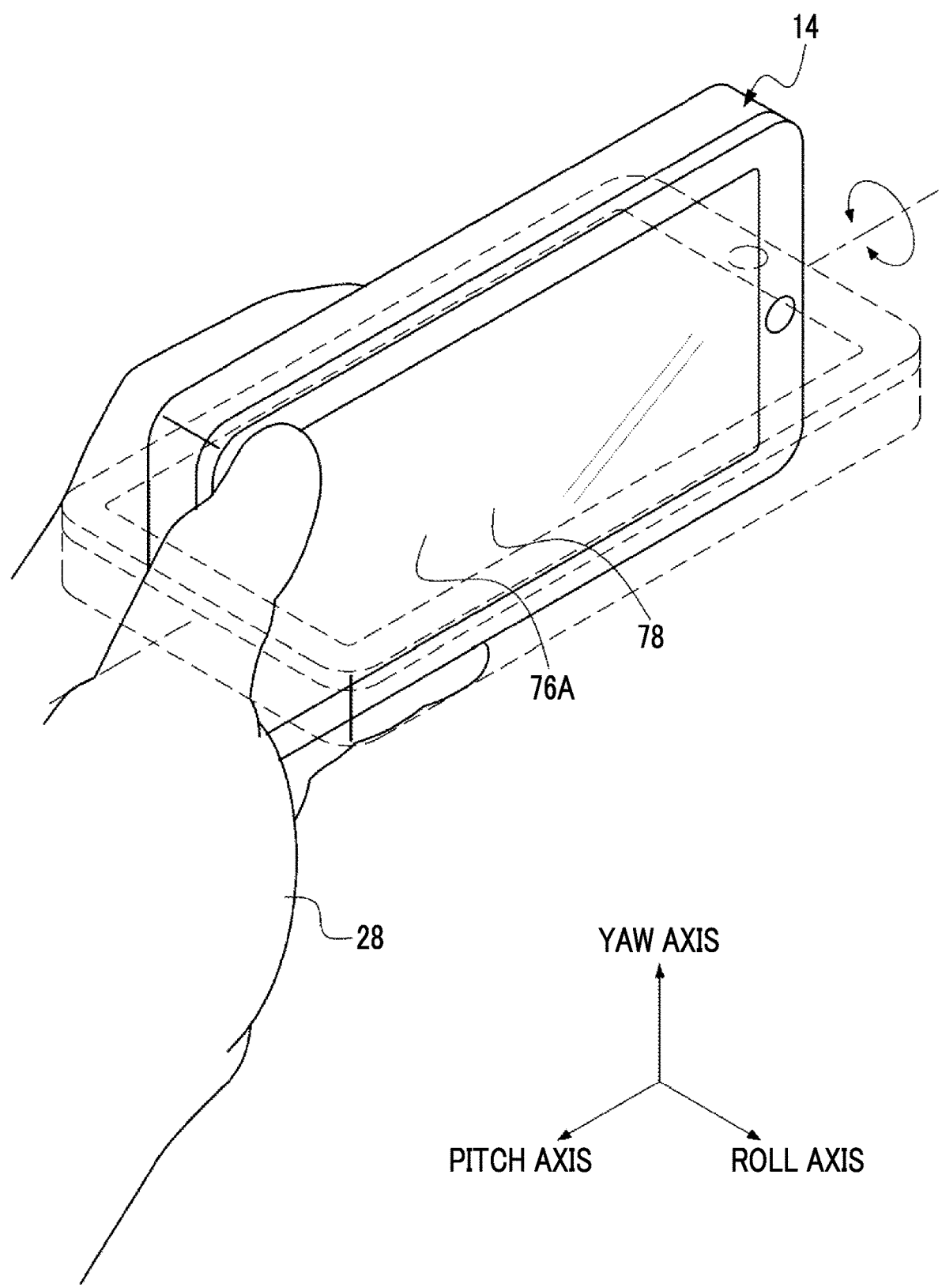
FIG. 7 is a conceptual diagram showing an example of an aspect in which the smart device according to the embodiment is rotated around a pitch axis.

For example, as shown in FIG. 5, the roll axis is an axis that passes through a center of the display 78 of the smart device 14. A rotation angle of the smart device 14 around the roll axis is measured by the gyro sensor 74 as the roll angle. In addition, as shown in FIG. 6, for example, the yaw axis is an axis that passes through a center of a lateral peripheral surface of the smart device 14 in a longitudinal direction of the lateral peripheral surfaces. A rotation angle of the smart device 14 around the yaw axis is measured by the gyro sensor 74 as the yaw angle. Further, as shown in FIG. 7, for example, the pitch axis is an axis that passes through a center of the lateral peripheral surface of the smart device 14 in a lateral direction of the lateral peripheral surfaces. The rotation angle of the smart device 14 around the pitch axis is measured by the gyro sensor 74 as the pitch angle.

Figure 8:
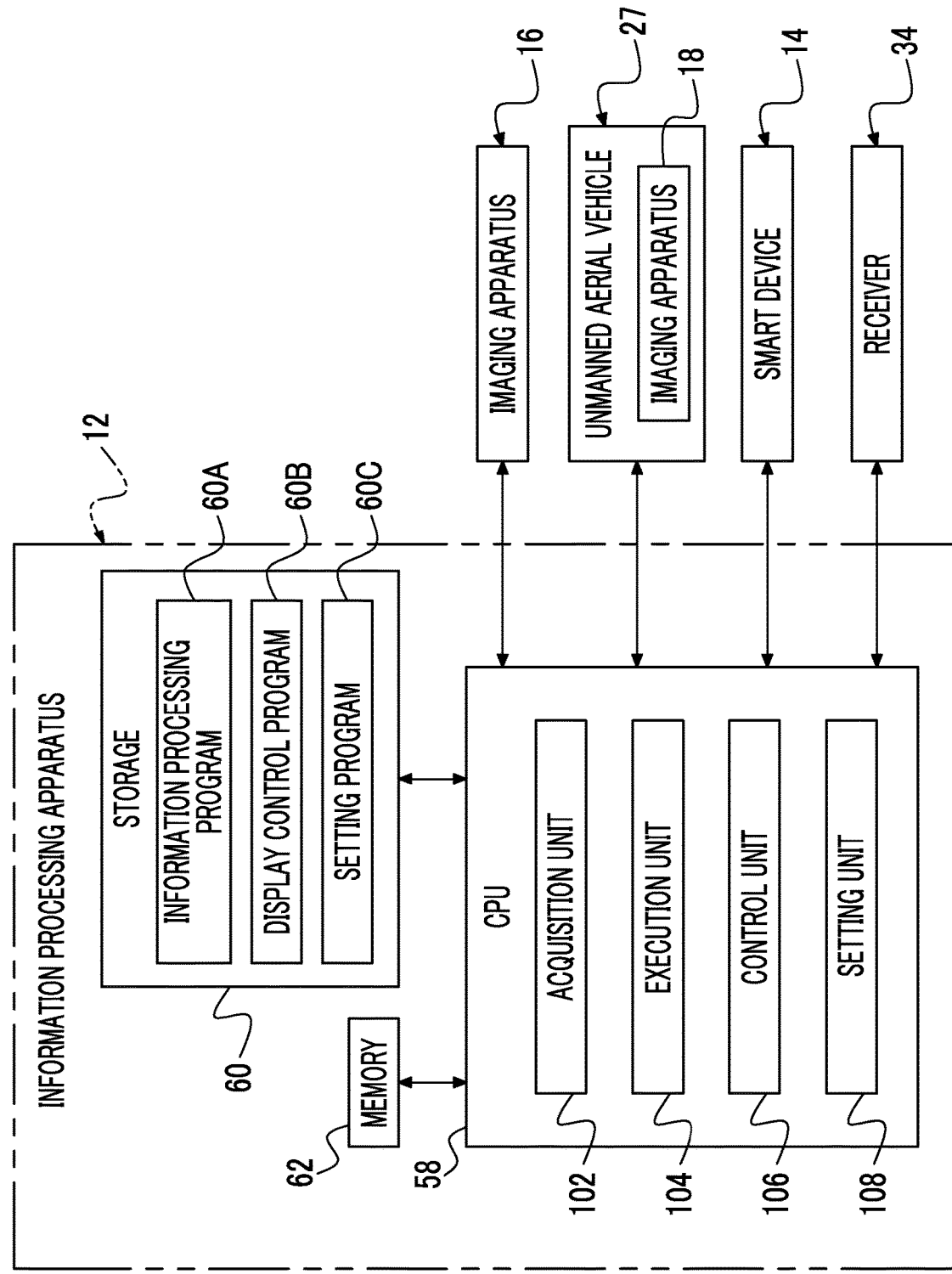
FIG. 8 is a block diagram showing an example of a main function of the information processing apparatus.

For example, as shown in FIG. 8, in the information processing apparatus 12, the storage 60 stores an information processing program 60A, a display control program 60B, and a setting program 60C. Note that, in the following, in a case in which a distinction is not necessary, the information processing program 60A, the display control program 60B, and the setting program 60C are referred to as an "information processing apparatus side program" without reference numeral.

The CPU 58 is an example of a "processor" according to the technology of the present disclosure, and the memory 62 is an example of a "memory" according to the technology of the present disclosure. The CPU 58 reads out the information processing apparatus side program from the storage 60, and expands the readout information processing apparatus side program in the memory 62. The CPU 58 performs the exchange in various pieces of information between the smart device 14, the imaging apparatus 16, and the unmanned aerial vehicle 27 according to the information processing apparatus side program expanded in the memory 62, and performs transmission of various videos to the receiver 34.

The CPU 58 reads out the information processing program 60A from the storage 60, and expands the readout information processing program 60A in the memory 62. The CPU 58 is operated as an acquisition unit 102 and an execution unit 104 according to the information processing program 60A expanded in the memory 62. The CPU 58 is operated as the acquisition unit 102 and the execution unit 104 to execute information processing (see FIG. 21), which will be described below.

The CPU 58 reads out the display control program 60B from the storage 60, and expands the readout display control program 60B in the memory 62. The CPU 58 is operated as a control unit 106 according to the display control program 60B expanded in the memory 62 to execute a display control process (see FIG. 19) described below.

The CPU 58 reads out the setting program 60C from the storage 60, and expands the readout setting program 60C in the memory 62. The CPU 58 is operated as a setting unit 108 according to the setting program 60C expanded in the memory 62. The CPU 58 is operated as the setting unit 108 to execute a setting process (see FIG. 20), which will be described below.

Figure 9:
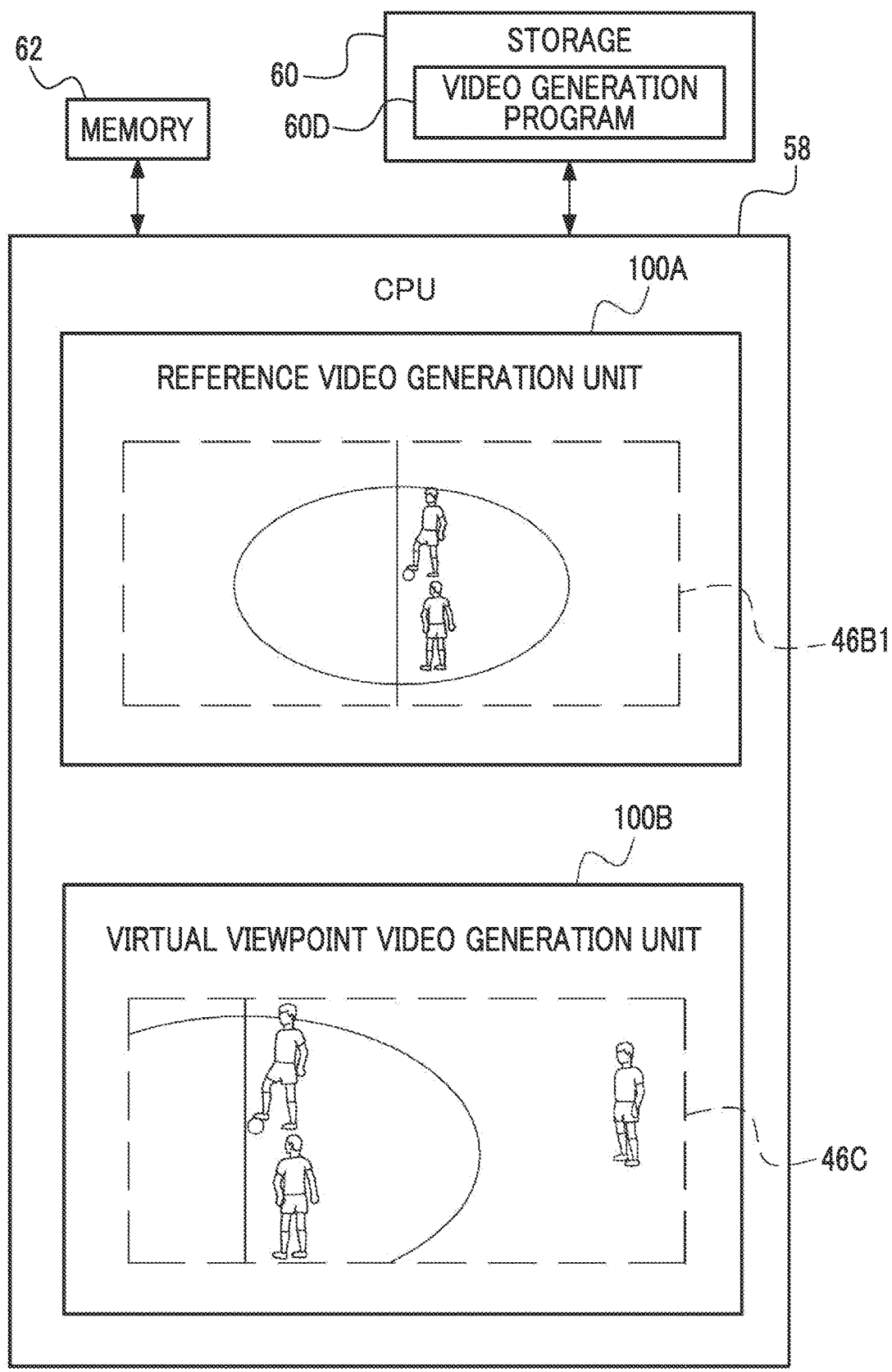
FIG. 9 is a block diagram showing examples of a reference video generation unit and a virtual viewpoint video generation unit realized by a CPU of the information processing apparatus.

For example, as shown in FIG. 9, a video generation program 60D is stored in the storage 60, and the CPU 58 reads out the video generation program 60D from the storage 60 and expands the readout video generation program 60D in the memory 62. The CPU 58 is operated as a reference video generation unit 100A and a virtual viewpoint video generation unit 100B according to the video generation program 60D expanded in the memory 62. The reference video generation unit 100A generates the reference video 46B1, and the virtual viewpoint video generation unit 100B generates the virtual viewpoint video 46C.

Figure 10:
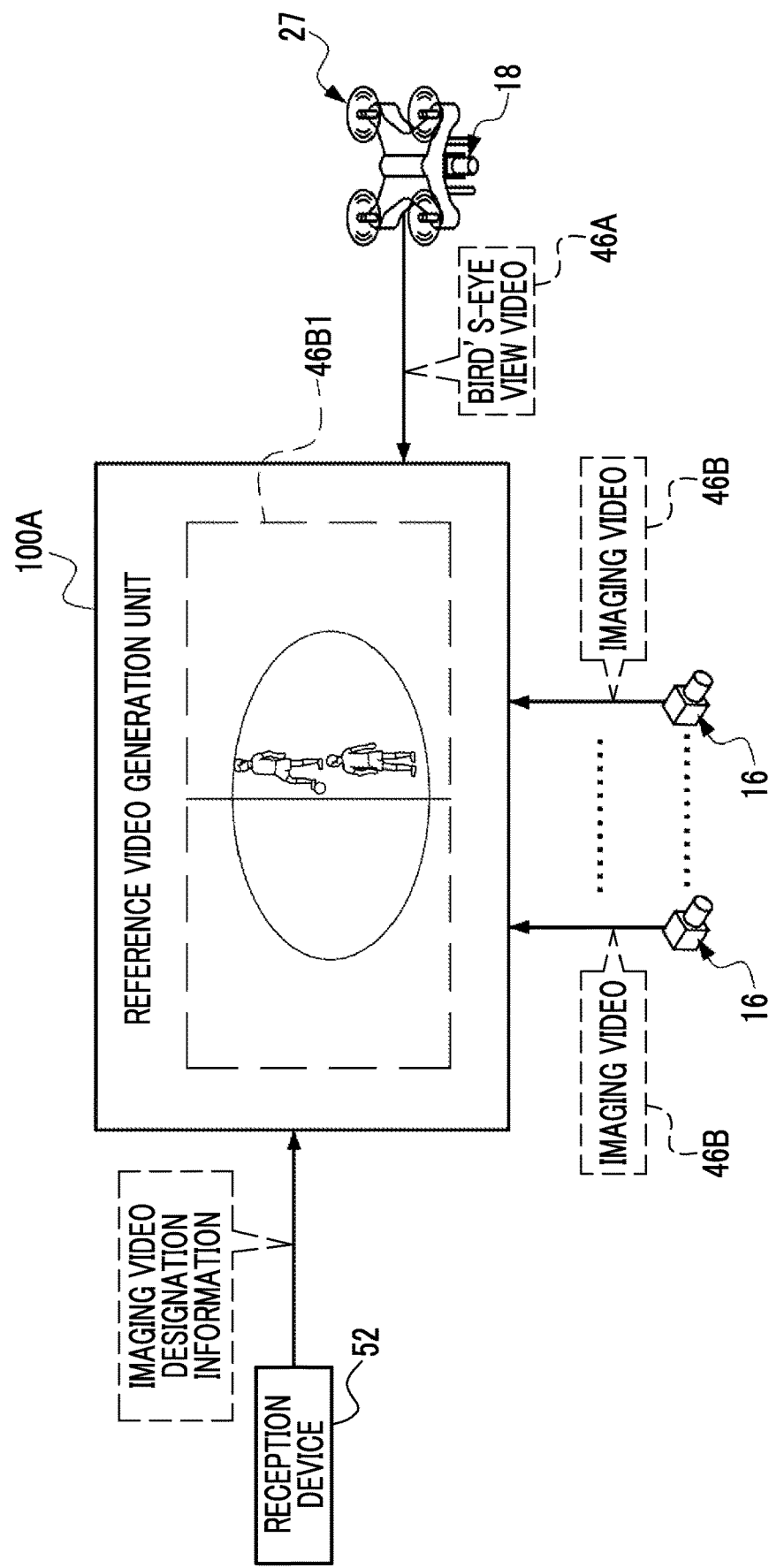
FIG. 10 is a conceptual diagram provided for describing an example of a process content of generation of a reference video.

For example, as shown in FIG. 10, in the information processing apparatus 12, imaging video designation information is received by the reception device 52. The imaging video designation information refers to information for designating one of a plurality of the imaging videos. The imaging video designation information is received by the reception device 52, for example. The reception of the imaging video designation information by the reception device 52 is realized, for example, by operating the reception device 52 by a video creator (not shown). Specifically, in a state in which the plurality of imaging videos 46B are displayed side by side on the display 53 of the information processing apparatus 12, one of the plurality of imaging videos is designated according to the imaging video designation information received by the reception device 52 by the video creator.

The reference video generation unit 100A generates the reference video 46B1 by receiving the plurality of imaging videos from the imaging apparatus 18 and the plurality of imaging apparatuses 16, acquiring the imaging video designated by the imaging video designation information from the received plurality of imaging videos, and performing various pieces of signal processing (for example, known signal processing) on the acquired imaging video 46B. That is, the reference video 46B1 is the video obtained by imaging the imaging region by an imaging apparatus (hereinafter, also referred to as a "reference imaging apparatus") of any of the plurality of imaging apparatuses 16. Here, the "reference video 46B1" is, for example, a live broadcast video, a video imaged in advance, or the like. The live broadcast video or the video imaged in advance is, for example, a video broadcast on a television or distributed on the Internet. Note that, here, the live broadcast video is generated based on the imaging video 46B indicated by imaging video indication information, but it is merely an example, and the imaging video 46B itself designated by the imaging video designation information may be adopted as the reference video 46B1.

Figure 11:
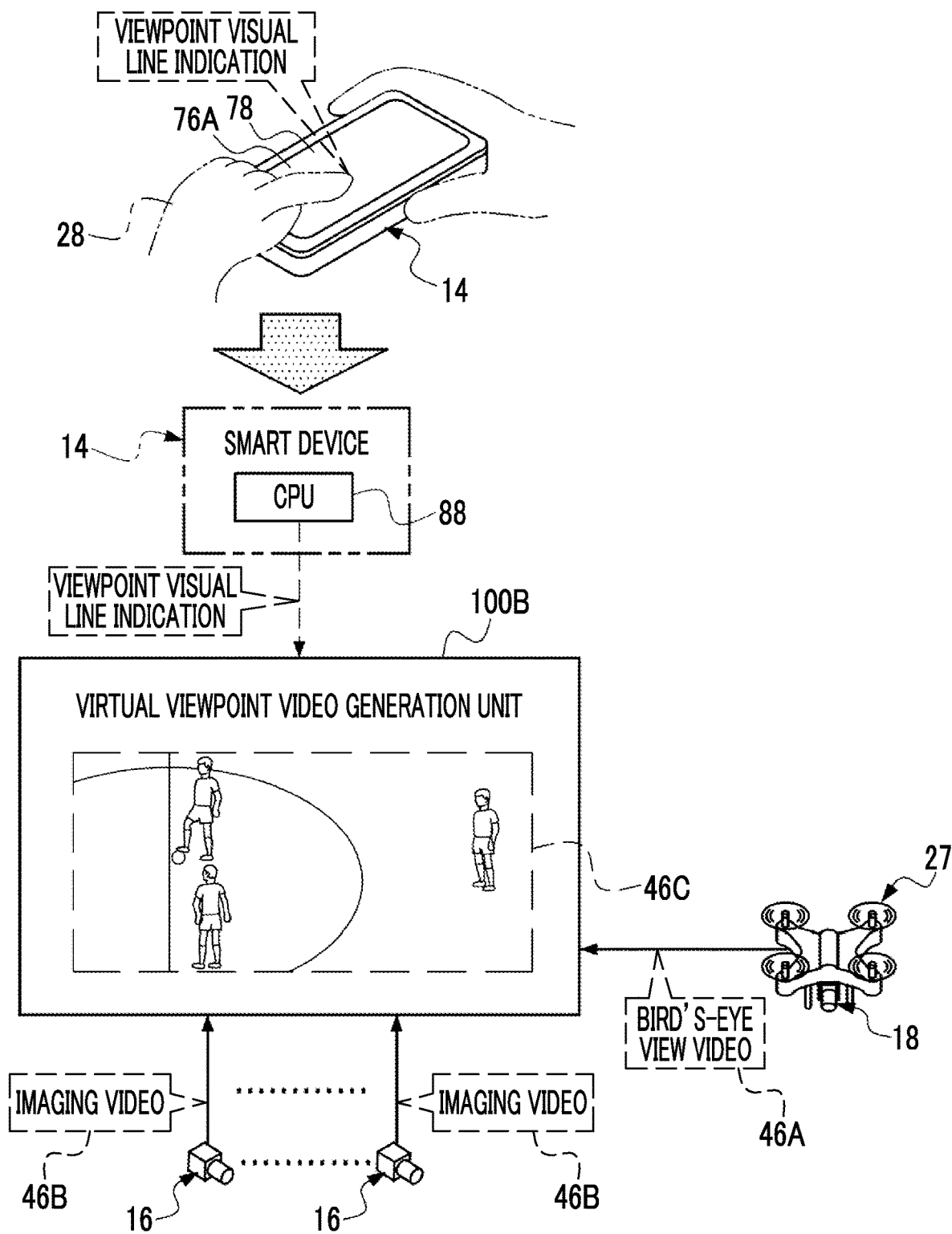
FIG. 11 is a conceptual diagram provided for describing an example of a process content of generation of a virtual viewpoint video.

For example, as shown in FIG. 11, the touch panel 76A of the smart device 14 receives a viewpoint visual line indication. In this case, for example, first, the distribution video from the information processing apparatus 12 is received by the smart device 14. Next, the distribution video received from the information processing apparatus 12 by the smart device 14 is displayed on the display 78. In a state in which the distribution video is displayed on the display 78, the viewpoint visual line indication is received by the touch panel 76A by operating the touch panel 76A by the viewer 28.

The viewpoint visual line indication includes a viewpoint position indication which is an indication of the viewpoint position 42 (see FIG. 2) with respect to the imaging region and a visual line direction indication which is an indication of the visual line direction 44 (see FIG. 2) with respect to the imaging region. In the present embodiment, the viewpoint position indication is first performed, and then the visual line direction indication is performed. That is, first, the viewpoint position 42 is decided, and then the visual line direction 44 is decided.

Examples of the viewpoint position indication include a tap operation on the touch panel 76A. In addition, the tap operation may be a single tap operation or a double tap operation. In addition, instead of the tap operation, a long touch operation may be performed. Examples of the visual line direction indication include a slide operation. Here, the "slide operation" refers to, for example, an operation of linearly sliding the position in which an indicator (for example, a finger of the viewer 28) is in contact with the touch panel 76A. In this manner, the position at which the tap operation is performed on the touch panel 76A corresponds to the viewpoint position 42 with respect to the imaging region, and the direction in which the slide operation is performed on the touch panel 76A corresponds to the visual line direction 44 with respect to the imaging region.

The virtual viewpoint video generation unit 100B generates the virtual viewpoint video 46C by acquiring the viewpoint visual line indication received by the touch panel 76A, and using the plurality of imaging videos in response to the acquired viewpoint visual line indication. That is, the virtual viewpoint video generation unit 100B generates the virtual viewpoint video 46C showing the imaging region in a case in which the imaging region is observed from the viewpoint position 42 in response to the viewpoint position indication and the visual line direction 44 in response to the visual line direction indication. The generation of the virtual viewpoint video 46C is realized, for example, by generating the 3D polygons based on the plurality of imaging videos.

Figure 12:
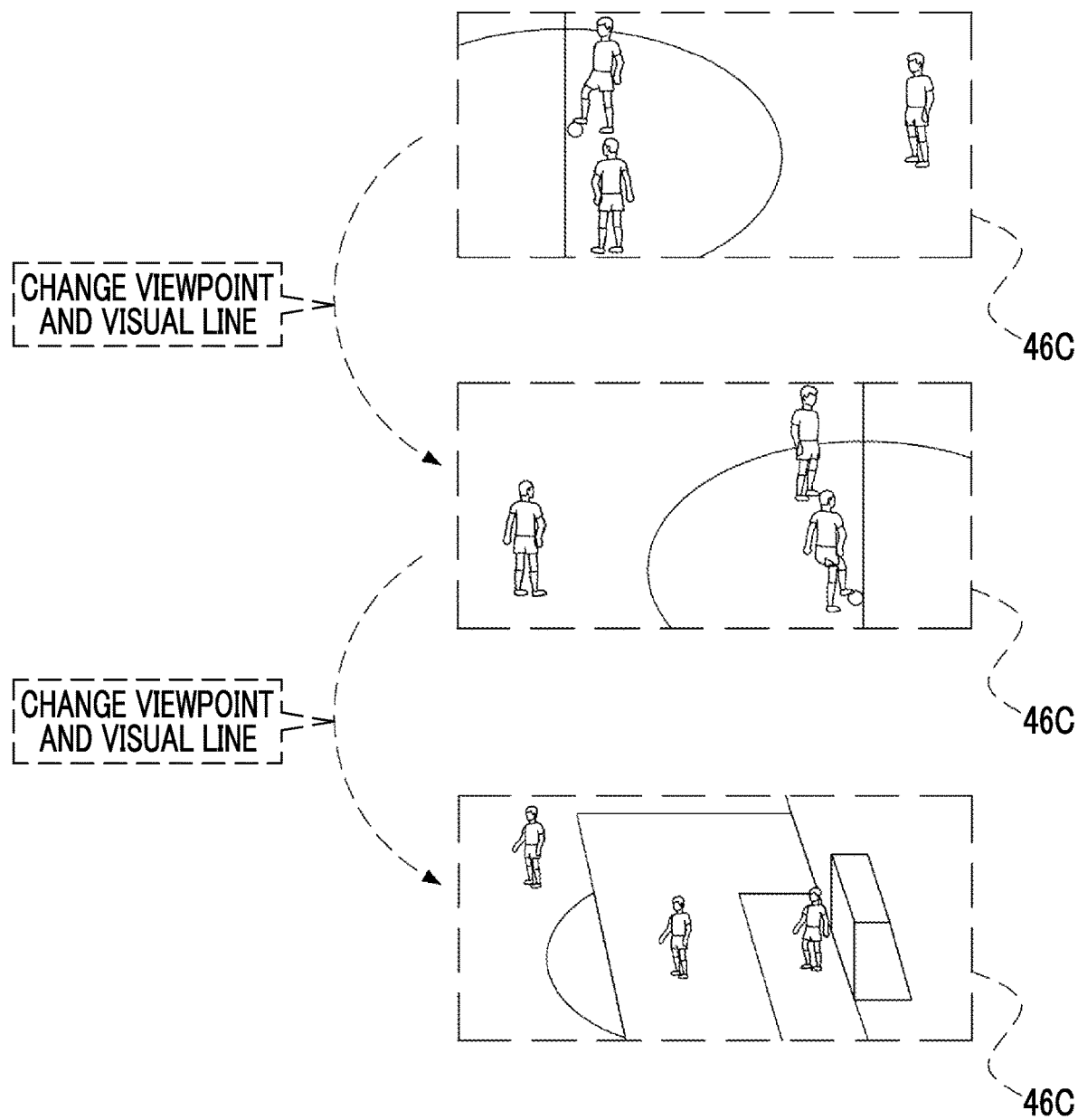
FIG. 12 is a transition diagram showing an example of an aspect in which the virtual viewpoint video is changed with change in a viewpoint position and a visual line direction.

For example, as shown in FIG. 12, in a case in which the viewpoint visual line indication is changed, that is, in a case in which the viewpoint position 42 and the visual line direction 44 are changed, an aspect of the virtual viewpoint video 46C, that is, a size, a direction, and the like of the subject shown in the virtual viewpoint video 46 are changed. Note that the enlargement of the virtual viewpoint video 46C is realized, for example, according to a pinch-out operation on the touch panel 76A of the smart device 14, and the reduction of the virtual viewpoint video 46C is realized, for example, according to a pinch-in operation on the touch panel 76A of the smart device 14.

Figure 13:
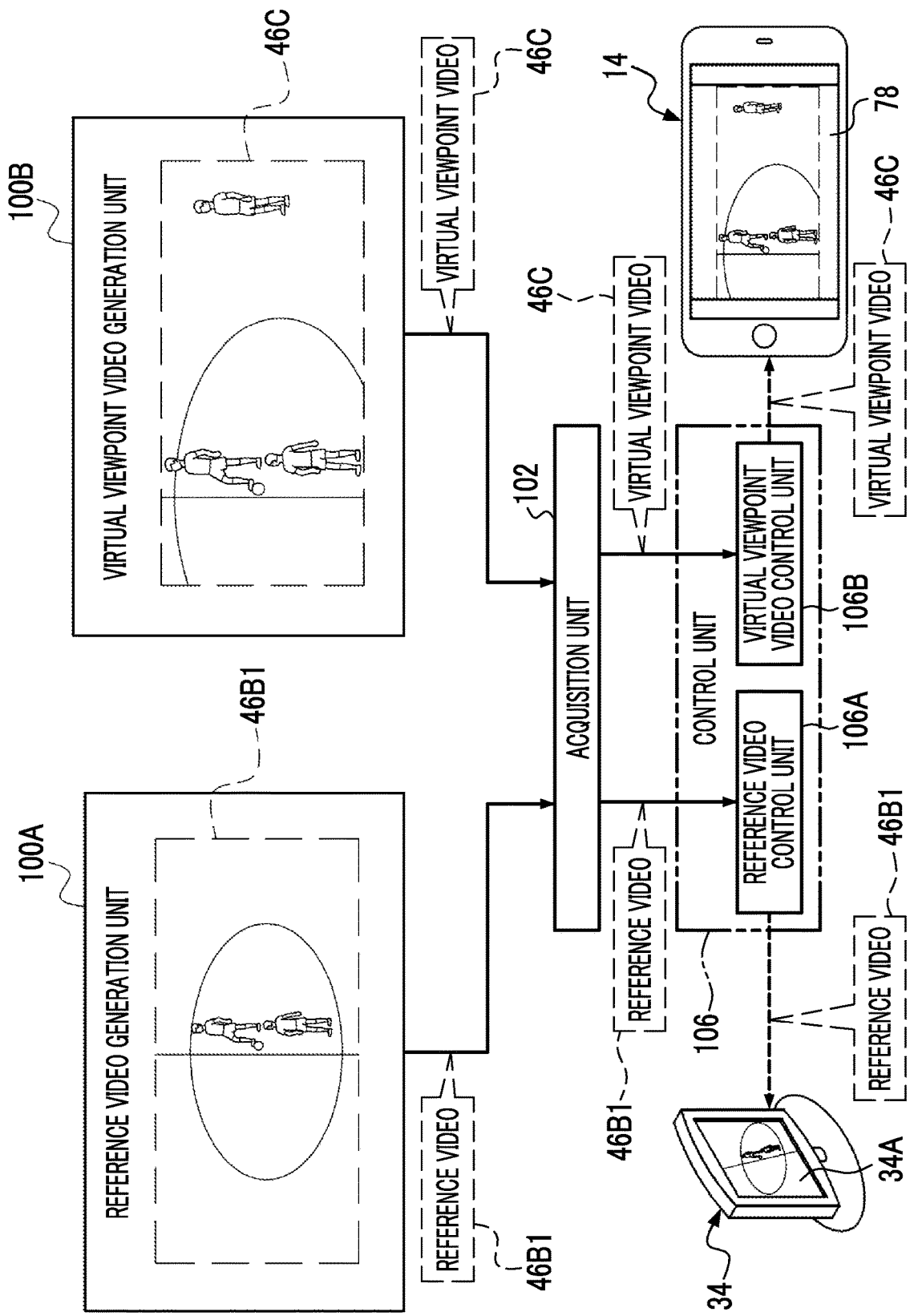
FIG. 13 is a conceptual diagram provided for describing an example of a process content until the reference video is displayed on the receiver and the virtual viewpoint video is displayed on the smart device.

For example, as shown in FIG. 13, the acquisition unit 102 acquires the reference video 46B1 generated by the reference video generation unit 100A from the reference video generation unit 100A. In addition, the acquisition unit 102 acquires the virtual viewpoint video 46C generated by the virtual viewpoint video generation unit 100B from the virtual viewpoint video generation unit 100B.

The control unit 106 includes a reference video control unit 106A and a virtual viewpoint video control unit 106B. The reference video control unit 106A controls the receiver 34 such that the reference video 46B1 is displayed on the screen 34A by transmitting the reference video 46B1 acquired by the acquisition unit 102 to the receiver 34, which is a display device different from the display 78 of the smart device 14. That is, the receiver 34 receives the reference video 46B1 transmitted from the reference video control unit 106A, and displays the received reference video 46B1 on the screen 34A.

The virtual viewpoint video control unit 106B controls the smart device 14 such that the virtual viewpoint video 46C is displayed on the display 78 by transmitting the virtual viewpoint video 46C acquired by the acquisition unit 102 to the smart device 14. That is, the smart device 14 receives the virtual viewpoint video 46C transmitted from the virtual viewpoint video control unit 106B, and displays the received virtual viewpoint video 46C on the display 78.

Figure 14:
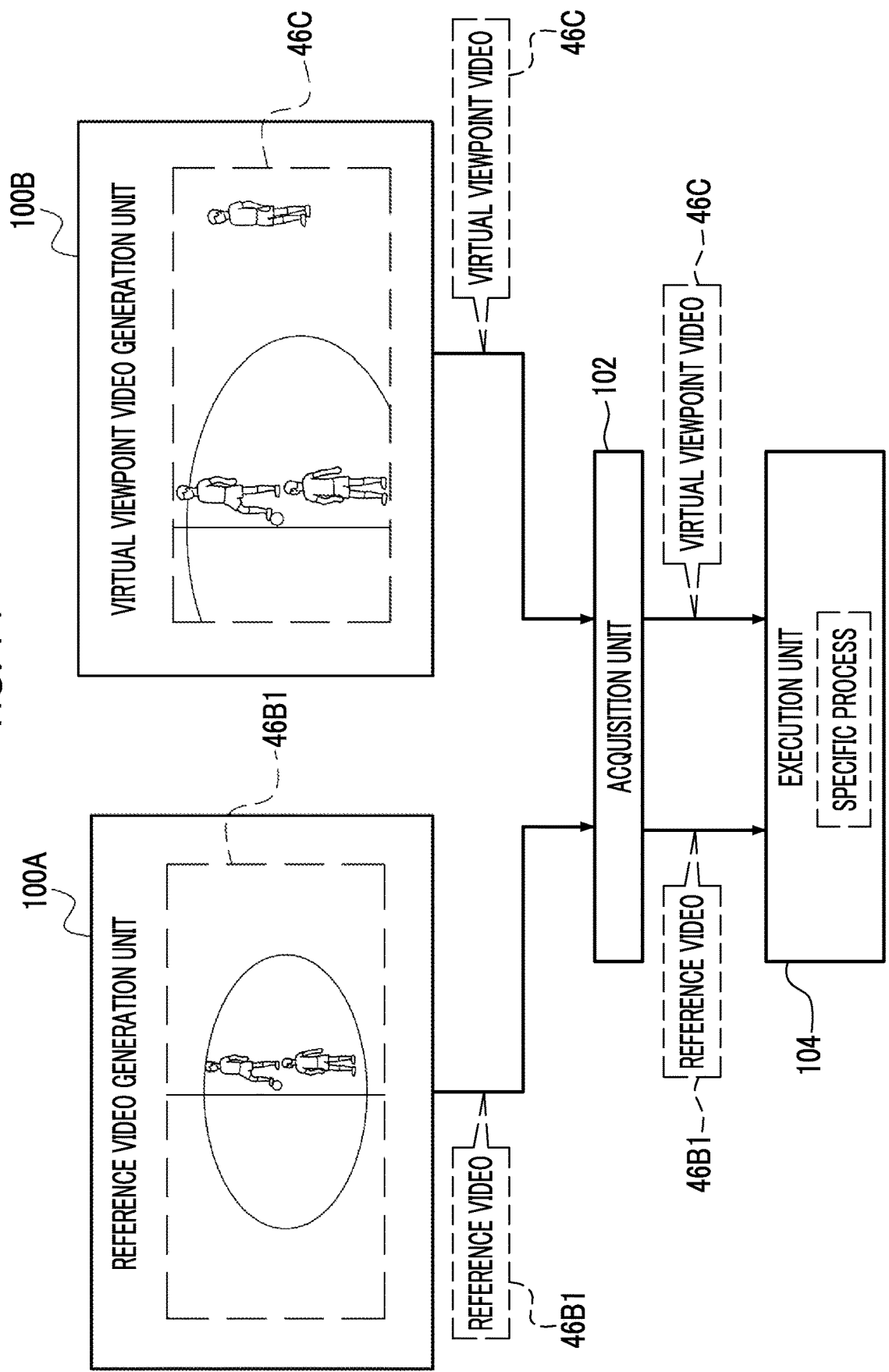
FIG. 14 is a conceptual diagram showing an example of a relationship between the reference video generation unit, the virtual viewpoint video generation unit, an acquisition unit, and an execution unit.

For example, as shown in FIG. 14, the execution unit 104 executes a specific process based on the reference video 46B1 acquired by the acquisition unit 102 and the virtual viewpoint video 46C acquired by the acquisition unit 102. Here, the specific process is a process performed in a case in which a difference degree between the reference video 46B1 acquired by the acquisition unit 102 and the virtual viewpoint video 46C acquired by the acquisition unit 102 (hereinafter, simply referred to as the "difference degree") is equal to or more than a first threshold value. Examples of the specific process include a process that contributes to setting of the difference degree to be less than the first threshold value. In addition, the execution unit 104 executes the specific process depending on the change in the virtual viewpoint video 46C. That is, the execution unit 104 executes the specific process while following the change in the virtual viewpoint video 46C.

Figure 15:
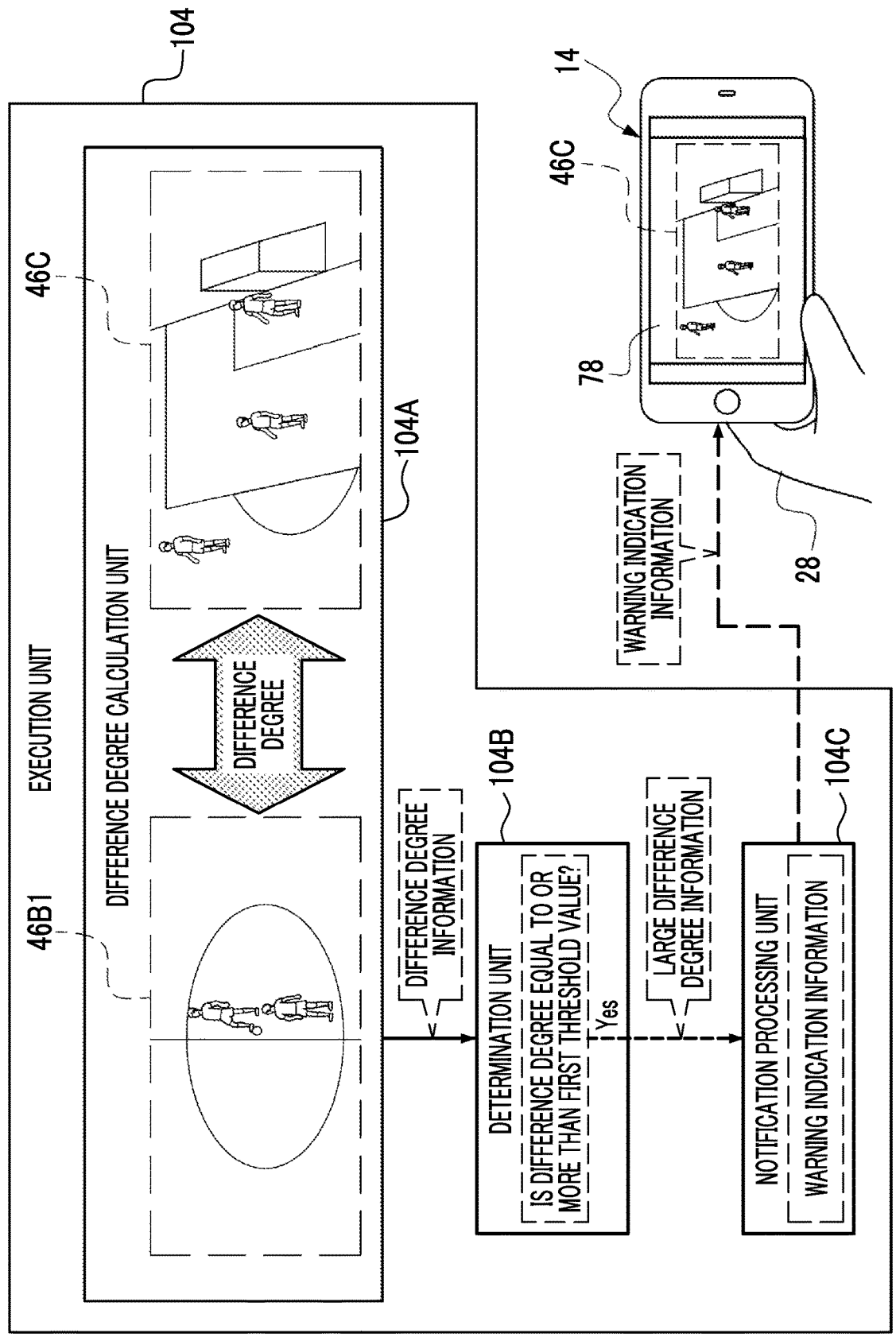
FIG. 15 is a conceptual diagram provided for describing an example of a process content of the execution unit.

For example, as shown in FIG. 15, the execution unit 104 includes a difference degree calculation unit 104A, a determination unit 104B, and a notification processing unit 104C. The difference degree calculation unit 104A calculates the difference degree between the reference video 46B1 acquired by the acquisition unit 102 and the virtual viewpoint video 46C acquired by the acquisition unit 102. The difference degree refers to, for example, a degree of difference between the reference video 46B1 and the virtual viewpoint video 46C. The calculation of the difference degree is realized, for example, by comparing the feature amounts obtained by performing pattern matching or Fourier transform.

The difference degree calculation unit 104A outputs difference degree information indicating the calculated difference degree to the determination unit 104B. The determination unit 104B determines whether or not the difference degree indicated by the difference degree information input from the difference degree calculation unit 104A is equal to or more than the first threshold value. Examples of a case in which the difference degree is equal to or more than the first threshold value include a case in which the match location between the reference video 46B1 and the virtual viewpoint video 46C is less than 30%.

Note that in the present embodiment, as the first threshold value, a fixed value derived in advance by a sensory test and/or a computer simulation or the like is adopted. The first threshold value does not have to be the fixed value, and may be, for example, a variable value that is changed in response to the instructions received by the reception device 52 (see FIG. 2) and/or the reception device 76.

The determination unit 104B compares the difference degree with the first threshold value, and in a case in which the difference degree is equal to or more than the first threshold value, outputs large difference degree information indicating that the difference degree is equal to or more than the first threshold value to the notification processing unit 104C. Alternatively, the determination unit 104B compares the difference degree with the first threshold value, and in a case in which the difference degree is less than the first threshold value, does not output the large difference degree information and waits for input of the difference degree information from the difference degree calculation unit 104A.

When the large difference degree information is input from the determination unit 104B, the notification processing unit 104C executes a process including a notification process as the specific process described above. Here, the "notification process" refers to a process of giving notification that the difference degree is equal to or more than the first threshold value. A notification destination is, for example, the viewer 28. The notification process is realized by transmitting warning indication information to the smart device 14 by the notification processing unit 104C. Here, the warning indication information refers to information for instructing the smart device 14 to give a warning to the viewer 28 that the difference degree is equal to or more than the first threshold value. In the example shown in FIG. 15, an aspect is described in which the warning indication information is input to the smart device 14 in a state in which the virtual viewpoint video 46C is displayed on the display 78 of the smart device 14.

Figure 16:
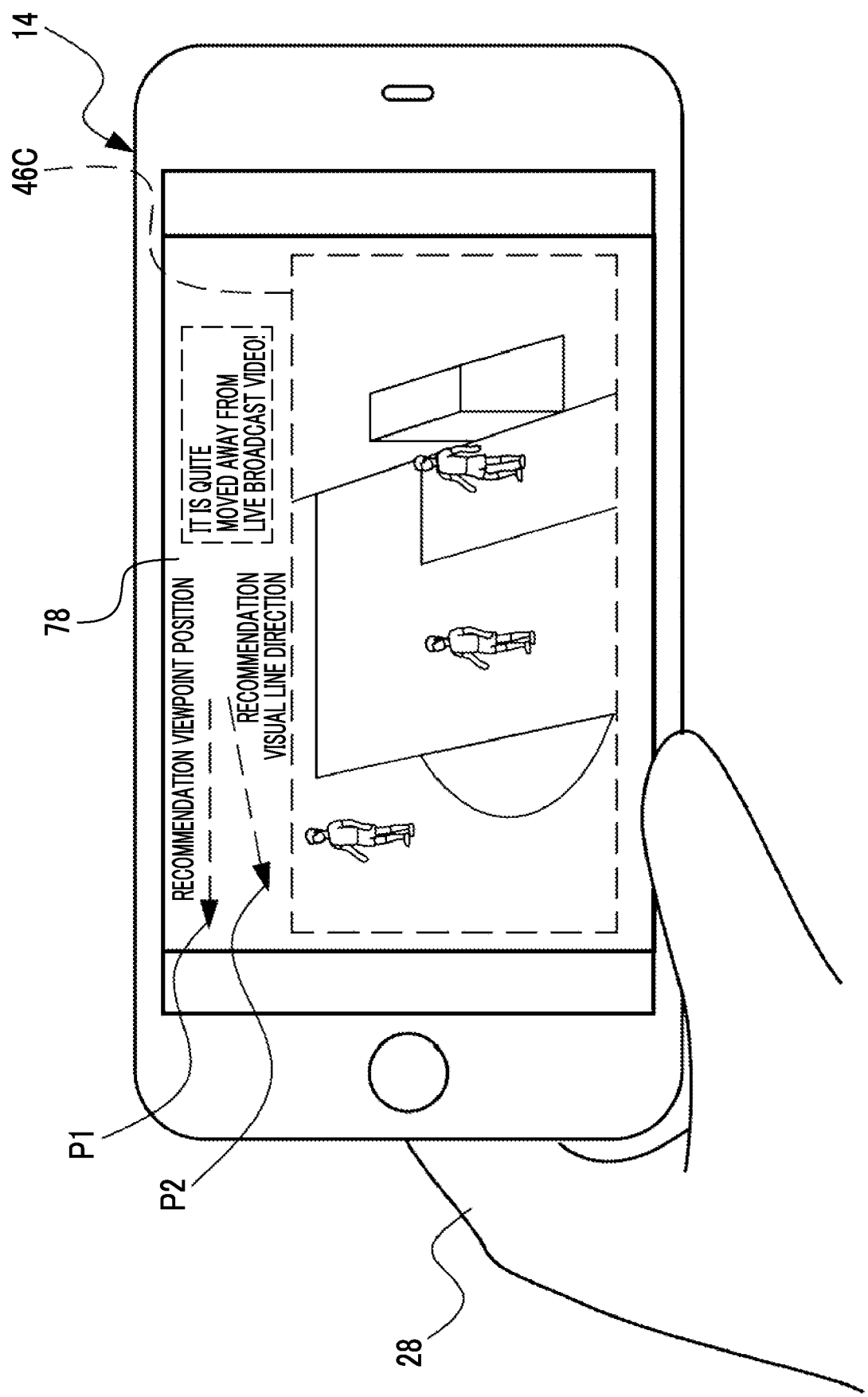
FIG. 16 is a conceptual diagram showing an example of an aspect in which a warning message or the like is displayed together with the virtual viewpoint video on a display of the smart device.

For example, as shown in FIG. 16, in a case in which the warning indication information is input to the smart device 14, under the control of the CPU 88, a warning message is displayed in a state in which the virtual viewpoint video 46C is displayed on the display 78 and the warning message is parallel to the virtual viewpoint video 46C. Note that the display of the warning message on the display 78 is an example of "visible notification" according to the technology of the present disclosure.

In the example shown in FIG. 16, a message "It is quite moved away from the live broadcast video!" is shown as the warning message. Note that the warning message may be a message other than the above, for example, a message such as "Currently, a video completely different from the live broadcast video is being displayed." or "Since a video completely different from the live broadcast video is being displayed, in a case in which you desires to bring the currently displayed video closer to the live broadcast video, please newly indicate of the viewpoint position and the visual line direction." may be used. That is, the message need only be the message that allows the viewer 28 to visually recognize that the difference degree between the video (in the example shown in FIG. 16, the virtual viewpoint video 46C) that is currently visually recognized by the viewer 28 via the display 78 of the smart device 14 and the reference video 46B1 (for example, the live broadcast video) displayed on the screen 34A of the receiver 34 is equal to or more than the first threshold value.

In addition, in the example shown in FIG. 16, recommendation viewpoint position information and a recommendation visual line direction information are displayed on the display 78 together with the warning message. The recommendation viewpoint position refers to the viewpoint position 42 required to reduce the difference degree. The recommendation visual line direction refers to the visual line direction 44 required to reduce the difference degree. In the example shown in FIG. 16, information including an arrow P1 indicating the recommendation viewpoint position and a guide message "recommendation viewpoint position" is shown as the recommendation viewpoint position information, and information including an arrow P2 indicating the recommendation visual line direction and a guide message "recommendation visual line direction" is shown as the recommendation visual line direction information. The viewer 28 moves the screen by performing the slide operation, a flick operation, or the like on the touch panel 76A to adjust the viewpoint position 42.

Note that the CPU 88 of the smart device 14 may control the recommendation viewpoint position information such that the arrow P1 is shorter as the viewpoint position 42 approaches the recommendation viewpoint position and the arrow P1 is longer as the viewpoint position 42 is moved away from the recommendation viewpoint position. The CPU 88 may also change the direction of the arrow P2 depending on the difference degree between the current visual line direction 44 and the recommendation visual line direction.

In addition, here, although the aspect example has been described in which the message is displayed on the display 78, the visible notification that the difference degree is equal to or more than the first threshold value may be given by turning on a specific light source (not shown) having a predetermined color (for example, red). In addition, the recommendation viewpoint position and the recommendation visual line direction may be visually recognized by the viewer 28 by selectively turning on and off the light source having a plurality of colors (for example, a green light source and a yellow light source) and lengthening or shortening a turning-on/off interval.

In addition, examples of a unit that allows the viewer 28 to perceive the information corresponding to the warning message described above, the recommendation viewpoint position information, and/or the recommendation visual line direction information include a voice reproduction device and/or a vibrator. In this case, for example, the viewer 28 perceives the information corresponding to the warning message, the recommendation viewpoint position information, and/or the recommendation visual line direction information by audible notification by a voice by using the voice reproduction device and/or tactile notification by using the vibrator. The audible notification by the voice may be audible notification by a bone conduction method. The tactile notification by using the vibrator is realized, for example, by changing a vibration pattern (for example, a vibration cycle and an amplitude) by the vibrator. As described above, the information corresponding to the warning message described above, the recommendation viewpoint position information, and/or the recommendation visual line direction information need only be perceived by the viewer 28 by the visible notification by the display 78 or the like, the audible notification by using the voice reproduction device, and/or the tactile notification by the vibrator or the like.

Figure 17:
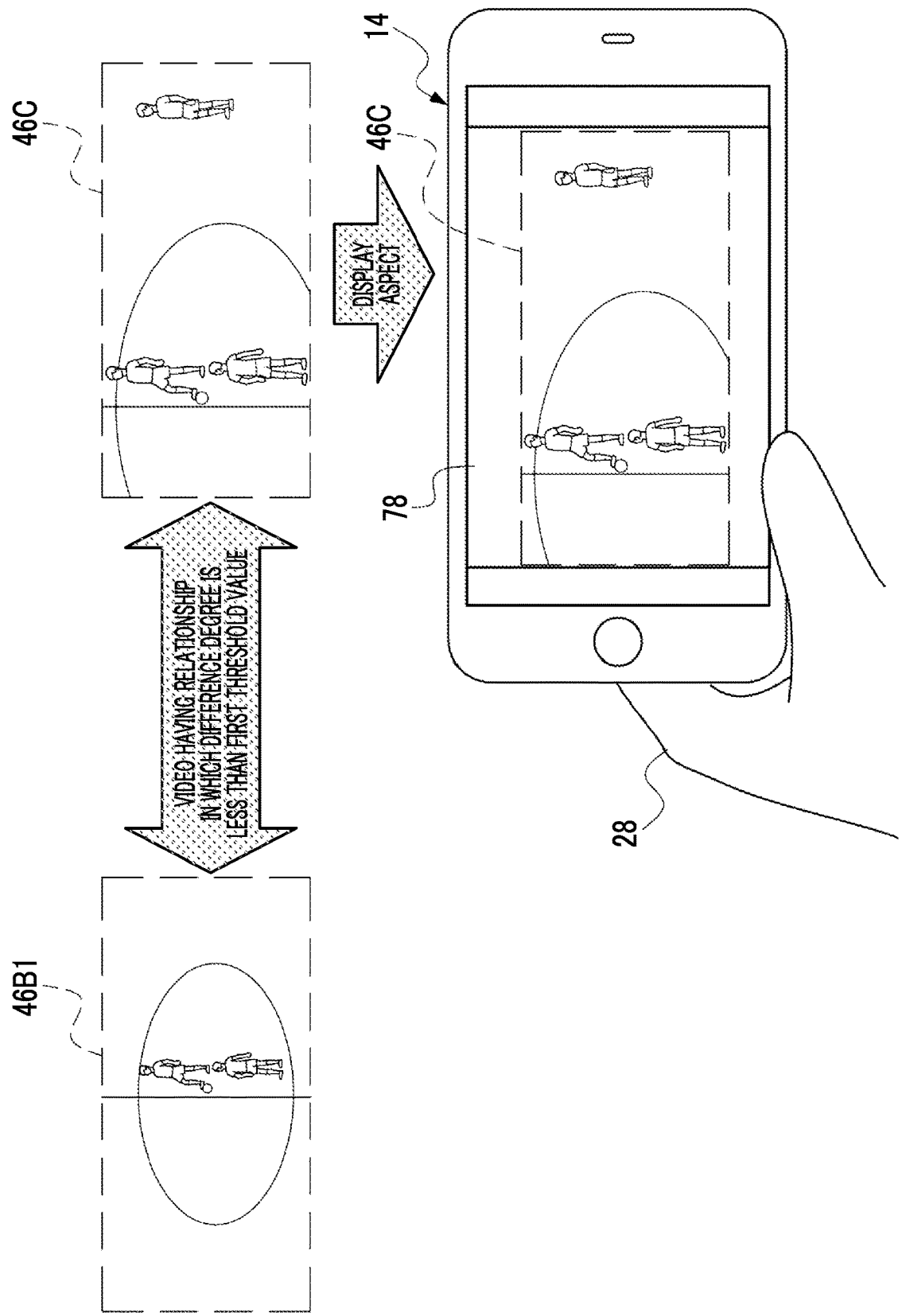
FIG. 17 is a screen view showing an example of the virtual viewpoint video displayed on the display of the smart device in a case in which a difference degree is less than a first threshold value.

The determination unit 104B compares the difference degree with the first threshold value, and in a case in which the difference degree is less than the first threshold value, does not output the large difference degree information. Therefore, as shown in FIG. 17, the virtual viewpoint video 46C is displayed on the display 78 of the smart device 14 under the control of the CPU 88, but the warning message, the recommendation viewpoint position information, and the recommendation visual line direction information are not displayed.

Figure 18:
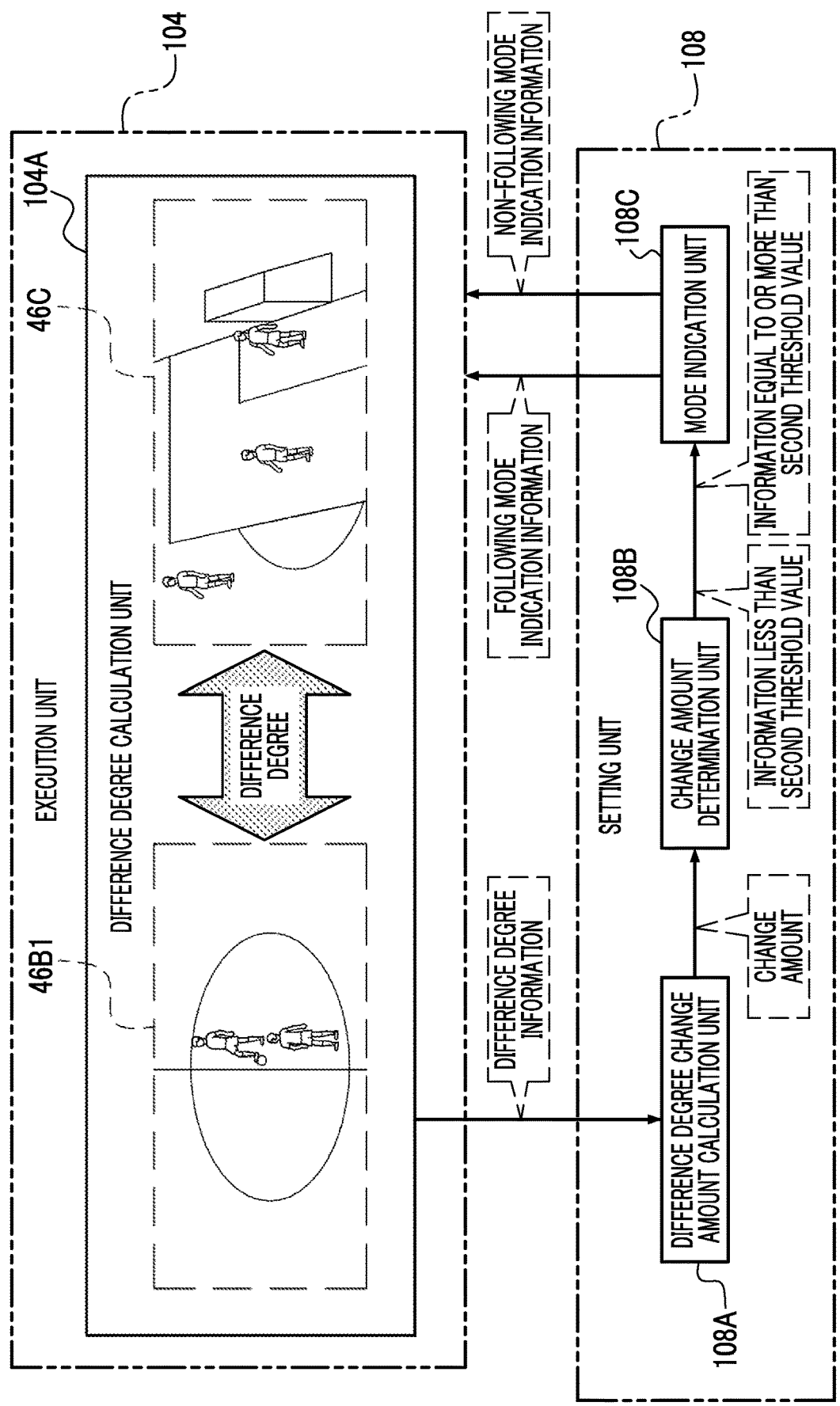
FIG. 18 is a conceptual diagram provided for describing an example of a process content of a setting unit.

For example, as shown in FIG. 18, the setting unit 108 includes a difference degree change amount calculation unit 108A, a change amount determination unit 108B, and a mode indication unit 108C. The setting unit 108 selectively sets a following mode and a non-following mode. The following mode refers to an operation mode in which the execution unit 104 executes the notification process while following the change in the virtual viewpoint video 46C, and the non-following mode refers to an operation mode in which the execution unit 104 does not execute the notification process while following the change in the virtual viewpoint video 46C.

The difference degree change amount calculation unit 108A acquires the difference degree information from the difference degree calculation unit 104A. That is, the difference degree information is acquired in synchronization with an acquisition timing of the difference degree information by the determination unit 104B (see FIG. 15), and the change amount of the difference degree is calculated based on the acquired difference degree information. Specifically, the difference degree change amount calculation unit 108A first acquires the difference degree information at different timings. Here, in a case in which N is an integer of 1 or more, the different timings refer to, for example, an Nth acquisition timing and an N+1th acquisition timing. Next, the difference degree change amount calculation unit 108A calculates the change amount of the difference degree indicated by the difference degree information acquired at the Nth acquisition timing to the difference degree indicated by the difference degree information acquired at the N+1th acquisition timing. Here, examples of the "change amount" include an absolute value of the difference between the difference degree indicated by the difference degree information acquired at the Nth acquisition timing and the difference degree indicated by the difference degree information acquired at the N+1th acquisition timing. Note that instead of the absolute value of the difference, a ratio of the difference degree indicated by the difference degree information acquired at the N+1th acquisition timing to the difference degree indicated by the difference degree information acquired at the Nth acquisition timing may be used, or any information may be used as long as the information indicates the change amount of the difference degree.

The change amount determination unit 108B determines whether or not the change amount calculated by the difference degree change amount calculation unit 108A is less than a second threshold value. Note that in the present embodiment, as the second threshold value, a fixed value derived in advance by a sensory test and/or a computer simulation or the like is adopted. The second threshold value does not have to be the fixed value, and may be, for example, a variable value that is changed in response to the instructions received by the reception device 52 (see FIG. 2) and/or the reception device 76.

The change amount determination unit 108B outputs the information indicating that the change amount is less than the second threshold value to the mode indication unit 108C in a case in which the change amount calculated by the difference degree change amount calculation unit 108A is less than the second threshold value. In addition, the change amount determination unit 108B outputs the information indicating that the change amount is equal to or more than the second threshold value to the mode indication unit 108C in a case in which the change amount calculated by the difference degree change amount calculation unit 108A is equal to or more than the second threshold value.

The mode indication unit 108C outputs following mode indication information for indicating the following mode as the operation mode of the execution unit 104 in a case in which the information indicating that the change amount is less than the second threshold value is input from the change amount determination unit 108B. The mode indication unit 108C outputs non-following mode indication information for indicating the non-following mode as the operation mode of the execution unit 104 in a case in which the information indicating that the change amount is equal to or more than the second threshold value is input from the change amount determination unit 108B. In a case in which the following mode indication information is input from the mode indication unit 108C, the execution unit 104 is operated in the following mode as indicated by the following mode indication information. In a case in which the non-following mode indication information is input from the mode indication unit 108C, the execution unit 104 is operated in the non-following mode as indicated by the non-following mode indication information.

In this way, the setting unit 108 sets the following mode as the operation mode of the execution unit 104 in a case in which the change amount of the difference degree is less than the second threshold value, and sets the non-following mode as the operation mode of the execution unit 104 in a case in which the change amount of the difference degree is equal to or more than the second threshold value.

Next, an operation of the information processing system 10 will be described.

First, an example of a flow of the display control process executed by the CPU 58 of the information processing apparatus 12 will be described with reference to FIG. 19. Note that, here, for convenience of description, the description will be made on the premise that the reference video 46B1 is already generated by the reference video generation unit 100A and the virtual viewpoint video 46C is already generated by the virtual viewpoint video generation unit 100B.

Figure 19:
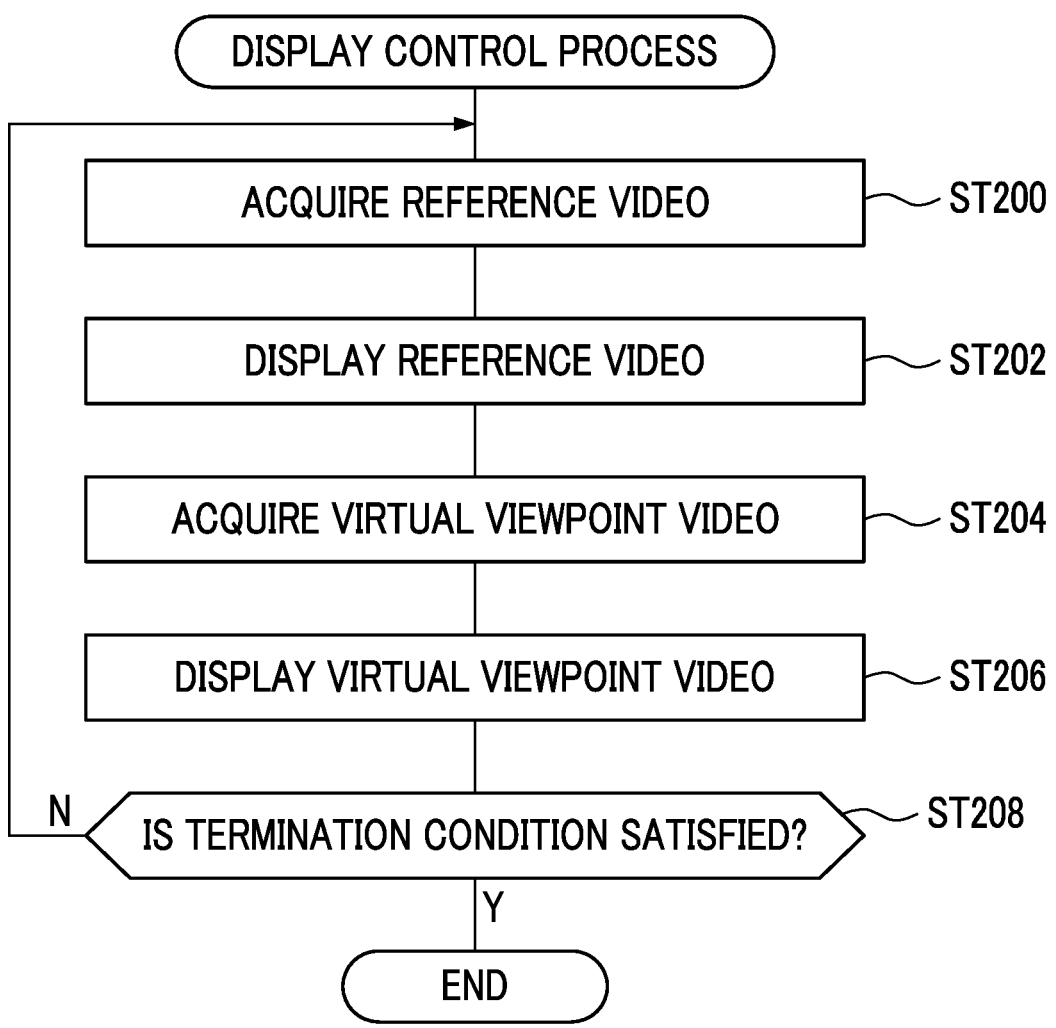
FIG. 19 is a flowchart showing an example of a flow of a display control process.

In the display control process shown in FIG. 19, first, in step ST200, the acquisition unit 102 acquires the reference video 46B1 generated by the reference video generation unit 100A from the reference video generation unit 100A, and then the display control process proceeds to step ST202.

In step ST202, the reference video control unit 106A displays the reference video 46B1 on the receiver 34 by transmitting the reference video 46B1 acquired in step ST200 to the receiver 34. That is, the receiver 34 receives the reference video 46B1, and displays the received reference video 46B1 on the screen 34A.

In subsequent step ST204, the acquisition unit 102 acquires the virtual viewpoint video 46C generated by the virtual viewpoint video generation unit 100B from the virtual viewpoint video generation unit 100B, and then the display control process proceeds to step ST206.

In step ST206, the virtual viewpoint video control unit 106B displays the virtual viewpoint video 46C on the smart device 14 by transmitting the virtual viewpoint video 46C acquired in step ST204 to the smart device 14. That is, the smart device 14 receives the virtual viewpoint video 46C, and displays the received virtual viewpoint video 46C on the display 78.

In subsequent step ST208, the control unit 106 determines whether or not a condition for terminating the display control process (hereinafter, referred to as a "display control process termination condition") is satisfied. Examples of the display control process termination condition include a condition that an instruction for terminating the display control process is received by the reception device 52 or 76. In a case in which the display control process termination condition is not satisfied in step ST208, a negative determination is made, and the display control process proceeds to step ST200. In a case in which the display control process termination condition is satisfied in step ST208, a positive determination is made, and the display control process is terminated.

Next, an example of a flow of the setting process executed by the CPU 58 of the information processing apparatus 12 will be described with reference to FIG. 20. Note that, here, for convenience of description, the description will be made on the premise that the difference degree is calculated by the difference degree calculation unit 104A, and the calculated difference degree information is output in synchronization with the determination unit 104B and the difference degree change amount calculation unit 108A.

Figure 20:
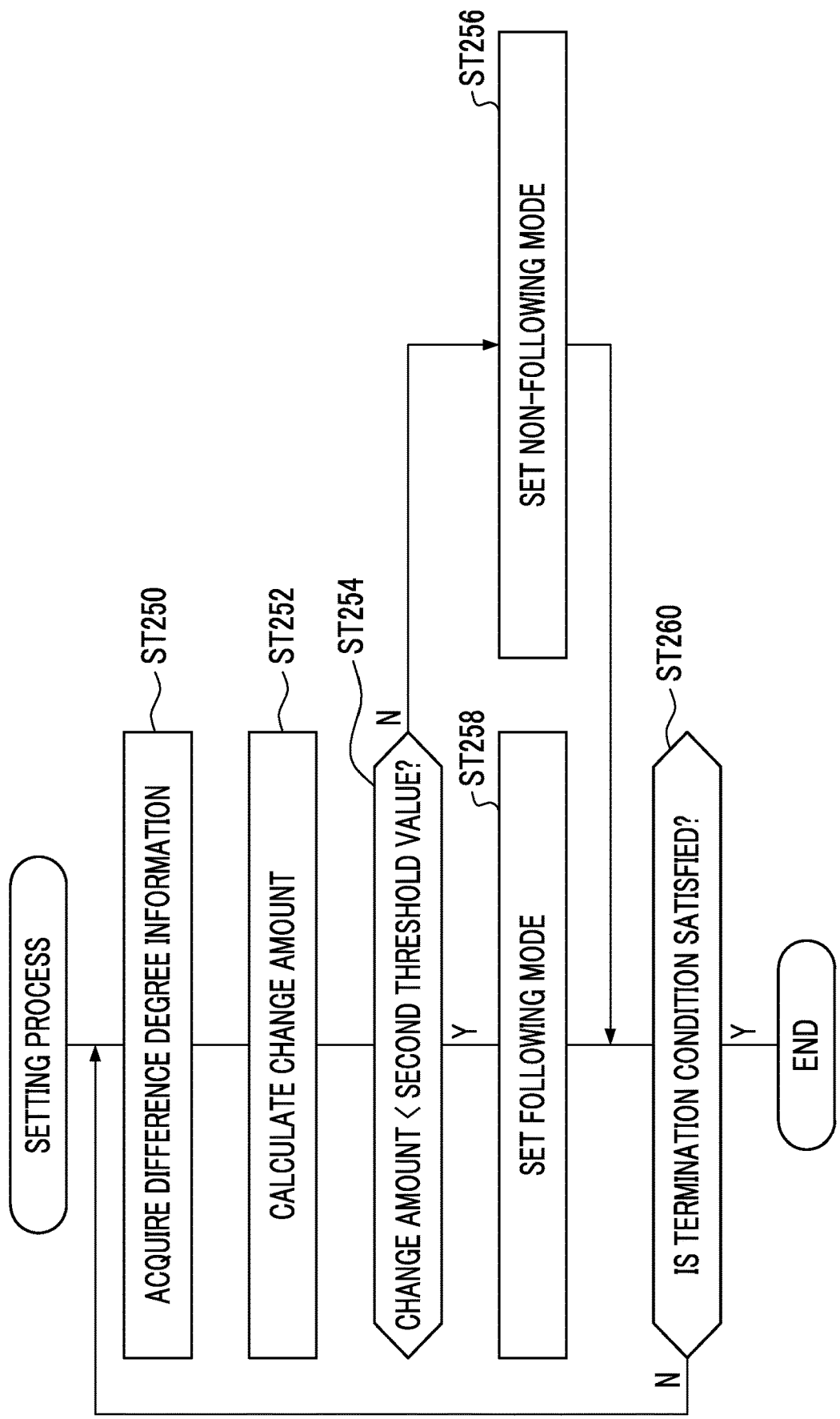
FIG. 20 is a flowchart showing an example of a flow of a setting process.

In the setting process shown in FIG. 20, first, in step ST250, the difference degree change amount calculation unit 108A acquires the difference degree information from the difference degree calculation unit 104A at different timings, and then the setting process proceeds to step ST252.

In step ST252, the difference degree change amount calculation unit 108A calculates the change amount for each difference degree indicated by each difference degree information acquired at different timings in step ST250, and then the setting process proceeds to step ST254.

In step ST254, the change amount determination unit 108B determines whether or not the change amount calculated in step ST252 is less than the second threshold value. In step ST254, in a case in which the change amount calculated in step ST252 is equal to or more than the second threshold value, a negative determination is made, and the setting process proceeds to step ST256. In step ST254, in a case in which the change amount calculated in step ST252 is less than the second threshold value, a positive determination is made, and the setting process proceeds to step ST258.

In step ST256, the mode indication unit 108C outputs the non-following mode indication information to the execution unit 104, and then the setting process proceeds to step ST260. By executing the process of step ST256, the execution unit 104 is operated in the non-following mode as indicated by the non-following mode indication information input from the mode indication unit 108C.

In step ST258, the mode indication unit 108C outputs the following mode indication information to the execution unit 104, and then the setting process proceeds to step ST260. By executing the process of step ST258, the execution unit 104 is operated in the following mode as indicated by the following mode indication information input from the mode indication unit 108C.

In subsequent step ST260, the setting unit 108 determines whether or not a condition for terminating the setting process (hereinafter, referred to as a "setting process termination condition") is satisfied. Examples of the setting process termination condition include a condition that the reception device 52 or 76 receives an instruction for terminating the setting process. In a case in which the setting process termination condition is not satisfied in step ST260, a negative determination is made, and the setting process proceeds to step ST250. In a case in which the setting process termination condition is satisfied in step ST260, a positive determination is made, and the setting process is terminated.

Next, an example of a flow of the information processing executed by the CPU 58 of the information processing apparatus 12 will be described with reference to FIG. 21. Note that, here, for convenience of description, the description will be made on the premise that the reference video 46B1 is already generated by the reference video generation unit 100A and the virtual viewpoint video 46C is already generated by the virtual viewpoint video generation unit 100B. In addition, here, the description will be made on the premise that the virtual viewpoint video 46C generated by the virtual viewpoint video generation unit 100B is displayed on the display 78 of the smart device 14. Further, here, the description will be made on the premise that the following mode or the non-following mode is set as the operation mode for the execution unit 104.

Figure 21:
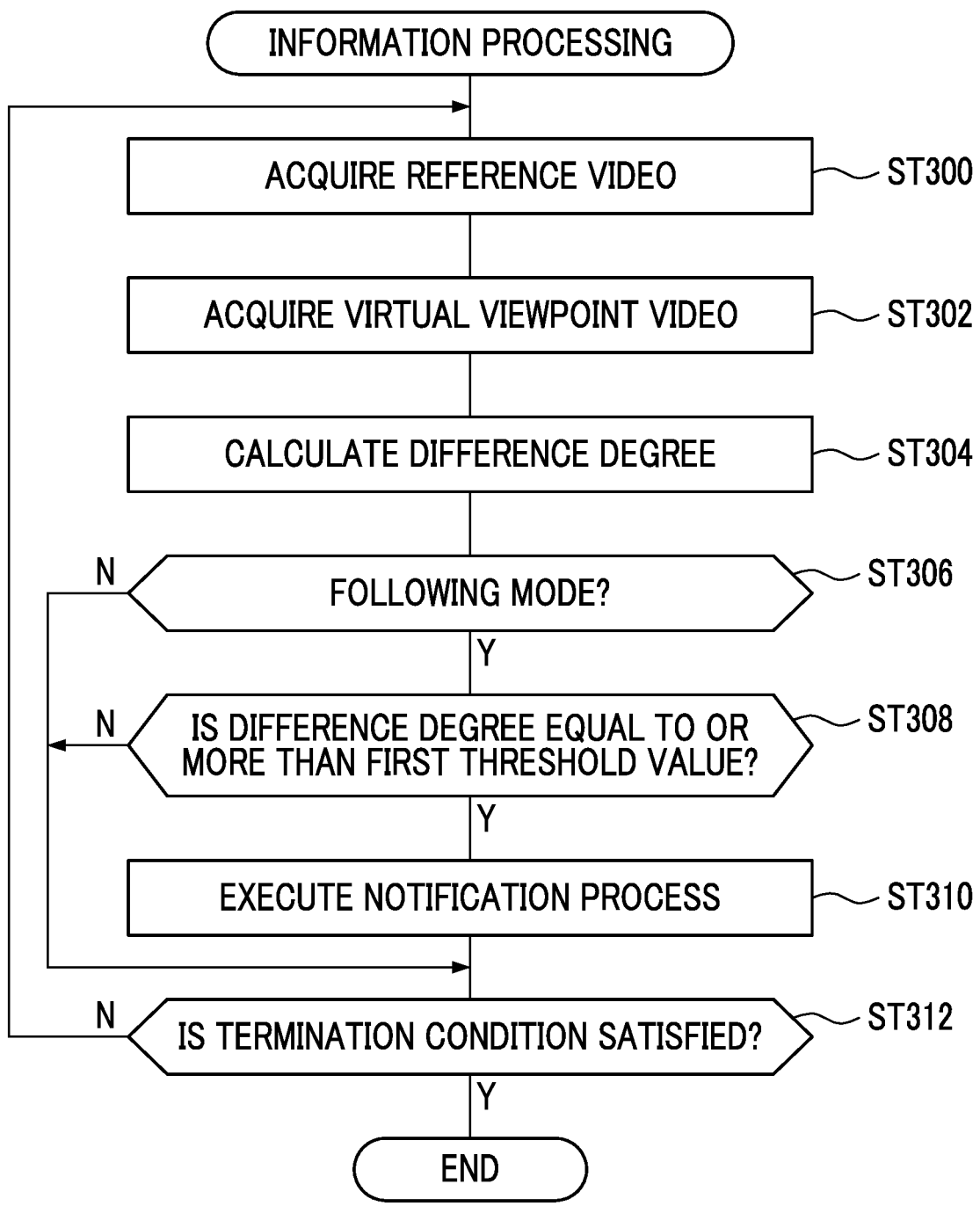
FIG. 21 is a flowchart showing an example of a flow of information processing.

In the information processing shown in FIG. 21, first, in step ST300, the acquisition unit 102 acquires the reference video 46B1 from the reference video generation unit 100A, and then the information processing proceeds to step ST302.

In step ST302, the acquisition unit 102 acquires the virtual viewpoint video 46C from the virtual viewpoint video generation unit 100B, and then the information processing proceeds to step ST304.

In step ST304, the difference degree calculation unit 104A calculates the difference degree between the reference video 46B1 acquired in step ST300 and the virtual viewpoint video 46C acquired in step ST302, and then the information processing proceeds to step ST306.

In step ST306, the determination unit 104B determines whether or not the operation mode of the execution unit 104 is the following mode. In step ST306, in a case in which the operation mode of the execution unit 104 is the non-following mode, a negative determination is made, and the information processing proceeds to step ST312. In step ST306, in a case in which the operation mode of the execution unit 104 is the following mode, a positive determination is made, and the information processing proceeds to step ST308.

In step ST308, the determination unit 104B determines whether or not the difference degree calculated in step ST304 is equal to or more than the first threshold value. In a case in which the difference degree is less than the first threshold value in step ST308, a negative determination is made, and the information processing proceeds to step ST312. In a case in which the difference degree is equal to or more than the first threshold value in step ST308, a positive determination is made, and the information processing proceeds to step ST310.

In step ST310, the notification processing unit 104C executes the notification process, and then the information processing proceeds to step ST312. By executing the notification process by the notification processing unit 104C, warning information is transmitted to the smart device 14 by the notification processing unit 104C. In a case in which the warning information is received, the smart device 14 displays the warning message, the recommendation viewpoint position information, and the recommendation visual line direction information on the display 78 together with the virtual viewpoint video 46C. In this way, the visible notification of the warning message, the recommendation viewpoint position information, and the recommendation visual line direction information is given to notify the viewer 28 that the difference degree is equal to or more than the first threshold value.

In subsequent step ST312, the execution unit 104 determines whether or not a condition for terminating the information processing (hereinafter, referred to as an "information processing termination condition") is satisfied. Examples of the information processing termination condition include a condition that the reception device 52 or 76 receives an instruction for terminating the information processing. In a case in which the information processing termination condition is not satisfied in step ST312, a negative determination is made, and the information processing proceeds to step ST300. In a case in which the information processing termination condition is satisfied in step ST312, a positive determination is made, and the information processing is terminated.

As described above, in the information processing system 10, the acquisition unit 102 acquires the virtual viewpoint video 46C and the reference video 46B1, and the execution unit 104 executes the specific process that contributes to setting of the difference degree to be less than the first threshold value in a case in which the difference degree between the virtual viewpoint video 46C and the reference video 46B1 is equal to or more than the first threshold value. Therefore, it is possible to contribute to the acquisition of the virtual viewpoint video 46C in which the difference degree from the reference video 46B1 is less than the first threshold value.

Note that, in the above, the virtual viewpoint video 46C has been described as an example, but instead of the virtual viewpoint video 46C, the imaging video 46B itself may be used as a time slice free viewpoint video, or the virtual viewpoint video 46C and the time slice free viewpoint video may be used in combination. In addition, not limited to the moving image, the free viewpoint video of the still image may be used. As a result, it is possible to contribute to the acquisition of the free viewpoint video in which the difference degree from the reference video 46B1 is less than the first threshold value.

In addition, in the information processing system 10, the execution unit 104 executes the notification process as the specific process. By executing the notification process, the viewer 28 is notified of the warning message indicating that the difference degree is equal to or more than the first threshold value. Therefore, the viewer 28 can be made aware that the difference degree between the virtual viewpoint video 46C and the reference video 46B1 is equal to or more than the first threshold value.

In addition, the information processing system 10 executes the notification process in which the viewer 28 is notified of the warning message by performing the visible notification, the audible notification, and/or the tactile notification. Therefore, the viewer 28 can be made perceive that the difference degree between the virtual viewpoint video 46C and the reference video 46B1 is equal to or more than the first threshold value.

In addition, in the information processing system 10, the execution unit 104 executes the specific process depending on the change in the virtual viewpoint video 46C. Therefore, even in a case in which the virtual viewpoint video 46C is changed, it can immediately contribute to the acquisition of the virtual viewpoint video of which the difference degree with the reference video 46B1 is less than the first threshold value.

In addition, in the information processing system 10, the following mode and the non-following mode are selectively set by the setting unit 108. Therefore, it is possible to reduce the power consumption as compared to a case in which the specific process is always executed while following the change in the virtual viewpoint video 46C.

In addition, in the information processing system 10, the setting unit 108 sets the following mode in a case in which the change amount of the difference degree is less than the second threshold value, and sets the non-following mode in a case in which the change amount of the difference degree is equal to or more than the second threshold value. Therefore, the specific process can be prevented from being executed contrary to the intention of the viewer 28.

In addition, in the information processing system 10, the control unit 106 displays the virtual viewpoint video 46C on the display 78 of the smart device 14. Therefore, it is possible for the viewer 28 to visually recognize the virtual viewpoint video 46C.

In addition, in the information processing system 10, the control unit 106 displays the reference video 46B1 on the screen 34A of the receiver 34. Therefore, it is possible for the viewer of the receiver 34 to visually recognize the reference video 46B1.

In addition, in the information processing system 10, the live broadcast video is adopted as the reference video 46B1. Therefore, it is possible to contribute to the acquisition of the virtual viewpoint video 46C in which the difference degree from the live broadcast video is less than the first threshold value.

In addition, in the information processing system 10, the video obtained by imaging the imaging region by the reference imaging apparatus is used as the reference video 46B1. Therefore, as compared to a case in which a video other than the video obtained by imaging the imaging region (for example, a virtual video) is used as the reference video, it is possible for the viewer 28 or the like to easily grasp the difference between the video obtained by imaging and the virtual viewpoint video 46C.

In addition, in the information processing system 10, the viewpoint position 42 and the visual line direction 44 as indicated from the outside are used. That is, the viewpoint position 42 and the visual line direction 44 are decided in response to the viewpoint visual line indication received by the touch panel 76A. Therefore, it is possible to generate the virtual viewpoint video 46C in a case in which the imaging region is observed from the viewpoint position and the visual line direction intended by the viewer 28.

Further, in the information processing system 10, as the specific process, the process that contributes to setting the difference degree to be less than the first threshold value is adopted. Therefore, it is possible to contribute to the acquisition of the virtual viewpoint video 46C in which the difference degree from the reference video 46B1 is less than the first threshold value.

Note that in the embodiment described above, the aspect example has been described in which the reference video 46B1 and the virtual viewpoint video 46C are generated by the information processing apparatus 12, but the technology of the present disclosure is not limited to this. The reference video 46B1 and/or the virtual viewpoint video 46C may be generated by a device different from the information processing apparatus 12 (hereinafter, referred to as a "video generation device"), and the video generated by the video generation device may be acquired by the acquisition unit 102.

Figure 22:
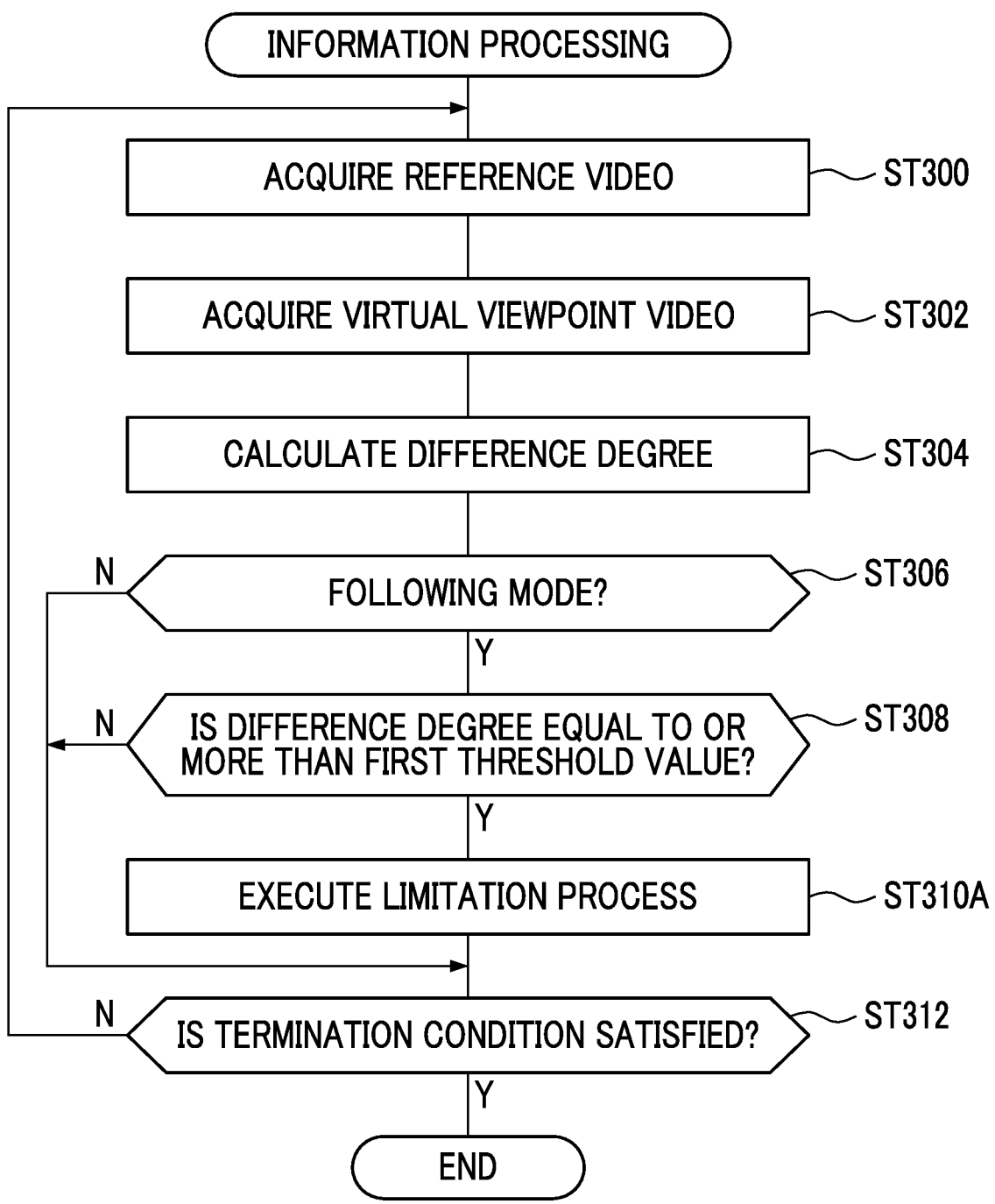
FIG. 22 is a flowchart showing a modification example of the flow of the information processing.

In the embodiment described above, the notification process has been described as an example of the specific process executed by the execution unit 104, but the technology of the present disclosure is not limited to this, and the information processing shown in FIG. 22 may be executed instead of the information processing (see FIG. 21) described in the embodiment. The information processing shown in FIG. 22 is different from the information processing shown in FIG. 21 in that step ST310A is provided instead of step ST310. In step ST310A, a limitation processing unit 104D (see FIG. 23) executes a limitation process.

The limitation process is a process for limiting a range in which the viewpoint position 42 can be indicated to a viewpoint position range R1 (see FIG. 24) determined as a range in which the difference degree is set to be less than the first threshold value and limiting a range in which the visual line direction 44 can be indicated to a visual line direction range R2 (see FIG. 24) determined as the range in which the difference degree is set to be less than the first threshold value.

Figure 23:
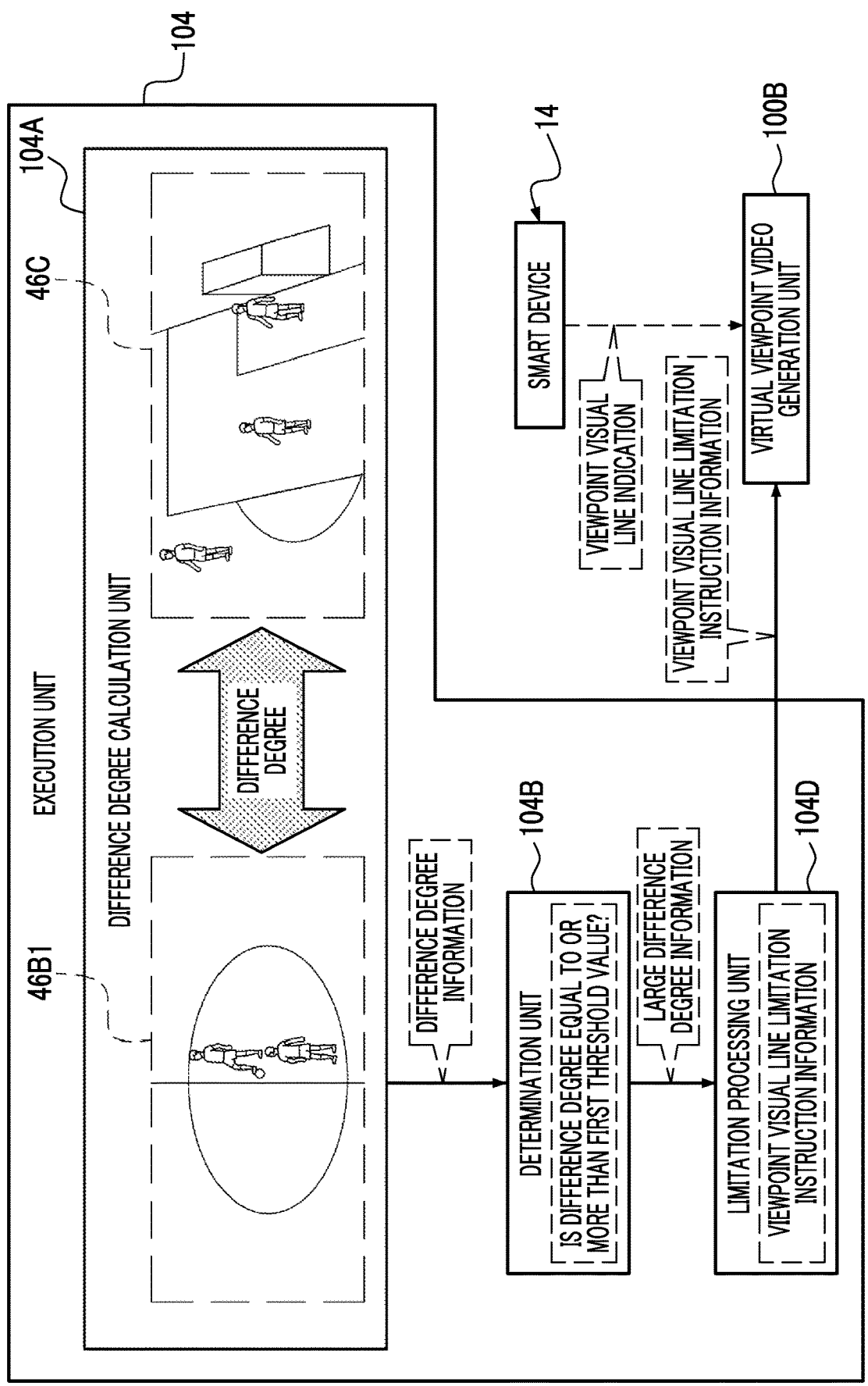
FIG. 23 is a conceptual diagram provided for describing a first modification example of the process content of the execution unit.

For example, as shown in FIG. 23, the limitation processing unit 104D outputs viewpoint visual line limitation instruction information to the virtual viewpoint video generation unit 100B by executing the limitation process. The viewpoint visual line limitation instruction information is information including viewpoint position limitation instruction information and visual line direction limitation instruction information. The viewpoint position limitation instruction information refers to information indicating an instruction for limiting the range in which the viewpoint position 42 can be indicated to the viewpoint position range R1 (see FIG. 24), and the visual line direction limitation instruction information refers to information indicating an instruction for limiting the range in which the visual line direction 44 can be indicated to the visual line direction range R2 (see FIG. 24).

Figure 24:
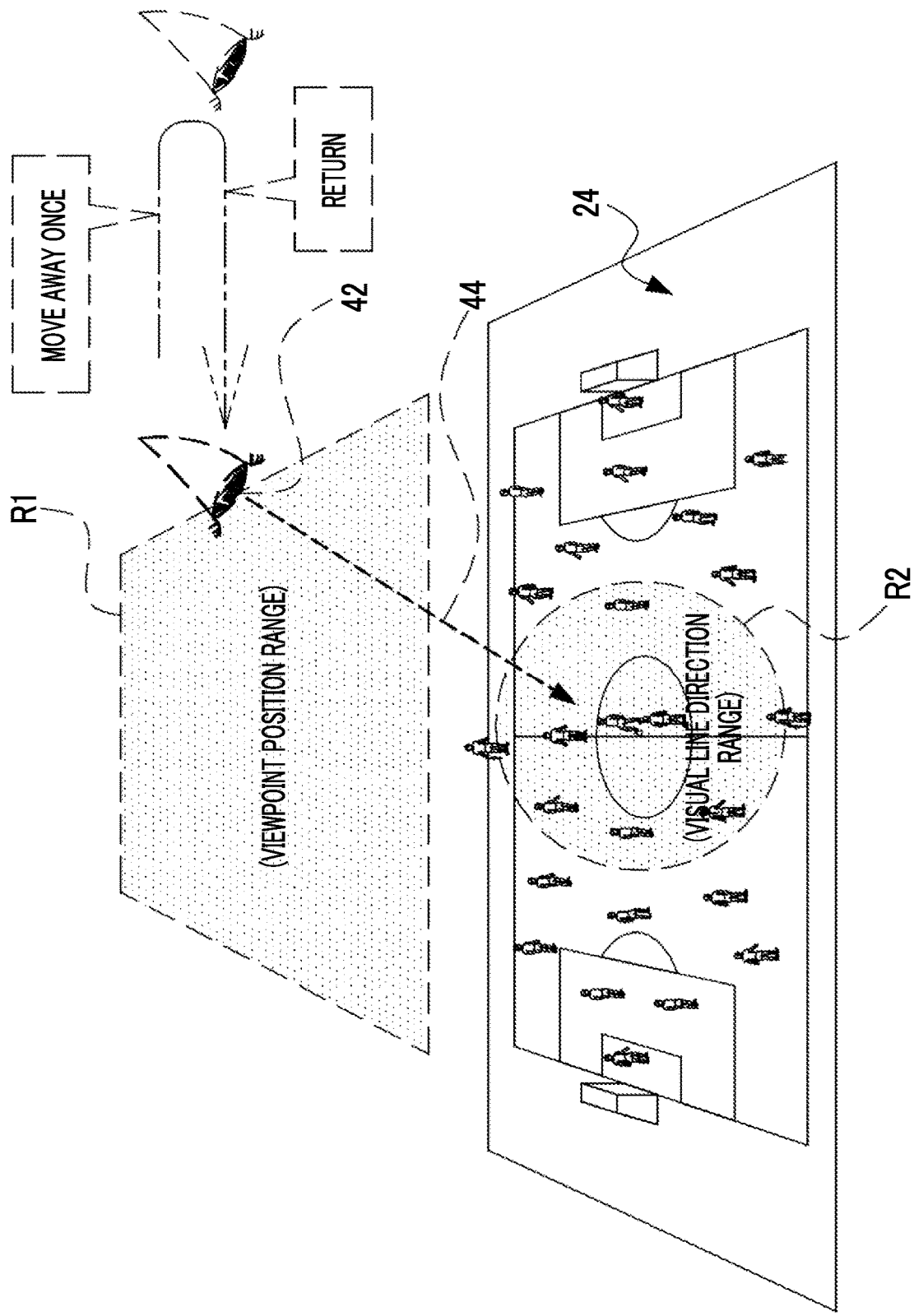
FIG. 24 is a conceptual diagram showing examples of a viewpoint position range and a visual line direction range.

In this case, for example, as shown in FIG. 24, the viewpoint position 42 is forcibly set in the viewpoint position range R1 and the visual line direction 44 is forcibly set in the visual line direction range R2. Stated another way, the viewpoint position 42 follows the viewpoint position range R1, and the visual line direction 44 follows the visual line direction range R2. For example, as shown by a two dot chain line in FIG. 24, even in a case in which the viewpoint position 42 and the visual line direction 44 are once moved away from the viewpoint position range and the visual line direction range, the viewpoint position 42 and the visual line direction 44 are returned again in the viewpoint position range and the visual line direction range.

The disposition position of the viewpoint position 42 in the viewpoint position range R1 is decided depending on a positional relationship between the viewpoint position range R1 and the current viewpoint position 42. For example, in the viewpoint position range R1, the viewpoint position 42 is changed to a position closest to the current viewpoint position 42. In addition, the direction of the visual line direction in the visual line direction range R2 is decided depending on a positional relationship between the visual line direction range R2 and the current visual line direction 44. For example, in the visual line direction range R2, the visual line direction 44 is changed to a direction closest to the current visual line direction 44.

Figure 25:
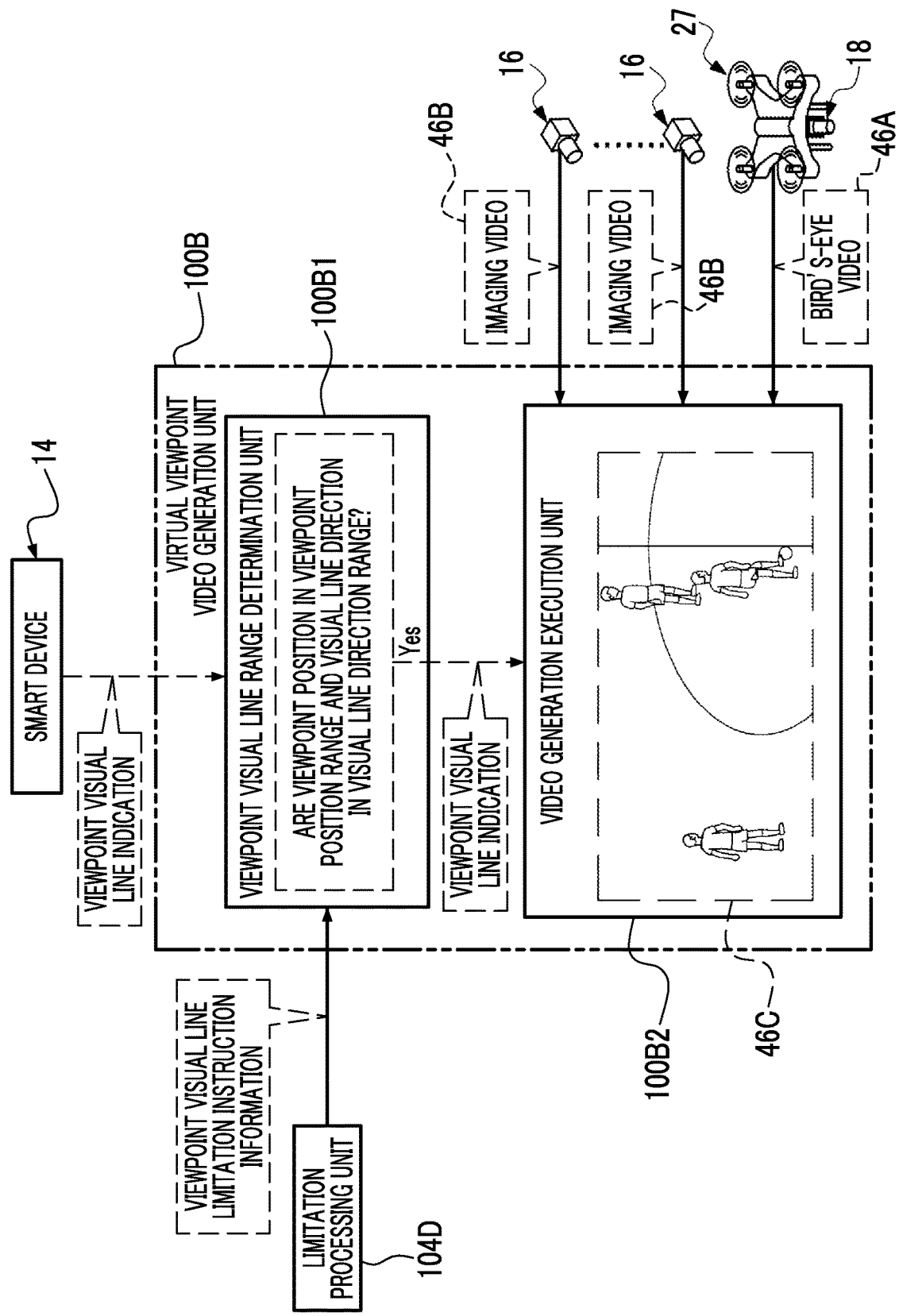
FIG. 25 is a conceptual diagram showing a first modification example of the process content of the virtual viewpoint video generation unit.

For example, as shown in FIG. 25, the virtual viewpoint video generation unit 100B includes a viewpoint visual line range determination unit 100B1 and a video generation execution unit 100B2. The viewpoint visual line range determination unit 100B1 acquires the viewpoint visual line indication from the smart device 14, and also acquires the viewpoint visual line limitation instruction information from the limitation processing unit 104D.

The viewpoint visual line range determination unit 100B1 determines whether or not the viewpoint position 42 is in the viewpoint position range R1 and the visual line direction 44 is in the visual line direction range R2 based on the viewpoint visual line indication and the viewpoint visual line limitation indication information. In a case in which the viewpoint position 42 is outside the viewpoint position range R1 and the visual line direction 44 is outside the visual line direction range R2, the viewpoint visual line range determination unit 100B1 adjusts the viewpoint visual line indication such that the current viewpoint position 42 is set in the viewpoint position range R1 and the current visual line direction 44 is set in the visual line direction range R2. Moreover, the viewpoint visual line range determination unit 100B1 outputs the adjusted viewpoint visual line indication to the video generation execution unit 100B2. The video generation execution unit 100B2 generates the virtual viewpoint video 46C in response to the viewpoint visual line indication input from the viewpoint visual line range determination unit 100B1. As a result, the virtual viewpoint video 46C of which the difference degree with the reference video 46B1 is less than the first threshold value is generated depending on the viewpoint position 42 in the viewpoint position range R1 and the visual line direction 44 in the visual line direction range R2. Therefore, it is possible to maintain the difference degree between the reference video 46B1 and the virtual viewpoint video 46C to be less than the first threshold value.

Figure 26:
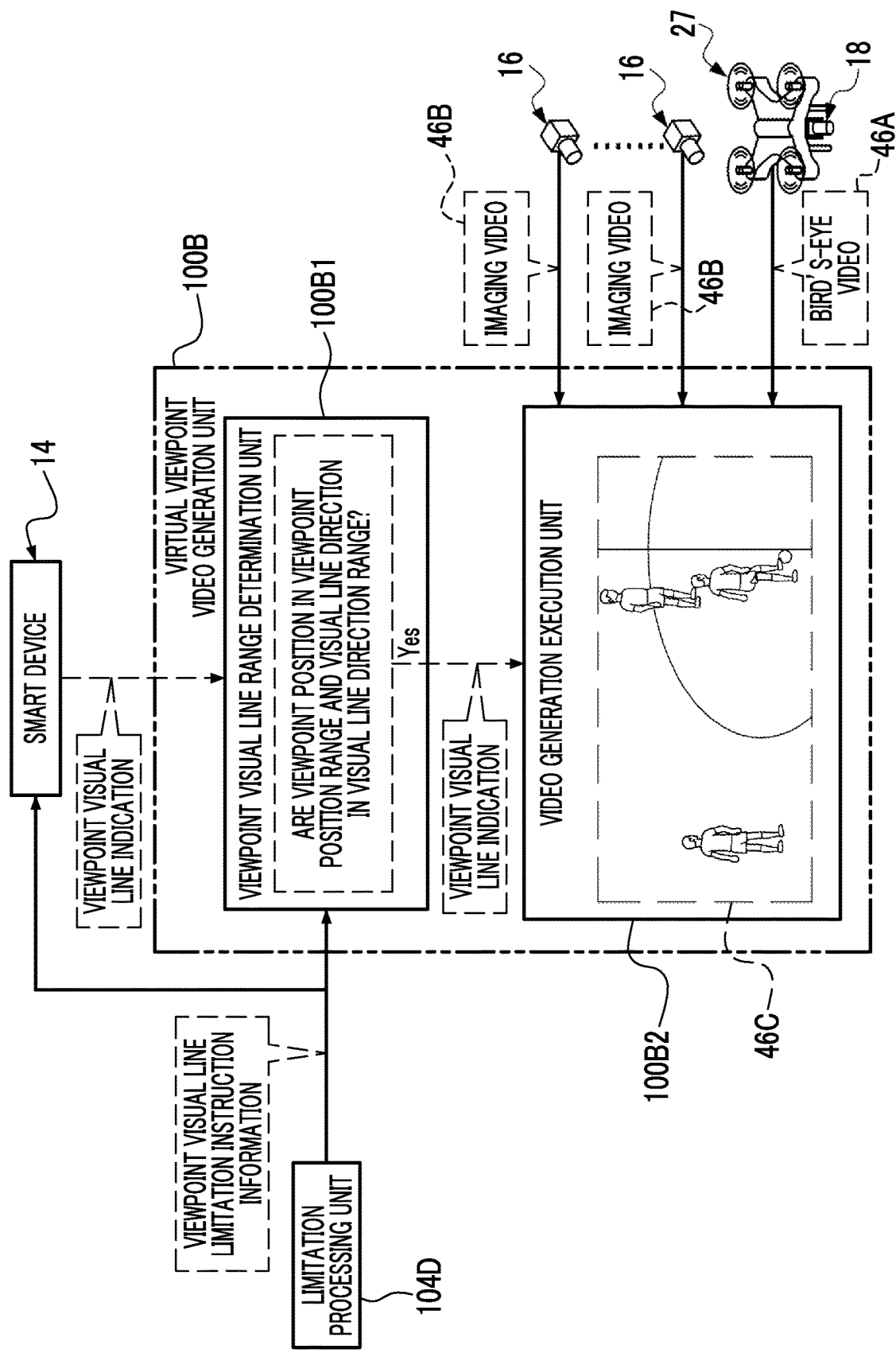
FIG. 26 is a conceptual diagram showing a second modification example of the process content of the virtual viewpoint video generation unit.
Figure 27:
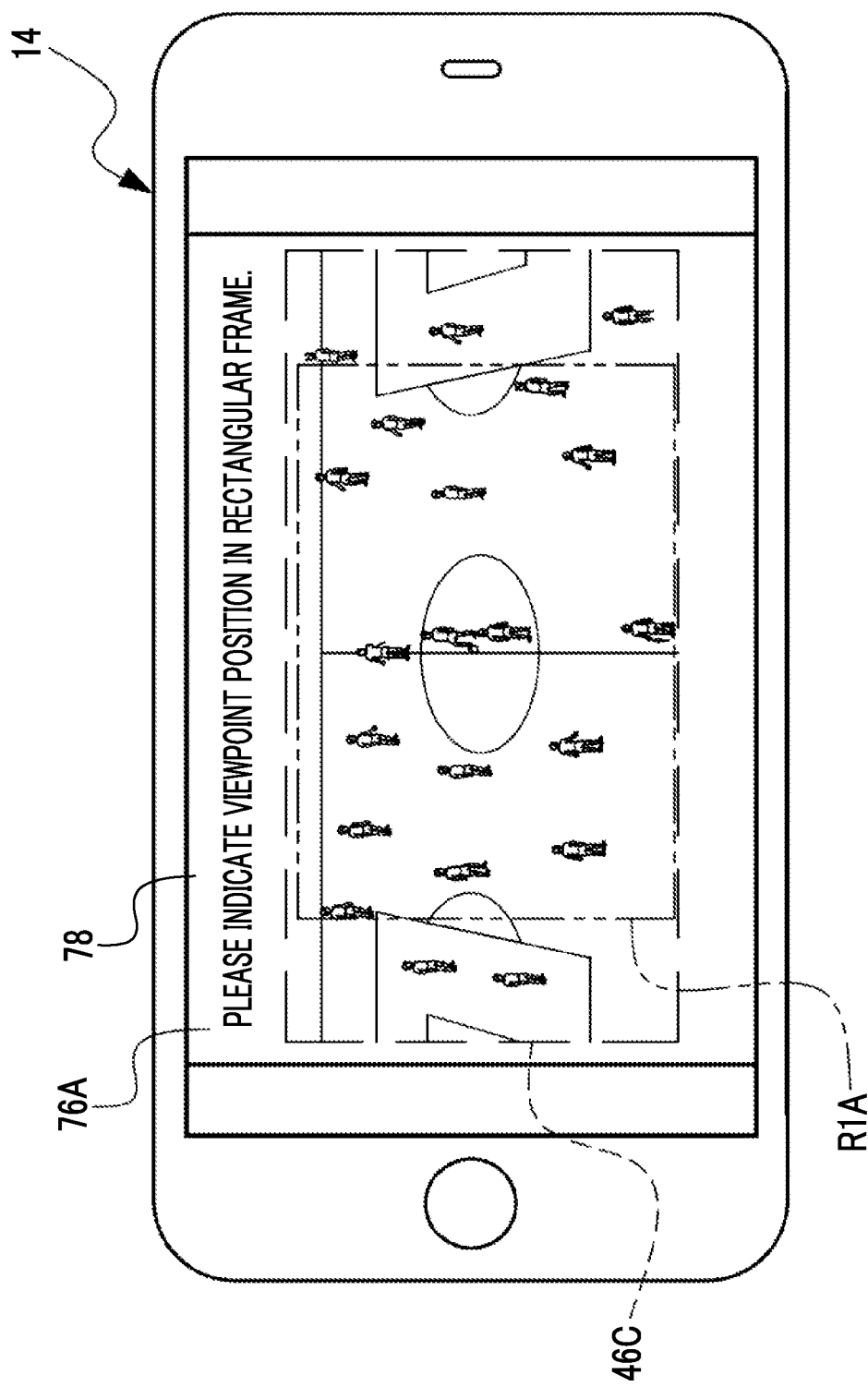
FIG. 27 is a conceptual diagram showing an example of an aspect in which a rectangular frame indicating the viewpoint position range and a guide message are displayed on the display of the smart device together with the virtual viewpoint video.
Figure 28:
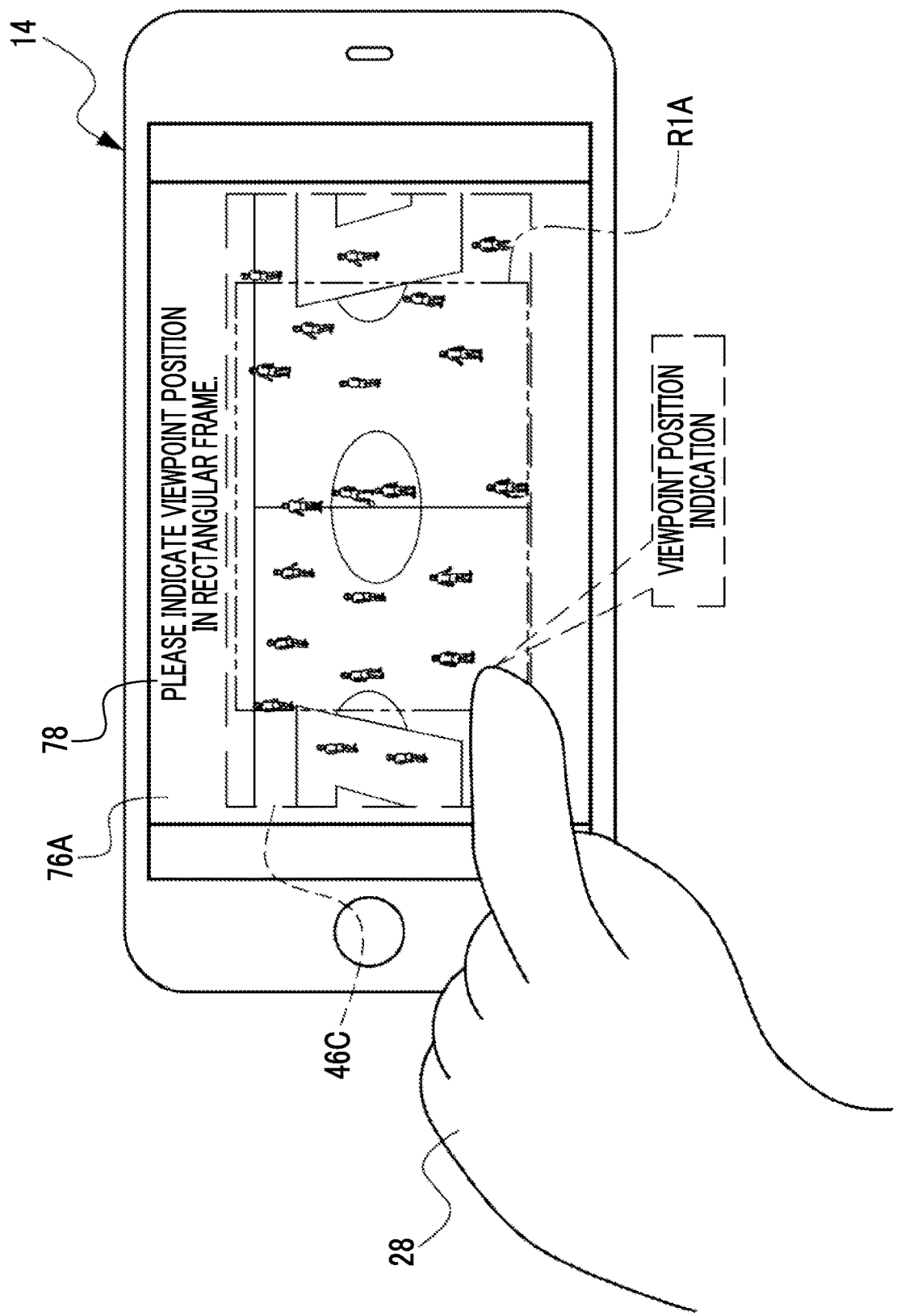
FIG. 28 is a conceptual diagram showing an example of an aspect in which a viewpoint position indication is received by a touch panel in the rectangular frame shown in FIG. 27.

In addition, for example, as shown in FIG. 26, the limitation processing unit 104D may output the viewpoint visual line limitation instruction information to the smart device 14 in addition to the viewpoint visual line range determination unit 100B1. In this case, for example, as shown in FIG. 27, in the smart device 14, under the control of the CPU 88, a rectangular frame R1A indicating an outer edge of the viewpoint position range R1 superimposed on the virtual viewpoint video 46C is displayed the display 78 and a guide message "Please indicate the viewpoint position in the rectangular frame." is displayed. For example, as shown in FIG. 28, in a case in which the viewpoint position indication from the viewer 28 is received by the touch panel 76A in the rectangular frame R1A, the viewpoint position 42 is changed to a position in the viewpoint position range R1.

Figure 29:
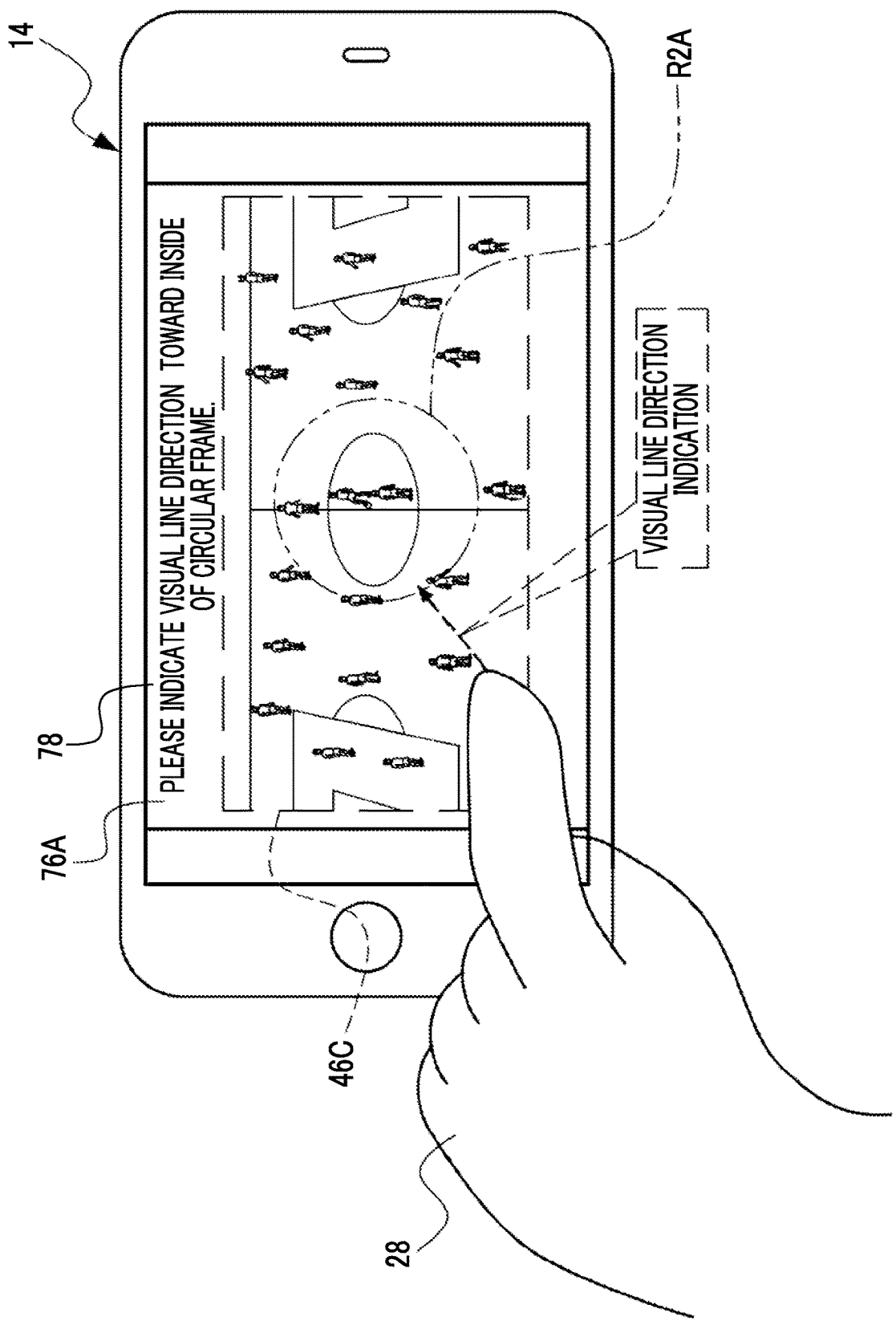
FIG. 29 is a conceptual diagram showing an example of an aspect in which a circular frame indicating the visual line direction range and the guide message are displayed on the display of the smart device together with the virtual viewpoint video, and a visual line direction indication is received by the touch panel toward the inside of the circular frame.

In addition, in a case in which the viewpoint position indication is received by the touch panel 76A, the rectangular frame R1A is deleted from the display 78. Moreover, subsequently, for example, as shown in FIG. 29, in the smart device 14, under the control of the CPU 88, a circular frame R2A indicating an outer edge of the visual line direction range R2 superimposed on the virtual viewpoint video 46C is displayed on the display 78 and a guide message "Please indicate the visual line direction toward an inside of the circular frame." is displayed. In this case, for example, in a case in which the visual line direction indication (for example, the slide operation) from the viewer 28 is received by the touch panel 76A toward the circular frame R2A, the visual line direction 44 is changed to a direction in the visual line direction range R2.

In this way, in a case in which the viewpoint position 42 is changed to the position in the viewpoint position range R1 and the visual line direction 44 is changed to the direction in the visual line direction range R2, the virtual viewpoint video 46C is generated by the virtual viewpoint video generation unit 100B depending on the changed viewpoint position 42 and the changed visual line direction 44.

Figure 30:
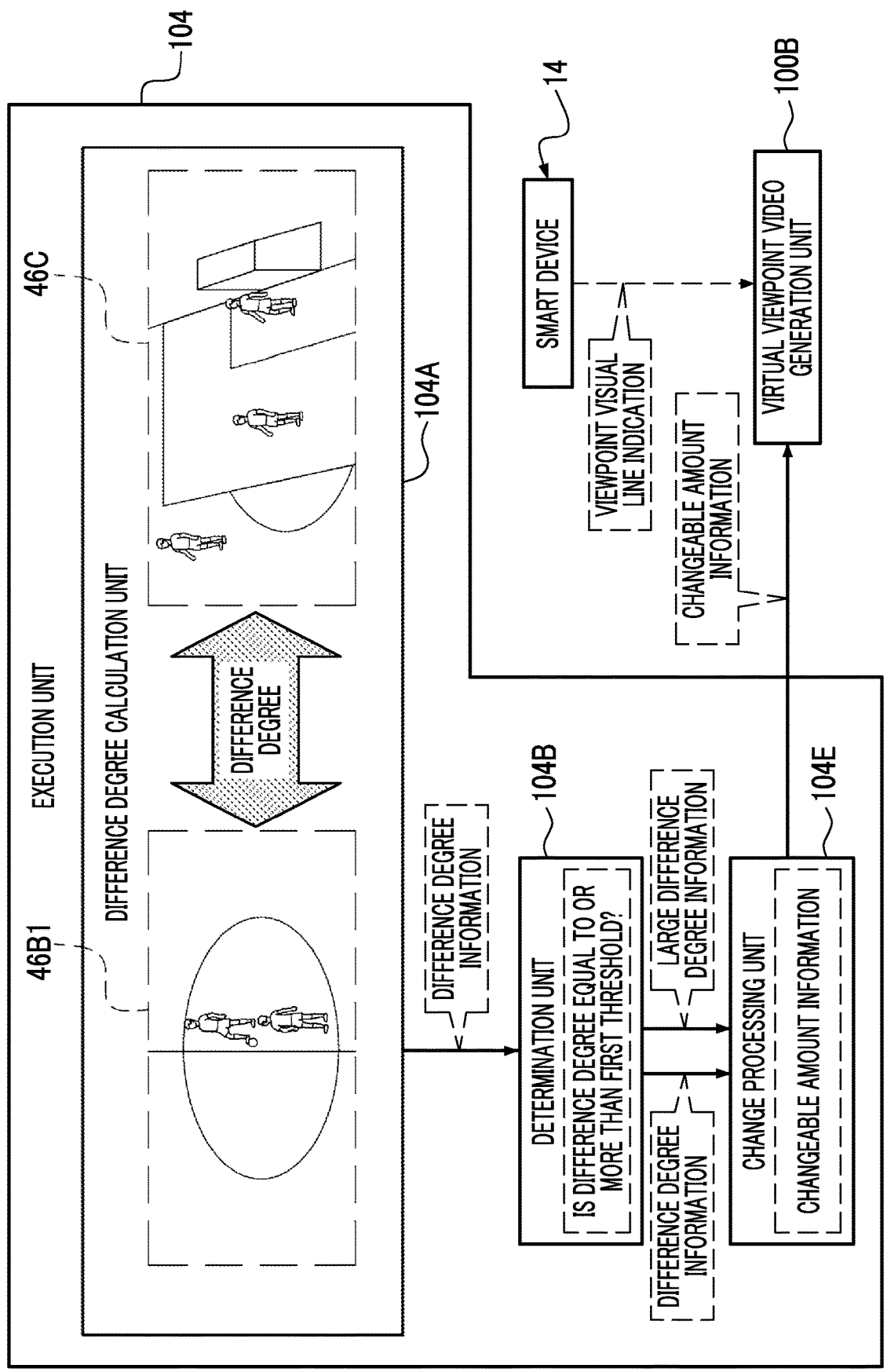
FIG. 30 is a conceptual diagram provided for describing a second modification example of the process content of the execution unit.

In addition, in the example shown in FIG. 23, an aspect example is described in which the limitation process is executed by the limitation processing unit 104D, but the technology of the present disclosure is not limited to this. For example, as shown in FIG. 30, the execution unit 104 may include a change processing unit 104E instead of the limitation processing unit 104D. In the example shown in FIG. 23, the limitation processing unit 104D is not shown, but the limitation processing unit 104D can be present together with the change processing unit 104E.

The change processing unit 104E executes a change process. The change process refers to a process of performing, on the virtual viewpoint video 46C, change for setting the difference degree to be less than the first threshold value. That is, in a case in which the change processing unit 104E executes the change process, the virtual viewpoint video 46C is changed such that the difference degree is set to be less than the first threshold value. In a case in which the large difference degree information is input from the determination unit 104B, the change processing unit 104E generates changeable amount information based on the difference degree information input from the difference degree calculation unit 104A via the determination unit 104B, and outputs the generated changeable amount information to the virtual viewpoint video generation unit 100B. The changeable amount information refers to a limit value of the change amount required to change the virtual viewpoint video 46C, that is, an upper limit value of the change amount required to set the difference degree indicated by the difference degree information to be less than the first threshold value (hereinafter, referred to as a "changeable amount").

Figure 31:
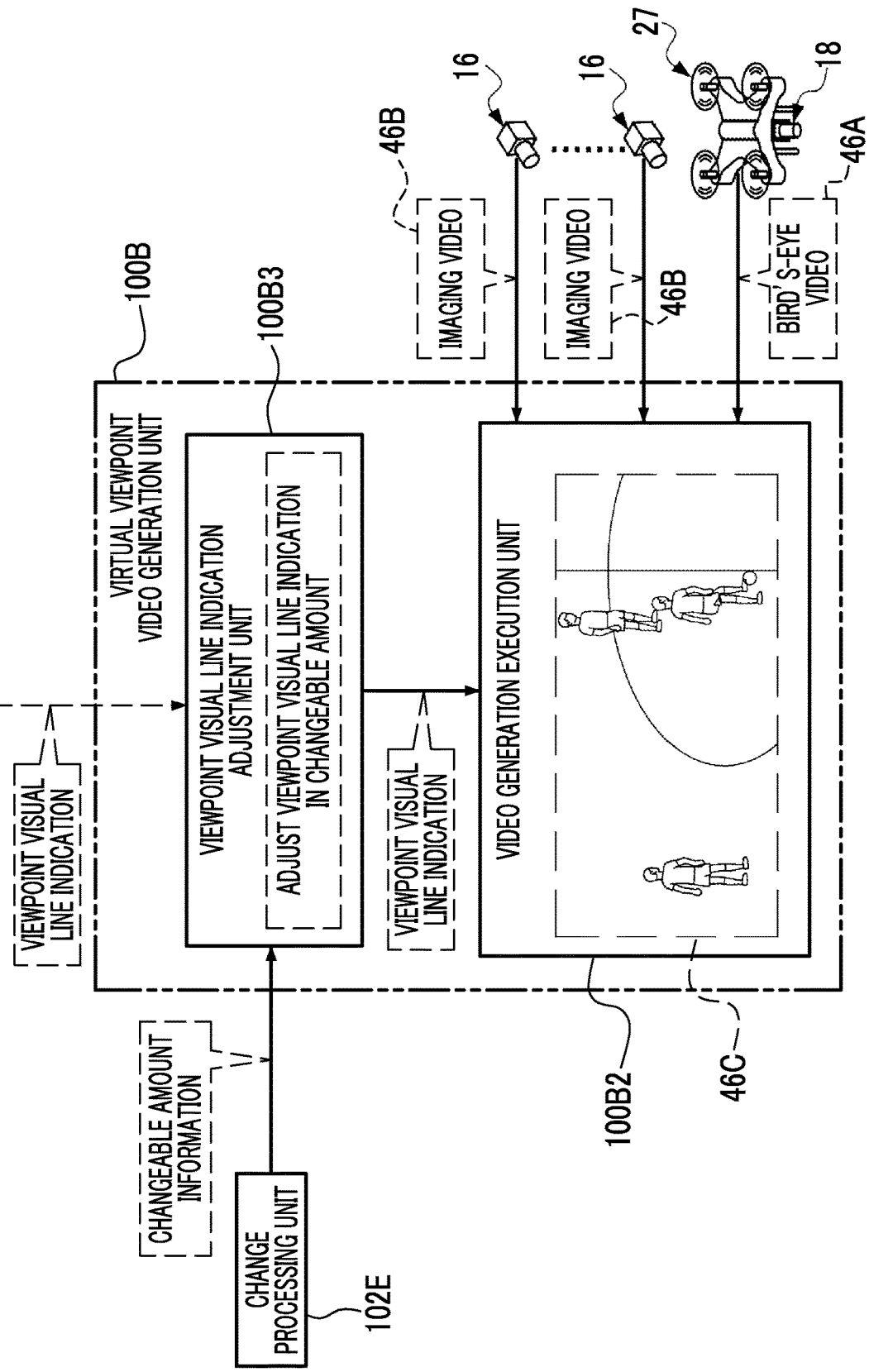
FIG. 31 is a conceptual diagram showing a third modification example of the process content of the virtual viewpoint video generation unit.

For example, as shown in FIG. 31, the virtual viewpoint video generation unit 100B includes the video generation execution unit 100B2 and a viewpoint visual line indication adjustment unit 100B3. The viewpoint visual line indication adjustment unit 100B3 acquires the viewpoint visual line indication from the smart device 14 and acquires the changeable amount information from the change processing unit 104E.

The viewpoint visual line indication adjustment unit 100B3 changes the viewpoint position 42 and the visual line direction 44 by adjusting the viewpoint visual line indication. Specifically, the viewpoint visual line indication adjustment unit 100B3 adjusts the viewpoint visual line indication in the changeable amount indicated by the changeable amount information. Here, the adjustment of the viewpoint visual line indication refers to the adjustment of the viewpoint position indication and the visual line direction indication. The viewpoint visual line indication adjustment unit 100B3 outputs the adjusted viewpoint visual line indication to the video generation execution unit 100B2. The video generation execution unit 100B2 generates the virtual viewpoint video 46C by using the plurality of imaging videos in response to the viewpoint visual line indication input from the viewpoint visual line indication adjustment unit 100B3.

As a result, the virtual viewpoint video 46C is changed by the change amount required to set the difference degree to be less than the first threshold value, so that the difference degree between the virtual viewpoint video 46C and the reference video 46B1 can be maintained to be less than the first threshold value. In addition, since the viewpoint position indication and the visual line direction indication are adjusted, it is possible to easily change the virtual viewpoint video 46C of which the difference degree with the reference video 46B1 is set to be less than the first threshold value as compared to a case in which neither the viewpoint position indication nor the visual line direction indication is adjusted.

Note that, here, although the aspect example has been described in which both the viewpoint position indication and the visual line direction indication are adjusted, the technology of the present disclosure is not limited to this, and any one of the viewpoint position indication or the visual line direction indication may be adjusted by the viewpoint visual line indication adjustment unit 100B3 such that the difference degree is set to be less than the first threshold value.

Figure 32:
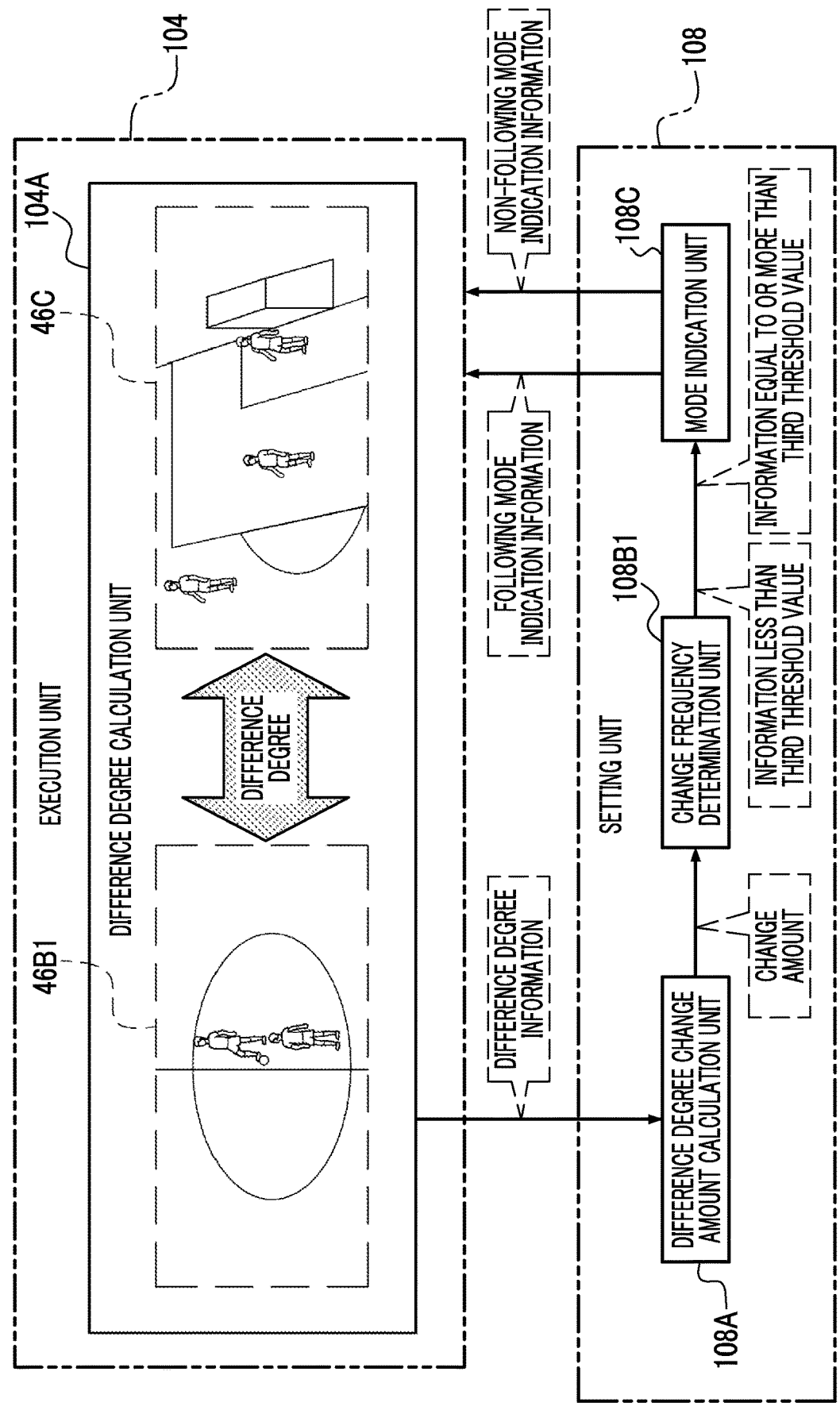
FIG. 32 is a conceptual diagram provided for describing a modification example of the process content of the setting unit.

In addition, in the example shown in FIG. 18, the change amount determination unit 108B has been described as an example, but the technology of the present disclosure is not limited to this. For example, as shown in FIG. 32, the setting unit 108 may include a change frequency determination unit 108B1 instead of the change amount determination unit 108B. The change frequency determination unit 108B1 determines whether or not a frequency at which the difference degree changes is less than a third threshold value. Here, examples of the "frequency at which the difference degree changes" include a frequency at which the difference degree exceeds the first threshold value described (for example, the frequency per unit time). The change frequency determination unit 108B1 outputs information indicating that the frequency is less than the third threshold value to the mode indication unit 108C in a case in which the frequency at which the difference degree changes is less than the third threshold value, and outputs information indicating that the frequency is equal to or more than the third threshold value to the mode indication unit 108C in a case in which the frequency at which the difference degree changes is equal to or more than the third threshold value. As a result, as in the embodiment described above, the execution unit 104 is operated in the following mode in a case in which the frequency at which the difference degree changes is less than the third threshold value, and is operated in the non-following mode in a case in which the frequency at which the difference degree changes is equal to or more than the third threshold value. Therefore, it is possible to reduce the discomfort given to the viewer 28 due to the frequent execution of the specific process as compared to a case in which the specific process is executed by the execution unit 104 regardless of the frequency at which the difference degree between the virtual viewpoint video 46C and the reference video 46B1 changes.

Figure 33:
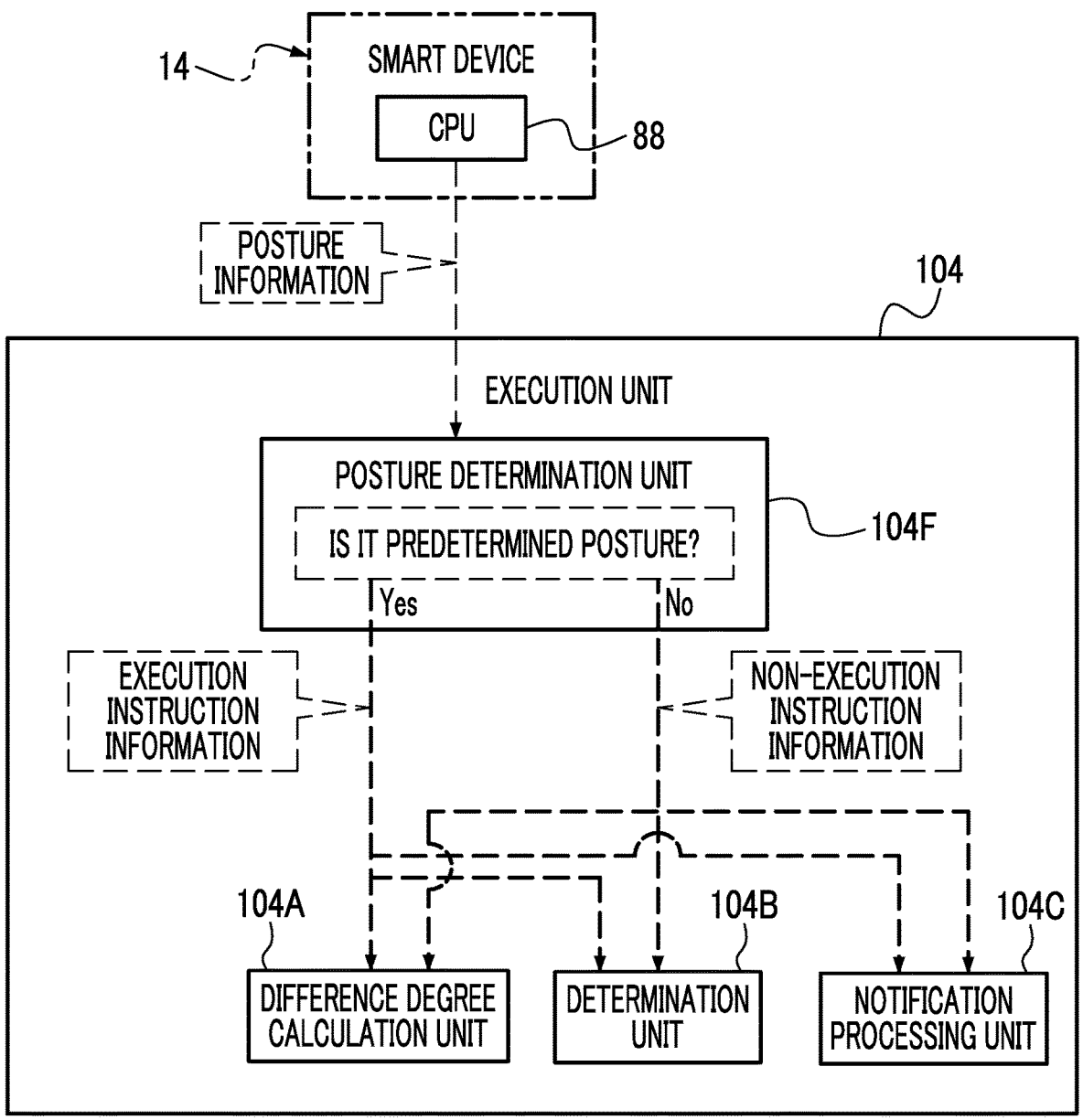
FIG. 33 is a conceptual diagram provided for describing a third modification example of the process content of the execution unit.

In addition, in the embodiment described above, the aspect example has been described in which the specific process is executed by the execution unit 104 regardless of the posture of the smart device 14, but the technology of the present disclosure is not limited to this, and the specific process may be executed or not executed depending on the posture of the smart device 14. In this case, based on the angle information measured by the gyro sensor 74, the CPU 88 of the smart device 14 detects the posture of the smart device 14. Note that, here, the CPU 88 is an example of a "detection unit (detector)" according to the technology of the present disclosure. For example, as shown in FIG. 33, the CPU 88 outputs posture information indicating the posture of the smart device 14 to the execution unit 104. The execution unit 104 includes a posture determination unit 104F, and the posture determination unit 104F determines whether or not the posture indicated by the posture information input from the CPU 88 is a predetermined posture. The predetermined posture refers to a posture in which the display 78 is not vertically downward, for example.

In a case in which the posture indicated by the posture information is the predetermined posture, the posture determination unit 104F outputs execution instruction information for giving an instruction of the execution of the specific process to the difference degree calculation unit 104A, the determination unit 104B, and the notification processing unit 104C. In a case in which the execution instruction information is input to the difference degree calculation unit 104A, the determination unit 104B, and the notification processing unit 104C, the difference degree calculation unit 104A, the determination unit 104B, and the notification processing unit 104C are operated to execute the specific process described above. In addition, in a case in which the posture indicated by the posture information is not the predetermined posture, the posture determination unit 104F outputs non-execution instruction information for giving an instruction of the non-execution of the specific process to the difference degree calculation unit 104A, the determination unit 104B, and the notification processing unit 104C. In a case in which the non-execution instruction information is input to the difference degree calculation unit 104A, the determination unit 104B, and the notification processing unit 104C, the difference degree calculation unit 104A, the determination unit 104B, and the notification processing unit 104C are not operated, and the specific process described above is not executed. Therefore it is possible to execute or not execute the specific process by changing the posture of the smart device 14.

Figure 34:
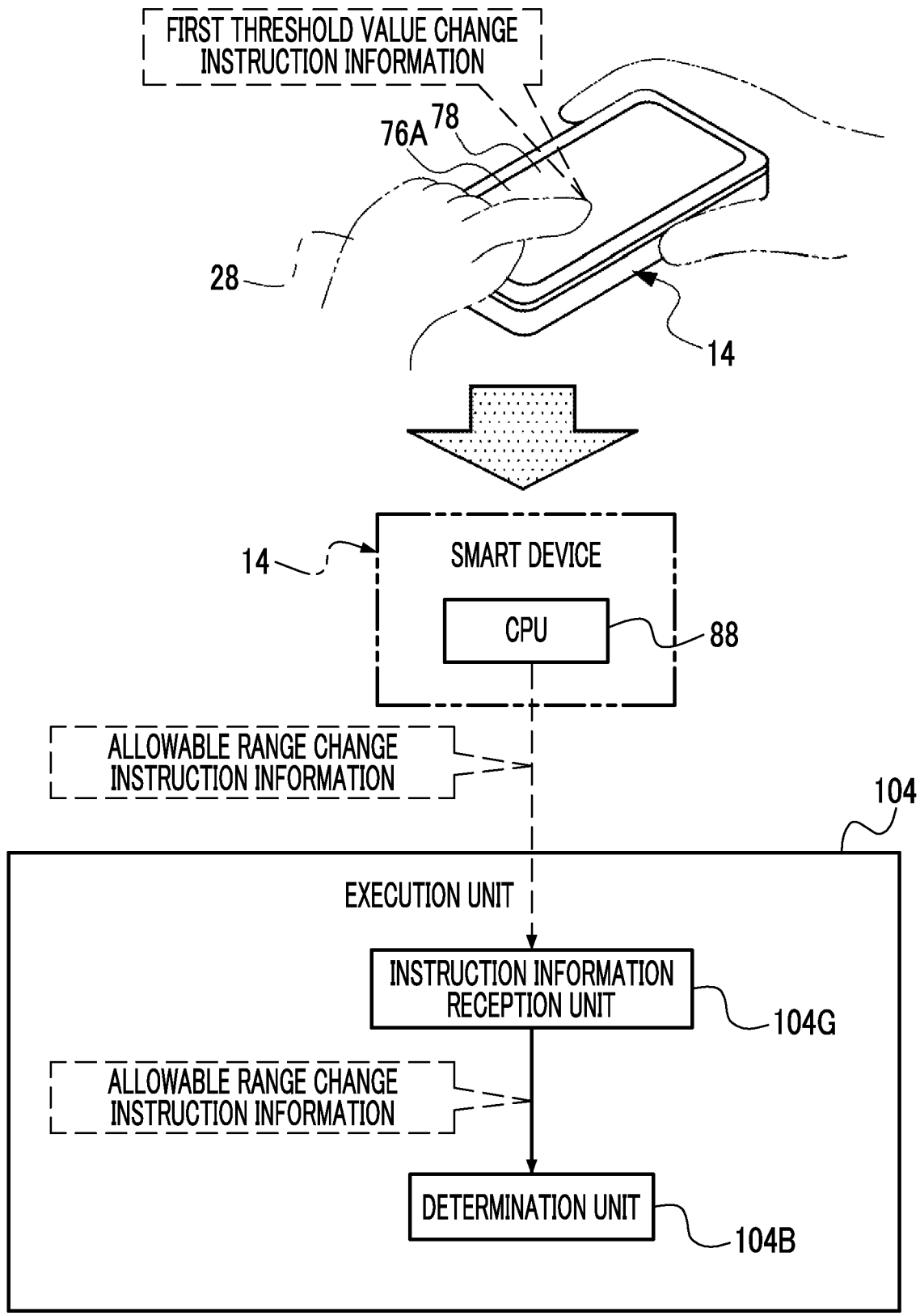
FIG. 34 is a conceptual diagram provided for describing a fourth modification example of the process content of the execution unit.

In addition, although the fixed value is adopted as the first threshold value described in the embodiment described above, the technology of the present disclosure is not limited to this, and the variable value which is changed in response to the instructions received by the reception device 52 (see FIG. 2) and/or the reception device 76 may be adopted. In this case, for example, as shown in FIG. 34, in a case in which first threshold value change instruction information for giving an instruction for changing the first threshold value is received by the touch panel 76A of the smart device 14, the change of the first threshold value may be executed by the execution unit 104 according to the first threshold value change instruction information. Here, the first threshold value change instruction information is an example of "instruction information" according to the technology of the present disclosure.

In the example shown in FIG. 34, the execution unit 104 includes an instruction information reception unit 104G, and the first threshold value change instruction information is transmitted from the smart device 14 to the instruction information reception unit 104G in a case in which the first threshold value change instruction information is received by the touch panel 76A of the smart device 14. The first threshold value change instruction information includes information indicating the first threshold value or information indicating a degree of the change in the first threshold value. The instruction information reception unit 104G receives the first threshold value change instruction information to output the received first threshold value change instruction information to the determination unit 104B. In a case in which the first threshold value change instruction information is input to the determination unit 104B, the determination unit 104B changes the first threshold value used for comparison with the difference degree according to the first threshold value change instruction information. Therefore, as compared to a case in which the first threshold value is always fixed, it is possible to easily determine the intention of the viewer 28 or the like for the change in the first threshold value.

In addition, in the embodiment described above, the aspect example has been described in which the display control process (see FIG. 19), the setting process (see FIG. 20), and the information processing (see FIGS. 21 and 22) are executed by the CPU 58 of the information processing apparatus 12, but the technology of the present disclosure is not limited to this. At least one of the display control process, the setting process, or the information processing may be executed by the CPU 88 of the smart device 14. In the following, in a case in which a distinction is not necessary, the display control process, the setting process, and the information processing are referred to as an "information processing apparatus side process".

Figure 35:
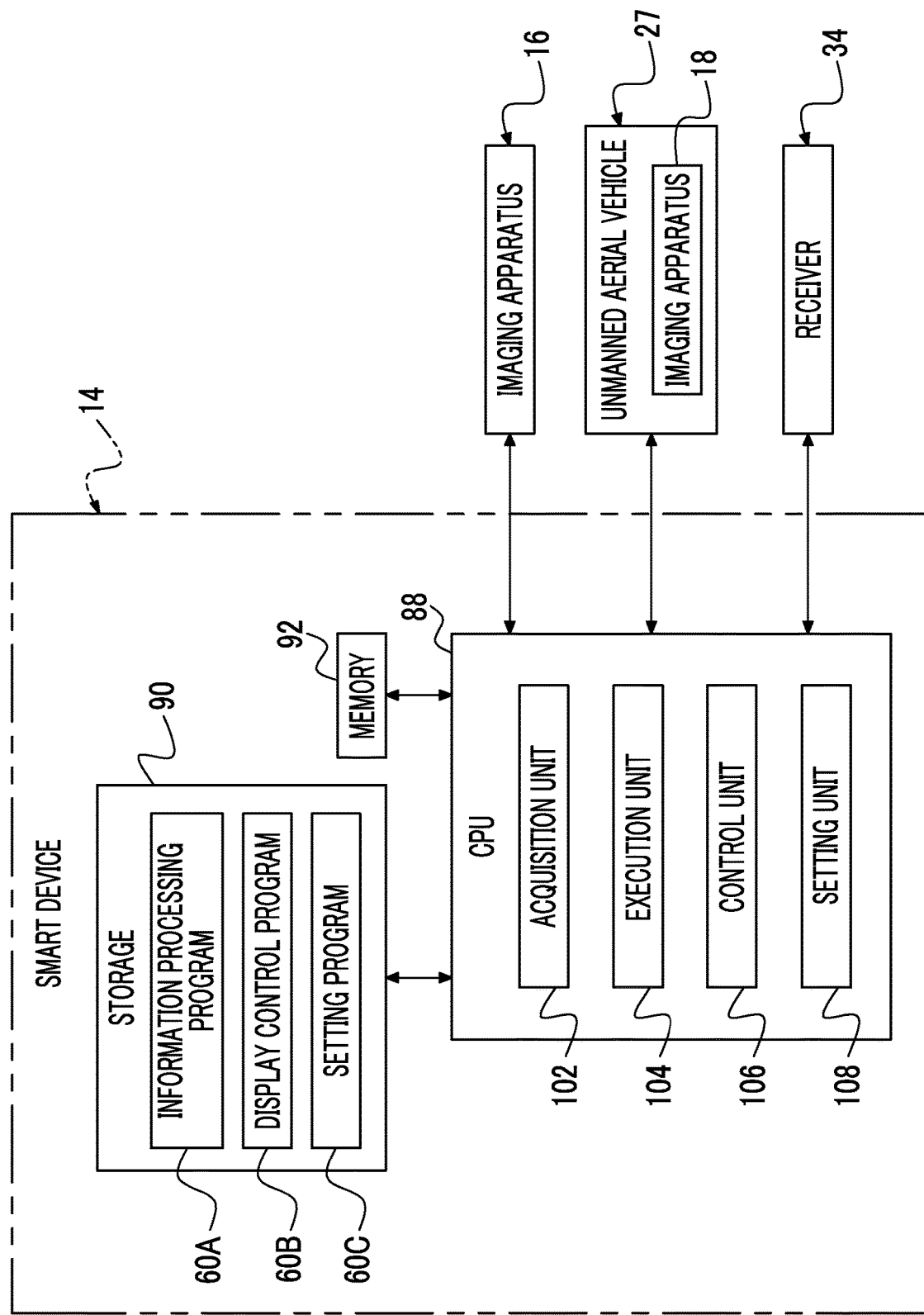
FIG. 35 is a block diagram showing an example of a configuration of the smart device in a case in which an information processing apparatus side program is stored in a storage of the smart device and an information processing apparatus side process is executed by the CPU of the smart device.

FIG. 35 shows a configuration example of the smart device 14 in a case in which the information processing apparatus side process is executed by the CPU 88 of the smart device 14. For example, as shown in FIG. 35, the storage 90 stores the information processing apparatus side program. In addition, the CPU 88 executes the information processing by being operated as the acquisition unit 102 and the execution unit 104 according to the information processing program 60A. The CPU 88 executes the display control process by being operated as the control unit 106 according to the display control program 60B. Further, the CPU 88 executes the setting process by being operated as the setting unit 108 according to the setting program 60C.

Note that in the example shown in FIG. 35, the smart device 14 is an example of an "information processing apparatus" according to the technology of the present disclosure. Note that in the example shown in FIG. 35, the smart device 14 is described as an example of the "information processing apparatus" according to the technology of the present disclosure, instead of the smart device 14, various devices equipped with an arithmetic device, such as a head up display, a head mounted display, a personal computer and/or a wearable terminal, can also be adopted as the "information processing apparatus" according to the technology of the present disclosure.

In addition, in the embodiment described above, the soccer stadium 22 has been described as an example, but it is merely an example, and any place, such as a baseball stadium, a rugby stadium, a curling stadium, an athletics stadium, a swimming pool, a concert hall, an outdoor music hall, and a theater venue, may be adopted as long as the plurality of imaging apparatuses and the plurality of sound collection devices 100 can be installed.

In addition, in the embodiment described above, the wireless communication method using the base station 20 has been described as an example, but it is merely an example, and the technology of the present disclosure is established even in the wired communication method using the cable.

In addition, in the embodiment described above, the unmanned aerial vehicle 27 has been described as an example, but the technology of the present disclosure is not limited to this, and the imaging region may be imaged by the imaging apparatus 18 suspended by a wire (for example, a self-propelled imaging apparatus that can move along the wire).

In addition, in the embodiment described above, the computers 50 and 70 have been described as an example, but the technology of the present disclosure is not limited to theses. For example, instead of the computers 50 and/or 70, a device including an ASIC, an FPGA, and/or a PLD may be applied. In addition, instead of the computers 50 and/or 70, a combination of a hardware configuration and a software configuration may be used.

Figure 36:
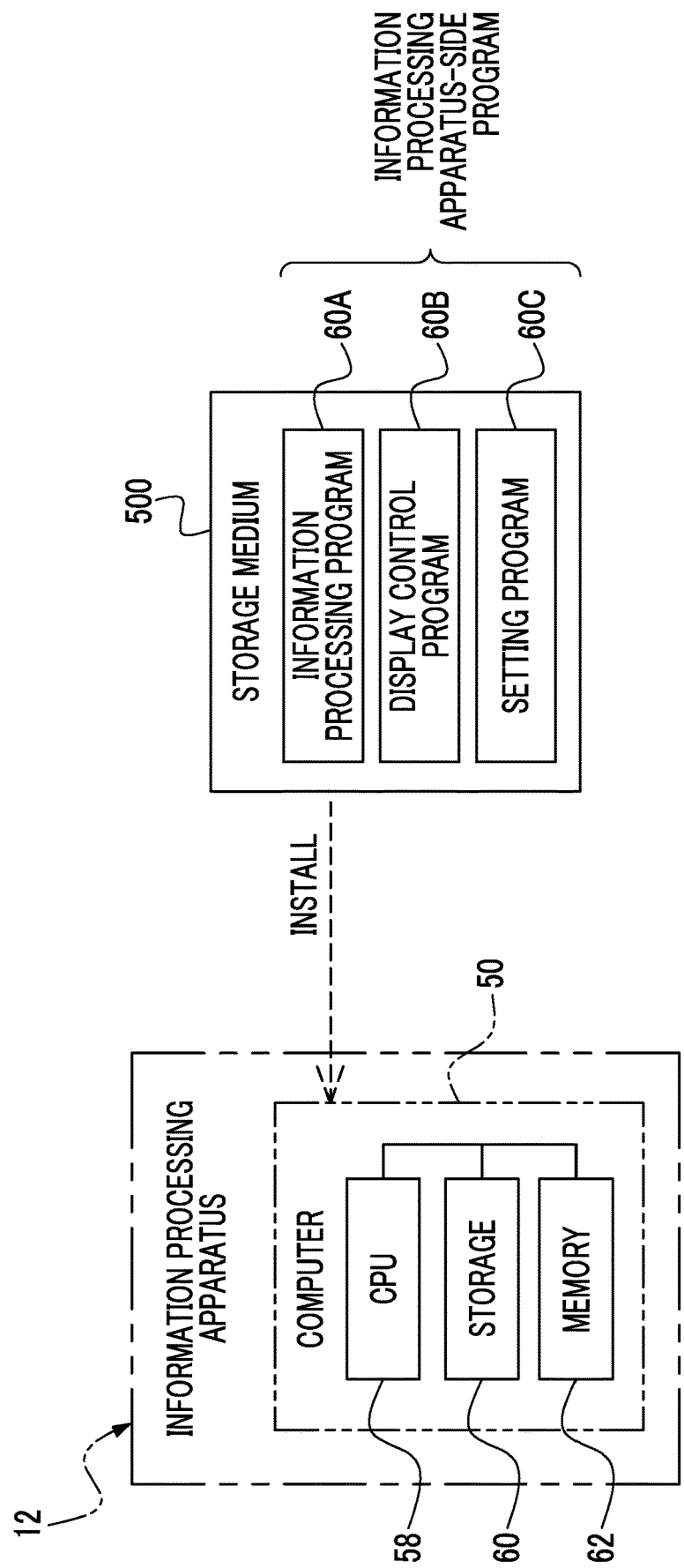
FIG. 36 is a block diagram showing an example of an aspect in which the information processing apparatus side program is installed in the computer of the information processing apparatus from a storage medium in which the information processing apparatus side program is stored.

In addition, in the embodiment described above, the information processing apparatus side program is stored in the storage 60, but the technology of the present disclosure is not limited to this, and as shown in FIG. 36, for example, the information processing apparatus side program may be stored in any portable storage medium 500, such as an SSD or a USB memory, which is a non-transitory storage medium. In this case, the information processing apparatus side program stored in the storage medium 500 is installed in the computer 50, and the CPU 58 executes the information processing apparatus side process according to the information processing apparatus side program.

In addition, the information processing apparatus side program may be stored in a storage unit of another computer or a server device connected to the computer 50 via a communication network (not shown), and the information processing apparatus side program may be downloaded to the information processing apparatus 12 in response to the request of the information processing apparatus 12. In this case, the information processing apparatus side process based on the downloaded information processing apparatus side program is executed by the CPU 58 of the computer 50.

In addition, in the embodiment described above, the CPU 58 has been described as an example, but the technology of the present disclosure is not limited to this, and a GPU may be adopted. In addition, a plurality of CPUs may be adopted instead of the CPU 58. That is, the information processing apparatus side process may be executed by one processor or a plurality of physically separated processors. In addition, instead of the CPU 88, a GPU may be adopted, a plurality of CPUs may be adopted, or one processor or a plurality of physically separated processors may be adopted to execute various processes.

The following various processors can be used as a hardware resource for executing the information processing apparatus side process. Examples of the processor include a CPU, which is a general-purpose processor that functions as software, that is, the hardware resource for executing the information processing apparatus side process according to the program, as described above. In addition, another example of the processor includes a dedicated electric circuit which is a processor having a circuit configuration specially designed for executing a specific process, such as an FPGA, a PLD, or an ASIC. A memory is also built in or connected to each processor, and each processor executes the information processing apparatus side process by using the memory.

The hardware resource for executing the information processing apparatus side process may be configured by one of the various processors, or may be a combination of two or more processors of the same type or different types (for example, a combination of a plurality of FPGAs or a combination of a CPU and an FPGA). In addition, the hardware resource for executing the information processing apparatus side process may be one processor.

As an example of configuring the hardware resource with one processor, first, as represented by a computer such as a client computer or a server, there is a form in which one processor is configured by a combination of one or more CPUs and software, and the processor functions as the hardware resource for executing the information processing apparatus side process. Secondly, as represented by SoC, there is an aspect in which a processor that realizes the functions of the whole system including a plurality of the hardware resources for executing the information processing apparatus side process with one IC chip is used. In this way, the information processing apparatus side process is realized by using one or more of the various processors described above as the hardware resource.

Further, as the hardware structure of these various processors, more specifically, an electric circuit in which circuit elements such as semiconductor elements are combined can be used.

In addition, the information processing apparatus side process described above is merely an example. Therefore, it is needless to say that unnecessary steps may be deleted, new steps may be added, or the process order may be changed within a range that does not deviate from the gist.

The contents described and shown above are the detailed description of the parts according to the technology of the present disclosure, and are merely examples of the technology of the present disclosure. For example, the description of the configuration, the function, the action, and the effect above are the description of examples of the configuration, the function, the action, and the effect of the parts according to the technology of the present disclosure. Accordingly, it is needless to say that unnecessary parts may be deleted, new elements may be added, or replacements may be made with respect to the contents described and shown above within a range that does not deviate from the gist of the technology of the present disclosure. In addition, in order to avoid complications and facilitate understanding of the parts according to the technology of the present disclosure, in the contents described and shown above, the description of common technical knowledge and the like that do not particularly require description for enabling the implementation of the technology of the present disclosure are omitted.

In the present specification, "A and/or B" is synonymous with "at least one of A or B". That is, "A and/or B" means that it may be only A, only B, or a combination of A and B. In addition, in the present specification, in a case in which three or more matters are associated and expressed by "and/or", the same concept as "A and/or B" is applied.

All of the documents, the patent applications, and the technical standards described in the present specification are incorporated in the present specification by referring to the same extent as a case in which individual document, patent application, and technical standard are specifically and individually noted to be incorporated by reference.

Regarding the embodiment described above, the following supplementary note will be further disclosed.

(Supplementary Note 1)

An information processing apparatus including a processor, and a memory built in or connected to the processor,
in which the processor acquires a free viewpoint video based on at least one image among a plurality of images obtained by imaging an imaging region by a plurality of imaging apparatuses, and a reference video, the free viewpoint video indicating the imaging region in a case in which the imaging region is observed from a specific viewpoint position and a specific visual line direction, and
executes a specific process in a case in which a difference degree between the acquired free viewpoint video and the acquired reference video is equal to or more than a first threshold value.

What is claimed is:

1. An information processing apparatus comprising:
a processor; and
a memory built in or connected to the processor,
wherein the processor
acquires a free viewpoint video based on at least one image among a plurality of images obtained by imaging an imaging region by a plurality of imaging apparatuses, and a reference video, the free viewpoint video indicating the imaging region in a case in which the imaging region is observed from a specific viewpoint position and a specific visual line direction, and
executes a specific process in a case in which a difference degree between the acquired free viewpoint video and the acquired reference video is equal to or more than a first threshold value.

2. The information processing apparatus according to claim 1,
wherein the specific process is a process including a notification process of giving notification that the difference degree is equal to or more than the first threshold value.

3. The information processing apparatus according to claim 2,
wherein the notification process is a process of giving at least one of visible notification, audible notification, or tactile notification that the difference degree is equal to or more than the first threshold value.

4. The information processing apparatus according to claim 1,
wherein the specific process is a process including a process of limiting a range in which the viewpoint position is able to be indicated to a viewpoint position range determined as a range in which the difference degree is set to be less than the first threshold value, and limiting a range in which the visual line direction is able to be indicated to a visual line direction range determined as a range in which the difference degree is set to be less than the first threshold value.

5. The information processing apparatus according to claim 1,
wherein the specific process is a process including a change process of performing, on the free viewpoint video change for setting the difference degree to be less than the first threshold value.

6. The information processing apparatus according to claim 5,
wherein the change process is a process of changing the free viewpoint video by changing at least one of the viewpoint position or the visual line direction.

7. The information processing apparatus according to claim 1,
wherein the processor executes the specific process depending on a change in the free viewpoint video.

8. The information processing apparatus according to claim 7,
wherein the processor selectively sets a following mode in which the processor executes the specific process while following the change in the free viewpoint video, and a non-following mode in which the processor does not execute the specific process while following the change in the free viewpoint video.

9. The information processing apparatus according to claim 8,
wherein the processor sets the following mode in a case in which a change amount of the difference degree is less than a second threshold value, and sets the non-following mode in a case in which the change amount is equal to or more than the second threshold value.

10. The information processing apparatus according to claim 8,
wherein the processor sets the following mode in a case in which a frequency at which the difference degree changes is less than a third threshold value, and sets the non-following mode in a case in which the frequency is equal to or more than the third threshold value.

11. The information processing apparatus according to claim 1,
wherein the processor further displays the free viewpoint video on a first display device.

12. The information processing apparatus according to claim 11, wherein the first display device includes a detector that detects a posture of the first display device, and the processor executes the specific process in a case in which the posture detected by the detector is a predetermined posture, and does not execute the specific process in a case in which the posture detected by the detector is a posture different from the predetermined posture.

13. The information processing apparatus according to claim 11, wherein the processor displays the reference video on a second display device different from the first display device.

14. The information processing apparatus according to claim 1, wherein the processor executes change in the first threshold value according to instruction information for giving an instruction for changing the first threshold value received by a reception device in a case in which the instruction information is received by the reception device.

15. The information processing apparatus according to claim 1, wherein the free viewpoint video is a virtual viewpoint video.

16. The information processing apparatus according to claim 1, wherein the reference video is a live broadcast video.

17. The information processing apparatus according to claim 1, wherein the reference video is an image obtained by imaging the imaging region by a reference imaging apparatus.

18. The information processing apparatus according to claim 1, wherein the viewpoint position and the visual line direction are a viewpoint position and a visual line direction as indicated from an outside.

19. The information processing apparatus according to claim 1, wherein the specific process is a process that contributes to setting the difference degree to be less than the first threshold value.

20. An information processing method comprising:

acquiring a free viewpoint video based on at least one image among a plurality of images obtained by imaging an imaging region by a plurality of imaging apparatuses, and a reference video, the free viewpoint video indicating the imaging region in a case in which the imaging region is observed from a specific viewpoint position and a specific visual line direction; and executing a specific process in a case in which a difference degree between the acquired free viewpoint video and the acquired reference video is equal to or more than a first threshold value.

21. A non-transitory computer-readable storage medium storing a program for causing a computer to execute a process comprising:

acquiring a free viewpoint video based on at least one image among a plurality of images obtained by imaging an imaging region by a plurality of imaging apparatuses, and a reference video, the free viewpoint video indicating the imaging region in a case in which the imaging region is observed from a specific viewpoint position and a specific visual line direction; and executing a specific process in a case in which a difference degree between the acquired free viewpoint video and the acquired reference video is equal to or more than a first threshold value.

22. The information processing apparatus according to claim 1, wherein the processor calculates the difference degree by comparing the acquired free viewpoint video and the acquired reference video.

23. The information processing apparatus according to claim 1, wherein the processor calculates the difference degree by comparing a first feature amount obtained by performing image processing on the acquired free viewpoint video and a second feature amount obtained by performing the image processing on the acquired reference video.

* * * * *